US010344797B2

(12) United States Patent
Park

(10) Patent No.: US 10,344,797 B2
(45) Date of Patent: Jul. 9, 2019

(54) HINGE WITH MULTIPLE PRESET POSITIONS

(71) Applicant: Microsoft Technology Licensing, LLC, Redmond, WA (US)

(72) Inventor: Daniel C. Park, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 293 days.

(21) Appl. No.: 15/091,416

(22) Filed: Apr. 5, 2016

(65) Prior Publication Data
US 2017/0284457 A1    Oct. 5, 2017

(51) Int. Cl.
*F16C 11/10*    (2006.01)
*G06F 1/16*    (2006.01)
(Continued)

(52) U.S. Cl.
CPC ............ *F16C 11/103* (2013.01); *G06F 1/166* (2013.01); *G06F 1/1679* (2013.01);
(Continued)

(58) Field of Classification Search
CPC . E05D 11/1028; E05D 11/082; E05D 11/084; E05D 2011/085; E05D 2011/1035; F16M 11/2021; F16M 11/38; F16M 13/005; G06F 1/166; G06F 1/1616; G06F 1/1637; G06F 1/1656; G06F 1/1679; G06F 1/1681; F16C 11/103; H04M 1/04; H04M 1/0216; H05K 5/0226; E05Y 2900/606; Y10T 16/54028; Y10T 16/5387; Y10T 16/54035
(Continued)

(56) References Cited
U.S. PATENT DOCUMENTS 375,394 A    12/1887    Strachan
457,824 A    8/1891    Curtis
(Continued)

FOREIGN PATENT DOCUMENTS

CA    990023    6/1976
CN    2881760    3/2007
(Continued)

OTHER PUBLICATIONS

"Corrected Notice of Allowance", U.S. Appl. No. 14/755,734, dated Dec. 7, 2017, 2 pages.
(Continued)

*Primary Examiner* — William L Miller
(74) *Attorney, Agent, or Firm* — Rainer Patents, P.S.

(57) ABSTRACT

A hinge with multiple preset positions is described. According to various embodiments, the hinge mechanism enables a support component to be adjustably attached to an apparatus, such as a computing device. In at least some embodiments, the hinge mechanism utilizes preset hinge positions that enable the support component to be placed at different preset positions. For instance, the hinge mechanism is configured such that an attached support component tends to "snap" into various preset positions. In at least some embodiments, the hinge mechanism includes an emergency escape position that enables the support component to be rotated beyond normal operating positions without damaging the support component.

20 Claims, 35 Drawing Sheets

(51) Int. Cl.
*H04M 1/04* (2006.01)
*H04M 1/02* (2006.01)

(52) U.S. Cl.
CPC ............ *G06F 1/1681* (2013.01); *H04M 1/04* (2013.01); *H04M 1/0216* (2013.01); *Y10T 16/54028* (2015.01)

(58) Field of Classification Search
USPC ...... 16/334, 303, 341; 403/103; 361/679.27, 361/679.59; 248/351, 688, 917; 455/575.3; 379/433.13, 454
See application file for complete search history.

(56) References Cited

U.S. PATENT DOCUMENTS

| | | |
|---|---|---|
| 578,325 A | 3/1897 | Fleming |
| 2,056,805 A | 10/1936 | Reichard |
| 2,770,834 A | 11/1956 | Jannace |
| 3,849,834 A | 11/1974 | Mayer |
| 4,046,975 A | 9/1977 | Seeger, Jr. |
| 4,065,649 A | 12/1977 | Carter et al. |
| 4,243,861 A | 1/1981 | Strandwitz |
| 4,302,648 A | 11/1981 | Sado et al. |
| 4,317,011 A | 2/1982 | Mazurk |
| 4,317,013 A | 2/1982 | Larson |
| 4,365,130 A | 12/1982 | Christensen |
| 4,492,829 A | 1/1985 | Rodrique |
| 4,527,021 A | 7/1985 | Morikawa et al. |
| 4,559,426 A | 12/1985 | Van Zeeland et al. |
| 4,577,822 A | 3/1986 | Wilkerson |
| 4,588,187 A | 5/1986 | Dell |
| 4,607,147 A | 8/1986 | Ono et al. |
| 4,651,133 A | 3/1987 | Ganesan et al. |
| 4,735,394 A | 4/1988 | Facco |
| 4,990,900 A | 2/1991 | Kikuchi |
| 5,008,497 A | 4/1991 | Asher |
| 5,107,401 A | 4/1992 | Youn |
| 5,128,829 A | 7/1992 | Loew |
| 5,220,521 A | 6/1993 | Kikinis |
| 5,235,495 A | 8/1993 | Blair et al. |
| 5,283,559 A | 2/1994 | Kalendra et al. |
| 5,331,443 A | 7/1994 | Stanisci |
| 5,375,076 A | 12/1994 | Goodrich et al. |
| 5,480,118 A | 1/1996 | Cross |
| 5,546,271 A | 8/1996 | Gut et al. |
| 5,548,477 A | 8/1996 | Kumar et al. |
| 5,558,577 A | 9/1996 | Kato |
| 5,681,220 A | 10/1997 | Bertram et al. |
| 5,737,183 A | 4/1998 | Kobayashi et al. |
| 5,745,376 A | 4/1998 | Barker et al. |
| 5,748,114 A | 5/1998 | Koehn |
| 5,771,540 A | 6/1998 | Carpenter et al. |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,842,027 A | 11/1998 | Oprescu et al. |
| 5,861,990 A | 1/1999 | Tedesco |
| 5,874,697 A | 2/1999 | Selker et al. |
| 5,905,485 A | 5/1999 | Podoloff |
| 5,926,170 A | 7/1999 | Oba |
| 5,971,635 A | 10/1999 | Wise |
| 6,002,389 A | 12/1999 | Kasser |
| 6,002,581 A | 12/1999 | Lindsey |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,061,644 A | 5/2000 | Leis |
| 6,108,200 A | 8/2000 | Fullerton |
| 6,112,797 A | 9/2000 | Colson et al. |
| 6,125,509 A | 10/2000 | Hartigan et al. |
| 6,128,007 A | 10/2000 | Seybold |
| 6,141,388 A | 10/2000 | Servais et al. |
| 6,178,085 B1 | 1/2001 | Leung |
| 6,178,443 B1 | 1/2001 | Lin |
| 6,233,138 B1 | 5/2001 | Osgood |
| 6,254,105 B1 | 7/2001 | Rinde et al. |
| 6,279,060 B1 | 8/2001 | Luke et al. |
| 6,292,981 B1 | 9/2001 | Ford et al. |
| 6,329,617 B1 | 12/2001 | Burgess |
| 6,341,407 B1 | 1/2002 | Hayashida |
| 6,344,791 B1 | 2/2002 | Armstrong |
| 6,366,440 B1 | 4/2002 | Kung |
| 6,380,497 B1 | 4/2002 | Hashimoto et al. |
| 6,437,682 B1 | 8/2002 | Vance |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,553,625 B2 | 4/2003 | Lin et al. |
| 6,565,439 B2 | 5/2003 | Shinohara et al. |
| 6,597,347 B1 | 7/2003 | Yasutake |
| 6,600,121 B1 | 7/2003 | Olodort et al. |
| 6,603,408 B1 | 8/2003 | Gaba |
| 6,608,664 B1 | 8/2003 | Hasegawa |
| 6,617,536 B2 | 9/2003 | Kawaguchi |
| 6,651,943 B2 | 11/2003 | Cho et al. |
| 6,685,369 B2 | 2/2004 | Lien |
| 6,695,273 B2 | 2/2004 | Iguchi |
| 6,704,864 B1 | 3/2004 | Philyaw |
| 6,721,019 B2 | 4/2004 | Kono et al. |
| 6,725,318 B1 | 4/2004 | Sherman et al. |
| 6,774,888 B1 | 8/2004 | Genduso |
| 6,776,546 B2 | 8/2004 | Kraus et al. |
| 6,781,819 B2 | 8/2004 | Yang et al. |
| 6,784,869 B1 | 8/2004 | Clark et al. |
| 6,813,143 B2 | 11/2004 | Makela |
| 6,819,316 B2 | 11/2004 | Schulz et al. |
| 6,856,506 B2 | 2/2005 | Doherty et al. |
| 6,856,789 B2 | 2/2005 | Pattabiraman et al. |
| 6,861,961 B2 | 3/2005 | Sandbach et al. |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 7,007,238 B2 | 2/2006 | Glaser |
| 7,051,149 B2 | 5/2006 | Wang et al. |
| 7,079,874 B2 | 7/2006 | Pontoppidan et al. |
| 7,083,295 B1 | 8/2006 | Hanna |
| 7,091,436 B2 | 8/2006 | Serban |
| 7,099,149 B2 | 8/2006 | Krieger et al. |
| 7,106,222 B2 | 9/2006 | Ward et al. |
| 7,123,292 B1 | 10/2006 | Seeger et al. |
| 7,152,985 B2 | 12/2006 | Benitez et al. |
| D535,292 S | 1/2007 | Shi et al. |
| 7,192,105 B2 | 3/2007 | Jung |
| 7,194,662 B2 | 3/2007 | Do et al. |
| 7,213,991 B2 | 5/2007 | Chapman et al. |
| 7,232,098 B2 | 6/2007 | Rawlings et al. |
| 7,239,505 B2 | 7/2007 | Keely et al. |
| 7,260,221 B1 | 8/2007 | Atsmon |
| 7,277,087 B2 | 10/2007 | Hill et al. |
| 7,301,759 B2 | 11/2007 | Hsiung |
| 7,447,934 B2 | 11/2008 | Dasari et al. |
| 7,469,386 B2 | 12/2008 | Bear et al. |
| 7,486,165 B2 | 2/2009 | Ligtenberg et al. |
| 7,499,037 B2 | 3/2009 | Lube |
| 7,502,803 B2 | 3/2009 | Culter et al. |
| 7,542,052 B2 | 6/2009 | Solomon et al. |
| 7,543,358 B2 | 6/2009 | Lin et al. |
| 7,558,594 B2 | 7/2009 | Wilson |
| 7,559,834 B1 | 7/2009 | York |
| RE40,891 E | 9/2009 | Yasutake |
| 7,594,638 B2 | 9/2009 | Chan et al. |
| 7,636,921 B2 | 12/2009 | Louie |
| 7,639,876 B2 | 12/2009 | Clary et al. |
| 7,656,392 B2 | 2/2010 | Bolender |
| 7,729,493 B2 | 6/2010 | Krieger et al. |
| 7,731,147 B2 | 6/2010 | Rha |
| 7,733,326 B1 | 6/2010 | Adiseshan |
| 7,761,119 B2 | 7/2010 | Patel |
| 7,777,972 B1 | 8/2010 | Chen et al. |
| 7,782,342 B2 | 8/2010 | Koh |

(56) References Cited

U.S. PATENT DOCUMENTS

| | | |
|---|---|---|
| 7,813,715 B2 | 10/2010 | McKillop et al. |
| 7,822,338 B2 | 10/2010 | Wernersson |
| 7,865,639 B2 | 1/2011 | McCoy et al. |
| 7,884,807 B2 | 2/2011 | Hoyden et al. |
| 7,913,357 B2 | 3/2011 | Peng et al. |
| D636,397 S | 4/2011 | Green |
| 7,928,964 B2 | 4/2011 | Kolmykov-Zotov et al. |
| 7,944,520 B2 | 5/2011 | Ichioka et al. |
| 7,945,717 B2 | 5/2011 | Rivalsi |
| 7,967,462 B2 | 6/2011 | Ogiro et al. |
| 7,973,771 B2 | 7/2011 | Geaghan |
| 7,978,281 B2 | 7/2011 | Vergith et al. |
| 8,016,255 B2 | 9/2011 | Lin |
| 8,053,688 B2 | 11/2011 | Conzola et al. |
| 8,065,624 B2 | 11/2011 | Morin et al. |
| 8,069,356 B2 | 11/2011 | Rathi et al. |
| 8,074,956 B2 | 12/2011 | Wang et al. |
| 8,090,885 B2 | 1/2012 | Callaghan et al. |
| 8,098,233 B2 | 1/2012 | Hotelling et al. |
| 8,115,499 B2 | 2/2012 | Osoinach et al. |
| 8,117,362 B2 | 2/2012 | Rodriguez et al. |
| 8,118,274 B2 | 2/2012 | McClure et al. |
| 8,130,203 B2 | 3/2012 | Westerman |
| 8,154,524 B2 | 4/2012 | Wilson et al. |
| 8,162,282 B2 | 4/2012 | Hu et al. |
| D659,139 S | 5/2012 | Gengler |
| 8,169,421 B2 | 5/2012 | Wright et al. |
| 8,224,405 B2 | 7/2012 | Lombardi et al. |
| 8,229,509 B2 | 7/2012 | Paek et al. |
| 8,229,522 B2 | 7/2012 | Kim et al. |
| 8,230,992 B2 | 7/2012 | Law et al. |
| 8,231,099 B2 | 7/2012 | Chen |
| 8,243,432 B2 | 8/2012 | Duan et al. |
| 8,248,791 B2 | 8/2012 | Wang et al. |
| 8,255,708 B1 | 8/2012 | Zhang |
| 8,264,310 B2 | 9/2012 | Lauder et al. |
| 8,267,368 B2 * | 9/2012 | Torii ............... F16M 11/10 248/188.8 |
| 8,274,784 B2 | 9/2012 | Franz et al. |
| 8,279,589 B2 | 10/2012 | Kim |
| 8,322,290 B1 | 12/2012 | Mignano |
| 8,335,079 B2 | 12/2012 | Yeh |
| 8,387,078 B2 | 2/2013 | Memmott |
| 8,387,938 B2 | 3/2013 | Lin |
| 8,390,995 B2 | 3/2013 | Wang et al. |
| 8,403,288 B2 | 3/2013 | Cheng |
| 8,416,559 B2 | 4/2013 | Agata et al. |
| 8,424,160 B2 | 4/2013 | Chen |
| 8,498,100 B1 | 7/2013 | Whitt, III et al. |
| 8,514,568 B2 | 8/2013 | Qiao et al. |
| 8,520,371 B2 | 8/2013 | Peng et al. |
| 8,523,131 B2 | 9/2013 | Derry et al. |
| 8,543,227 B1 | 9/2013 | Perek et al. |
| 8,548,608 B2 | 10/2013 | Perek et al. |
| 8,564,944 B2 | 10/2013 | Whitt, III et al. |
| 8,570,725 B2 | 10/2013 | Whitt, III et al. |
| 8,599,542 B1 | 12/2013 | Healey et al. |
| 8,610,015 B2 | 12/2013 | Whitt et al. |
| 8,614,666 B2 | 12/2013 | Whitman et al. |
| 8,646,999 B2 | 2/2014 | Shaw et al. |
| 8,699,215 B2 | 4/2014 | Whitt, III et al. |
| 8,719,603 B2 | 5/2014 | Belesiu |
| 8,724,302 B2 | 5/2014 | Whitt et al. |
| 8,744,070 B2 | 6/2014 | Zhang et al. |
| 8,744,391 B2 | 6/2014 | Tenbrook et al. |
| 8,767,388 B2 | 7/2014 | Ahn et al. |
| 8,797,765 B2 | 8/2014 | Lin et al. |
| 8,891,232 B2 | 11/2014 | Wang |
| 8,908,858 B2 | 12/2014 | Chiu et al. |
| 8,934,221 B2 | 1/2015 | Guo |
| 8,939,422 B2 | 1/2015 | Liu et al. |
| 8,964,376 B2 | 2/2015 | Chen |
| 9,134,808 B2 | 9/2015 | Siddiqui et al. |
| 9,198,312 B2 | 11/2015 | Zhang et al. |
| 9,310,848 B2 | 4/2016 | Fujino et al. |
| 9,317,072 B2 * | 4/2016 | Park ............... G06F 1/1681 |
| 9,447,620 B2 | 9/2016 | Park et al. |
| 9,512,655 B2 | 12/2016 | Kuo |
| 9,752,361 B2 | 9/2017 | Park |
| 9,759,242 B2 | 9/2017 | Hsu |
| 9,766,663 B2 | 9/2017 | Siddiqui et al. |
| 9,864,415 B2 | 1/2018 | Siddiqui |
| 2002/0044216 A1 | 4/2002 | Cha |
| 2002/0134828 A1 | 9/2002 | Sandbach et al. |
| 2003/0160712 A1 | 8/2003 | Levy |
| 2003/0163611 A1 | 8/2003 | Nagao |
| 2003/0197687 A1 | 10/2003 | Shetter |
| 2003/0222848 A1 | 12/2003 | Solomon et al. |
| 2004/0056843 A1 | 3/2004 | Lin et al. |
| 2004/0156168 A1 | 8/2004 | LeVasseur et al. |
| 2004/0212601 A1 | 10/2004 | Cake et al. |
| 2004/0258924 A1 | 12/2004 | Berger et al. |
| 2004/0268000 A1 | 12/2004 | Barker et al. |
| 2005/0030728 A1 | 2/2005 | Kawashima et al. |
| 2005/0052831 A1 | 3/2005 | Chen |
| 2005/0055498 A1 | 3/2005 | Beckert et al. |
| 2005/0057515 A1 | 3/2005 | Bathiche |
| 2005/0059489 A1 | 3/2005 | Kim |
| 2005/0099400 A1 | 5/2005 | Lee |
| 2005/0134717 A1 | 6/2005 | Misawa |
| 2005/0146512 A1 | 7/2005 | Hill et al. |
| 2005/0204509 A1 | 9/2005 | Lin et al. |
| 2005/0264653 A1 | 12/2005 | Starkweather et al. |
| 2005/0264988 A1 | 12/2005 | Nicolosi |
| 2006/0085658 A1 | 4/2006 | Allen et al. |
| 2006/0125799 A1 | 6/2006 | Hillis et al. |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0187216 A1 | 8/2006 | Trent, Jr. et al. |
| 2006/0195522 A1 | 8/2006 | Miyazaki |
| 2006/0227393 A1 | 10/2006 | Herloski |
| 2006/0272128 A1 | 12/2006 | Rude |
| 2007/0003267 A1 | 1/2007 | Shibutani |
| 2007/0056385 A1 | 3/2007 | Lorenz |
| 2007/0062089 A1 | 3/2007 | Homer et al. |
| 2007/0069153 A1 | 3/2007 | Pai-Paranjape et al. |
| 2007/0072474 A1 | 3/2007 | Beasley et al. |
| 2007/0145945 A1 | 6/2007 | McGinley et al. |
| 2007/0164191 A1 | 7/2007 | Kim |
| 2007/0176902 A1 | 8/2007 | Newman et al. |
| 2007/0182663 A1 | 8/2007 | Biech |
| 2007/0182722 A1 | 8/2007 | Hotelling et al. |
| 2007/0185590 A1 | 8/2007 | Reindel et al. |
| 2007/0200830 A1 | 8/2007 | Yamamoto |
| 2007/0220708 A1 | 9/2007 | Lewis |
| 2007/0234420 A1 | 10/2007 | Novotney et al. |
| 2007/0236408 A1 | 10/2007 | Yamaguchi et al. |
| 2007/0236475 A1 | 10/2007 | Wherry |
| 2007/0236873 A1 | 10/2007 | Yukawa et al. |
| 2007/0247432 A1 | 10/2007 | Oakley |
| 2007/0260892 A1 | 11/2007 | Paul et al. |
| 2007/0283179 A1 | 12/2007 | Burnett et al. |
| 2008/0005423 A1 | 1/2008 | Jacobs et al. |
| 2008/0053222 A1 | 3/2008 | Ehrensvard et al. |
| 2008/0059888 A1 | 3/2008 | Dunko |
| 2008/0104437 A1 | 5/2008 | Lee |
| 2008/0151478 A1 | 6/2008 | Chern, Jr. |
| 2008/0158185 A1 | 7/2008 | Westerman |
| 2008/0174570 A1 | 7/2008 | Jobs et al. |
| 2008/0186660 A1 | 8/2008 | Yang |
| 2008/0228969 A1 | 9/2008 | Cheah et al. |
| 2008/0238884 A1 | 10/2008 | Harish |
| 2008/0253822 A1 | 10/2008 | Matias |
| 2008/0309636 A1 | 12/2008 | Feng et al. |
| 2008/0316002 A1 | 12/2008 | Brunet et al. |
| 2008/0320190 A1 | 12/2008 | Lydon et al. |
| 2009/0009476 A1 | 1/2009 | Daley, III |
| 2009/0073957 A1 | 3/2009 | Newland et al. |
| 2009/0083562 A1 | 3/2009 | Park et al. |
| 2009/0140985 A1 | 6/2009 | Liu |
| 2009/0195497 A1 | 8/2009 | Fitzgerald et al. |
| 2009/0231275 A1 | 9/2009 | Odgers |
| 2009/0244872 A1 | 10/2009 | Yan |

(56) References Cited

U.S. PATENT DOCUMENTS

| | | |
|---|---|---|
| 2009/0251008 A1 | 10/2009 | Sugaya |
| 2009/0259865 A1 | 10/2009 | Sheynblat et al. |
| 2009/0262492 A1 | 10/2009 | Whitchurch et al. |
| 2009/0265670 A1 | 10/2009 | Kim et al. |
| 2009/0285491 A1 | 11/2009 | Ravenscroft et al. |
| 2009/0296331 A1 | 12/2009 | Choy |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0013319 A1 | 1/2010 | Kamiyama et al. |
| 2010/0026656 A1 | 2/2010 | Hotelling et al. |
| 2010/0038821 A1 | 2/2010 | Jenkins et al. |
| 2010/0045633 A1 | 2/2010 | Gettemy et al. |
| 2010/0051432 A1 | 3/2010 | Lin et al. |
| 2010/0053534 A1 | 3/2010 | Hsieh et al. |
| 2010/0072334 A1 | 3/2010 | Le Gette et al. |
| 2010/0077237 A1 | 3/2010 | Sawyers |
| 2010/0085321 A1 | 4/2010 | Pundsack |
| 2010/0102182 A1 | 4/2010 | Lin |
| 2010/0103112 A1 | 4/2010 | Yoo et al. |
| 2010/0123686 A1 | 5/2010 | Klinghult et al. |
| 2010/0133398 A1 | 6/2010 | Chiu et al. |
| 2010/0133414 A1 | 6/2010 | Lee et al. |
| 2010/0142130 A1 | 6/2010 | Wang et al. |
| 2010/0149111 A1 | 6/2010 | Olien |
| 2010/0149377 A1 | 6/2010 | Shintani et al. |
| 2010/0154171 A1 | 6/2010 | Lombardi et al. |
| 2010/0161522 A1 | 6/2010 | Tirpak et al. |
| 2010/0164857 A1 | 7/2010 | Liu et al. |
| 2010/0164897 A1 | 7/2010 | Morin et al. |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0222110 A1 | 9/2010 | Kim et al. |
| 2010/0231556 A1 | 9/2010 | Mines et al. |
| 2010/0235546 A1 | 9/2010 | Terlizzi et al. |
| 2010/0238620 A1 | 9/2010 | Fish |
| 2010/0250988 A1 | 9/2010 | Okuda et al. |
| 2010/0259876 A1 | 10/2010 | Kim |
| 2010/0271771 A1 | 10/2010 | Wu et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0295812 A1 | 11/2010 | Burns et al. |
| 2010/0302378 A1 | 12/2010 | Marks et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0321877 A1 | 12/2010 | Moser |
| 2010/0324457 A1 | 12/2010 | Bean et al. |
| 2010/0325155 A1 | 12/2010 | Skinner et al. |
| 2011/0012873 A1 | 1/2011 | Prest et al. |
| 2011/0019123 A1 | 1/2011 | Prest et al. |
| 2011/0025176 A1* | 2/2011 | McClure .......... A47B 23/042 312/223.2 |
| 2011/0031287 A1 | 2/2011 | Le Gette et al. |
| 2011/0036965 A1 | 2/2011 | Zhang et al. |
| 2011/0037721 A1 | 2/2011 | Cranfill et al. |
| 2011/0043990 A1 | 2/2011 | Mickey et al. |
| 2011/0055407 A1 | 3/2011 | Lydon et al. |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0102326 A1 | 5/2011 | Casparian et al. |
| 2011/0102752 A1 | 5/2011 | Chen et al. |
| 2011/0115713 A1 | 5/2011 | Altman et al. |
| 2011/0134032 A1 | 6/2011 | Chiu et al. |
| 2011/0149510 A1 | 6/2011 | Monsalve et al. |
| 2011/0157046 A1 | 6/2011 | Lee et al. |
| 2011/0157087 A1 | 6/2011 | Kanehira et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0169762 A1 | 7/2011 | Weiss |
| 2011/0170289 A1 | 7/2011 | Allen et al. |
| 2011/0176035 A1 | 7/2011 | Poulsen |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0205372 A1 | 8/2011 | Miramontes |
| 2011/0227913 A1 | 9/2011 | Hyndman |
| 2011/0231682 A1 | 9/2011 | Kakish et al. |
| 2011/0248152 A1 | 10/2011 | Svajda et al. |
| 2011/0248920 A1 | 10/2011 | Larsen |
| 2011/0261001 A1 | 10/2011 | Liu |
| 2011/0265287 A1 | 11/2011 | Li et al. |
| 2011/0267272 A1 | 11/2011 | Meyer et al. |
| 2011/0290686 A1 | 12/2011 | Huang |
| 2011/0295697 A1 | 12/2011 | Boston et al. |
| 2011/0297566 A1 | 12/2011 | Gallagher et al. |
| 2011/0298919 A1 | 12/2011 | Maglaque |
| 2011/0304577 A1 | 12/2011 | Brown et al. |
| 2011/0316807 A1 | 12/2011 | Corrion |
| 2012/0007821 A1 | 1/2012 | Zaliva |
| 2012/0023459 A1 | 1/2012 | Westerman |
| 2012/0024682 A1 | 2/2012 | Huang et al. |
| 2012/0032891 A1 | 2/2012 | Parivar |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0068919 A1 | 3/2012 | Lauder et al. |
| 2012/0069540 A1 | 3/2012 | Lauder et al. |
| 2012/0075249 A1 | 3/2012 | Hoch |
| 2012/0092279 A1 | 4/2012 | Martin |
| 2012/0094257 A1 | 4/2012 | Pillischer et al. |
| 2012/0099749 A1 | 4/2012 | Rubin et al. |
| 2012/0113579 A1 | 5/2012 | Agata et al. |
| 2012/0117409 A1 | 5/2012 | Lee et al. |
| 2012/0127118 A1 | 5/2012 | Nolting et al. |
| 2012/0140396 A1 | 6/2012 | Zeliff et al. |
| 2012/0145525 A1 | 6/2012 | Ishikawa |
| 2012/0161406 A1 | 6/2012 | Mersky |
| 2012/0162693 A1 | 6/2012 | Ito |
| 2012/0175487 A1 | 7/2012 | Goto |
| 2012/0176741 A1 | 7/2012 | Wu et al. |
| 2012/0182242 A1 | 7/2012 | Lindahl et al. |
| 2012/0182743 A1 | 7/2012 | Chou |
| 2012/0194448 A1 | 8/2012 | Rothkopf |
| 2012/0194972 A1 | 8/2012 | Bohn et al. |
| 2012/0215284 A1 | 8/2012 | Berg et al. |
| 2012/0224073 A1 | 9/2012 | Miyahara |
| 2012/0229634 A1 | 9/2012 | Laett et al. |
| 2012/0246377 A1 | 9/2012 | Bhesania |
| 2012/0249443 A1 | 10/2012 | Anderson et al. |
| 2012/0256959 A1 | 10/2012 | Ye et al. |
| 2012/0274811 A1 | 11/2012 | Bakin |
| 2012/0300275 A1 | 11/2012 | Vilardell et al. |
| 2012/0312955 A1 | 12/2012 | Randolph |
| 2012/0326003 A1 | 12/2012 | Solow et al. |
| 2013/0009413 A1 | 1/2013 | Chiu et al. |
| 2013/0015311 A1 | 1/2013 | Kim |
| 2013/0027867 A1 | 1/2013 | Lauder et al. |
| 2013/0044074 A1 | 2/2013 | Park et al. |
| 2013/0063873 A1 | 3/2013 | Wodrich et al. |
| 2013/0067126 A1 | 3/2013 | Casparian et al. |
| 2013/0076617 A1 | 3/2013 | Csaszar et al. |
| 2013/0088431 A1 | 4/2013 | Ballagas et al. |
| 2013/0100597 A1 | 4/2013 | Berg et al. |
| 2013/0106766 A1 | 5/2013 | Yilmaz et al. |
| 2013/0162554 A1 | 6/2013 | Lauder et al. |
| 2013/0172906 A1 | 7/2013 | Olson et al. |
| 2013/0175421 A1 | 7/2013 | Faulk et al. |
| 2013/0193292 A1 | 8/2013 | Hsu et al. |
| 2013/0217451 A1 | 8/2013 | Komiyama et al. |
| 2013/0227836 A1 | 9/2013 | Whitt, III |
| 2013/0228023 A1 | 9/2013 | Drasnin |
| 2013/0228433 A1 | 9/2013 | Shaw |
| 2013/0228434 A1 | 9/2013 | Whitt, III |

(56) References Cited

U.S. PATENT DOCUMENTS

| | | |
|---|---|---|
| 2013/0228439 A1 | 9/2013 | Whitt, III |
| 2013/0229100 A1 | 9/2013 | Siddiqui et al. |
| 2013/0229335 A1 | 9/2013 | Whitman |
| 2013/0229347 A1 | 9/2013 | Lutz, III |
| 2013/0229350 A1 | 9/2013 | Shaw et al. |
| 2013/0229351 A1 | 9/2013 | Whitt, III |
| 2013/0229354 A1 | 9/2013 | Whitt, III et al. |
| 2013/0229363 A1 | 9/2013 | Whitman |
| 2013/0229366 A1 | 9/2013 | Dighde |
| 2013/0229380 A1 | 9/2013 | Lutz, III |
| 2013/0229534 A1 | 9/2013 | Panay |
| 2013/0229568 A1 | 9/2013 | Belesiu et al. |
| 2013/0229570 A1 | 9/2013 | Beck et al. |
| 2013/0229756 A1 | 9/2013 | Whitt, III |
| 2013/0229757 A1 | 9/2013 | Whitt, III et al. |
| 2013/0229758 A1 | 9/2013 | Belesiu |
| 2013/0229759 A1 | 9/2013 | Whitt, III et al. |
| 2013/0229760 A1 | 9/2013 | Whitt, III |
| 2013/0229761 A1 | 9/2013 | Shaw |
| 2013/0229762 A1 | 9/2013 | Whitt, III |
| 2013/0229773 A1 | 9/2013 | Siddiqui et al. |
| 2013/0230346 A1 | 9/2013 | Shaw |
| 2013/0231755 A1 | 9/2013 | Perek |
| 2013/0232280 A1 | 9/2013 | Perek |
| 2013/0232348 A1 | 9/2013 | Oler |
| 2013/0232349 A1 | 9/2013 | Oler et al. |
| 2013/0232350 A1 | 9/2013 | Belesiu et al. |
| 2013/0232353 A1 | 9/2013 | Belesiu |
| 2013/0232571 A1 | 9/2013 | Belesiu |
| 2013/0262886 A1 | 10/2013 | Nishimura |
| 2013/0300590 A1 | 11/2013 | Dietz |
| 2013/0300647 A1 | 11/2013 | Drasnin |
| 2013/0301199 A1 | 11/2013 | Whitt |
| 2013/0301206 A1 | 11/2013 | Whitt |
| 2013/0304941 A1 | 11/2013 | Drasnin |
| 2013/0321992 A1 | 12/2013 | Liu et al. |
| 2013/0322000 A1 | 12/2013 | Whitt |
| 2013/0322001 A1 | 12/2013 | Whitt |
| 2013/0329360 A1 | 12/2013 | Aldana |
| 2013/0332628 A1 | 12/2013 | Panay |
| 2013/0335891 A1 | 12/2013 | Chen et al. |
| 2013/0339757 A1 | 12/2013 | Reddy |
| 2013/0342976 A1 | 12/2013 | Chung |
| 2014/0012401 A1 | 1/2014 | Perek et al. |
| 2014/0021727 A1 | 1/2014 | Mai et al. |
| 2014/0029180 A1 | 1/2014 | Nishimura et al. |
| 2014/0036429 A1 | 2/2014 | Bryan et al. |
| 2014/0036430 A1 | 2/2014 | Wroblewski et al. |
| 2014/0043275 A1 | 2/2014 | Whitman |
| 2014/0047672 A1 | 2/2014 | Saito et al. |
| 2014/0048399 A1 | 2/2014 | Whitt, III et al. |
| 2014/0076748 A1 | 3/2014 | Padilla |
| 2014/0083883 A1 | 3/2014 | Elias |
| 2014/0085814 A1 | 3/2014 | Kielland |
| 2014/0119802 A1 | 5/2014 | Shaw et al. |
| 2014/0132550 A1 | 5/2014 | McCracken et al. |
| 2014/0167585 A1 | 6/2014 | Kuan et al. |
| 2014/0174960 A1 | 6/2014 | Zho |
| 2014/0263939 A1 | 9/2014 | Rinner |
| 2014/0293534 A1* | 10/2014 | Siddiqui ............... E05D 7/00 361/679.55 |
| 2014/0317882 A1 | 10/2014 | Chen et al. |
| 2014/0376179 A1 | 12/2014 | Jenkins et al. |
| 2015/0022961 A1 | 1/2015 | Jenkins et al. |
| 2015/0092335 A1 | 4/2015 | Patrick et al. |
| 2015/0185783 A1 | 7/2015 | Hui et al. |
| 2015/0212553 A1 | 7/2015 | Park et al. |
| 2015/0311014 A1 | 10/2015 | Shaw et al. |
| 2015/0362962 A1 | 12/2015 | Lee et al. |
| 2016/0090767 A1* | 3/2016 | Park ............... E05D 11/10 16/319 |
| 2016/0320811 A1 | 11/2016 | Lin |
| 2016/0369543 A1* | 12/2016 | Park ............... E05D 11/082 |
| 2017/0003719 A1 | 1/2017 | Siddiqui |
| 2017/0068284 A1 | 3/2017 | Park et al. |
| 2017/0208703 A1 | 7/2017 | Lin |
| 2017/0257961 A1 | 9/2017 | Chen et al. |
| 2017/0269637 A1 | 9/2017 | Lin et al. |
| 2017/0292302 A1 | 10/2017 | Tomky |
| 2017/0344067 A1 | 11/2017 | Lan et al. |
| 2018/0081404 A1 | 3/2018 | Schafer et al. |
| 2018/0129253 A1 | 5/2018 | Siddiqui |

FOREIGN PATENT DOCUMENTS

| | | |
|---|---|---|
| CN | 102112947 | 6/2011 |
| CN | 202441167 | 9/2012 |
| CN | 102937231 | 2/2013 |
| CN | 103455087 | 12/2013 |
| CN | 103455149 | 12/2013 |
| DE | 10116556 | 10/2002 |
| DE | 202010005274 | 7/2010 |
| EP | 1223722 | 7/2002 |
| EP | 1591891 | 11/2005 |
| EP | 1983411 | 10/2008 |
| EP | 2353978 | 8/2011 |
| GB | 2068643 | 8/1981 |
| GB | 2123213 | 1/1984 |
| JP | 56108127 | 8/1981 |
| JP | 10326124 | 12/1998 |
| JP | 1173239 | 3/1999 |
| JP | 2005084255 | 3/2005 |
| JP | 2006294361 | 10/2006 |
| JP | 2007258774 | 10/2007 |
| JP | 2007279577 | 10/2007 |
| JP | 2009222079 | 10/2009 |
| JP | 2009232326 | 10/2009 |
| JP | 2010109589 | 5/2010 |
| JP | 2012182456 | 9/2012 |
| KR | 1020110087178 | 8/2011 |
| WO | WO-9845769 | 10/1998 |
| WO | WO-1999019995 | 4/1999 |
| WO | WO-2005064436 | 7/2005 |
| WO | WO-2006044818 | 4/2006 |
| WO | WO-2009034484 | 3/2009 |
| WO | WO-2014209383 | 12/2014 |
| WO | WO-2016053918 | 4/2016 |
| WO | WO-2016204891 | 12/2016 |

OTHER PUBLICATIONS

"Foreign Office Action", CN Application No. 201480019024.X, dated Dec. 20, 2017, 11 pages.

"International Preliminary Report on Patentability", Application No. PCT/US2016/032242, dated May 30, 2017, 6 pages.

"International Search Report and Written Opinion", Application No. PCT/US2016/032242, dated Aug. 26, 2016, 12 pages.

"International Search Report and Written Opinion", Application No. PCT/US2017/051437, dated Nov. 30, 2017, 15 pages.

"Notice of Allowance" U.S. Appl. No. 15/266,520, dated Dec. 26, 2017, 16 pages.

"Foreign Office Action", JP Application No. 2016-505516, dated Feb. 6, 2018, 4 pages.

"Restriction Requirement", U.S. Appl. No. 14/755,734, dated Dec. 1, 2016, 6 pages.

"Accessing Device Sensors", retrieved from <https://developer.palm.com/content/api/dev-guide/pdk/accessing-device-sensors.html> on May 25, 2012, 2011, 4 pages.

"ACPI Docking for Windows Operating Systems", Retrieved from: <http://www.scritube.com/limba/engleza/software/ACPI-Docking-for-Windows-Opera331824193.php> on Jul. 6, 2012, 2012, 10 pages.

"Adjustable Kickstand for SecureBack™ M Series Enclosures", Retrieved From: <http://www.kensington.com/ce/ca/4543/8589667786/adjustable-kickstand-for-secureback™-m-series-enclosures#.VQ_Z7_mUdT5> Mar. 25, 2015, 2012, 3 pages.

"Advanced Configuration and Power Management Specification", Intel Corporation, Microsoft Corporation, Toshiba Corp. Revision 1, Dec. 22, 1996, 364 pages.

"Advisory Action", U.S. Appl. No. 13/939,032, dated Feb. 24, 2014, 2 pages.

(56) References Cited

OTHER PUBLICATIONS

"Advisory Action", U.S. Appl. No. 14/199,924, dated May 28, 2014, 2 pages.
"Basic Cam Motion Curves", Retrieved From: <http://ocw.metu.edu.tr/pluginfile.php/6886/mod_resource/content/1/ch8/8-3.htm> Nov. 22, 2013, Middle East Technical University, 1999, 14 Pages.
"Cholesteric Liquid Crystal", Retrieved from: <http://en.wikipedia.org/wiki/Cholesteric_liquid_crystal> on Aug. 6, 2012, Jun. 10, 2012, 2 pages.
"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, Jan. 2013, 1 page.
"Corrected Notice of Allowance", U.S. Appl. No. 13/470,633, dated Apr. 9, 2013, 2 pages.
"Corrected Notice of Allowance", U.S. Appl. No. 13/470,633, dated Jul. 2, 2013, 2 pages.
"Corrected Notice of Allowance", U.S. Appl. No. 13/563,435, dated Jan. 14, 2014, 2 pages.
"Corrected Notice of Allowance", U.S. Appl. No. 13/563,435, dated Mar. 20, 2014, 2 pages.
"Corrected Notice of Allowance", U.S. Appl. No. 13/563,435, dated Jan. 22, 2014, 2 pages.
"Corrected Notice of Allowance", U.S. Appl. No. 13/565,124, dated Apr. 3, 2014, 4 pages.
"Corrected Notice of Allowance", U.S. Appl. No. 13/565,124, dated Mar. 10, 2014, 2 pages.
"Corrected Notice of Allowance", U.S. Appl. No. 13/565,124, dated Apr. 14, 2014, 2 pages.
"Corrected Notice of Allowance", U.S. Appl. No. 13/651,327, dated Sep. 12, 2013, 2 pages.
"Corrected Notice of Allowance", U.S. Appl. No. 13/651,327, dated Sep. 23, 2013, 2 pages.
"Corrected Notice of Allowance", U.S. Appl. No. 13/651,726, dated Sep. 17, 2013, 2 pages.
"Corrected Notice of Allowance", U.S. Appl. No. 13/938,930, dated May 6, 2014, 2 pages.
"Corrected Notice of Allowance", U.S. Appl. No. 13/938,930, dated Jun. 6, 2014, 2 pages.
"Corrected Notice of Allowance", U.S. Appl. No. 13/939,002, dated May 22, 2014, 2 pages.
"Corrected Notice of Allowance", U.S. Appl. No. 13/939,002, dated May 5, 2014, 2 pages.
"DR2PA", retrieved from <http://www.architainment.co.uk/wp-content/uploads/2012/08/DR2PA-AU-US-size-Data-Sheet-Rev-H_LOGO.pdf> on Sep. 17, 2012, Jan. 2012, 4 pages.
"Final Office Action", U.S. Appl. No. 13/471,001, dated Jul. 25, 2013, 20 pages.
"Final Office Action", U.S. Appl. No. 13/471,139, dated Sep. 16, 2013, 13 pages.
"Final Office Action", U.S. Appl. No. 13/471,336, dated Aug. 28, 2013, 18 pages.
"Final Office Action", U.S. Appl. No. 13/564,520, dated Jan. 15, 2014, 7 pages.
"Final Office Action", U.S. Appl. No. 13/651,195, dated Apr. 18, 2013, 13 pages.
"Final Office Action", U.S. Appl. No. 13/651,232, dated May 21, 2013, 21 pages.
"Final Office Action", U.S. Appl. No. 13/651,287, dated May 3, 2013, 16 pages.
"Final Office Action", U.S. Appl. No. 13/651,976, dated Jul. 25, 2013, 21 pages.
"Final Office Action", U.S. Appl. No. 13/653,321, dated Aug. 2, 2013, 17 pages.
"Final Office Action", U.S. Appl. No. 13/653,682, dated Jun. 11, 2014, 11 pages.
"Final Office Action", U.S. Appl. No. 13/653,682, dated Oct. 18, 2013, 16 pages.
"Final Office Action", U.S. Appl. No. 13/656,055, dated Oct. 23, 2013, 14 pages.
"Final Office Action", U.S. Appl. No. 13/780,228, dated Mar. 28, 2014, 13 pages.
"Final Office Action", U.S. Appl. No. 13/852,848, dated Jul. 20, 2015, 9 pages.
"Final Office Action", U.S. Appl. No. 13/938,930, dated Nov. 8, 2013, 10 pages.
"Final Office Action", U.S. Appl. No. 13/939,002, dated Nov. 8, 2013, 7 pages.
"Final Office Action", U.S. Appl. No. 13/939,032, dated Dec. 20, 2013, 5 pages.
"Final Office Action", U.S. Appl. No. 14/063,912, dated Apr. 29, 2014, 10 pages.
"Final Office Action", U.S. Appl. No. 14/199,924, dated May 6, 2014, 5 pages.
"FingerWorks Installation and Operation Guide for the TouchStream ST and TouchStream LP", FingerWorks, Inc. Retrieved from <http://ec1.images-amazon.com/media/i3d/01/A/man-migrate/MANUAL000049862.pdf>, 2002, 14 pages.
"First One Handed Fabric Keyboard with Bluetooth Wireless Technology", Retrieved from: <http://press.xtvworld.com/article3817.html> on May 8, 2012, Jan. 6, 2005, 2 pages.
"Force and Position Sensing Resistors: An Emerging Technology", Interlink Electronics, Available at <http://staff.science.uva.nl/~vlaander/docu/FSR/An_Exploring_Technology.pdf>, Feb. 1990, pp. 1-6.
"Foreign Office Action", CN Application No. 201320097066.8, dated Oct. 24, 2013, 5 Pages.
"Foreign Office Action", CN Application No. 201320328022.1, dated Feb. 17, 2014, 4 Pages.
"Foreign Office Action", CN Application No. 201320328022.1, dated Oct. 18, 2013, 3 Pages.
"Frogpad Introduces Weareable Fabric Keyboard with Bluetooth Technology", Retrieved from: <http://www.geekzone.co.nz/content.asp?contentid=3898> on May 7, 2012, Jan. 7, 2005, 3 pages.
"I-Blason Spring Series Premium Flexible KickStand Anti-Slippery TPU Cover Case for iPhone 4 4S (White)", Retrieved From: <http://www.amazon.com/i-Blason-Premium-Flexible-KickStand-Anti-Slippery/dp/B007LCLXLU> Jun. 12, 2014, Nov. 30, 2012, 4 Pages.
"I-Interactor electronic pen", Retrieved from: <http://www.alibaba.com/product-gs/331004878/i_Interactor_electronic_pen.html> on Jun. 19, 2012, 2012, 5 pages.
"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 2012, 4 pages.
"International Preliminary Report on Patentability", Application No. PCT/US2014/031531, dated Jun. 9, 2015, 7 pages.
"International Search Report and Written Opinion", Application No. PCT/US2014/031531, dated Jun. 20, 2014, 10 Pages.
"International Search Report and Written Opinion", Application No. PCT/US2015/031271, dated Sep. 2, 2015, 10 pages.
"International Search Report and Written Opinion", Application No. PCT/US2013/028948, dated Jun. 21, 2013, 11 pages.
"International Search Report and Written Opinion", Application No. PCT/US2013/029461, dated Jun. 21, 2013, 11 pages.
"International Search Report and Written Opinion", Application No. PCT/US2013/040968, dated Sep. 5, 2013, 11 pages.
"International Search Report and Written Opinion", Application No. PCT/US2015/052757, dated Dec. 4, 2015, 12 pages.
"International Search Report and Written Opinion", Application No. PCT/US2013/042550, dated Sep. 24, 2013, 14 pages.
"Membrane Keyboards & Membrane Keypads", Retrieved from: <http://www.pannam.com/> on May 9, 2012, May 4, 2009, 2 pages.
"Motion Sensors", Android Developers—retrieved from <http://developer.android.com/guide/topics/sensors/sensors_motion.html> on May 25, 2012, 2012, 7 pages.
"MPC Fly Music Production Controller", AKAI Professional, Retrieved from: <http://www.akaiprompc.com/mpc-fly> on Jul. 9, 2012, 4 pages.
"New Friction Hinge for iPad Flip Stands", Retrieved From: http://www.nclosures.com/new-friction-hinge-design/, Jun. 18, 2013, 2 Pages.

(56) References Cited

OTHER PUBLICATIONS

"NI Releases New Maschine & Maschine Mikro", Retrieved from <http://www.djbooth.net/index/dj-equipment/entry/ni-releases-new-maschine-mikro/> on Sep. 17, 2012, 19 pages.
"Non-Final Office Action", U.S. Appl. No. 13/599,635, dated Feb. 25, 2014, 13 pages.
"Non-Final Office Action", U.S. Appl. No. 13/468,918, dated Dec. 26, 2013, 18 pages.
"Non-Final Office Action", U.S. Appl. No. 13/471,001, dated Feb. 19, 2013, 15 pages.
"Non-Final Office Action", U.S. Appl. No. 13/471,001, dated Jun. 17, 2014, 23 pages.
"Non-Final Office Action", U.S. Appl. No. 13/471,030, dated May 15, 2014, 10 pages.
"Non-Final Office Action", U.S. Appl. No. 13/471,054, dated Jun. 3, 2014, 15 pages.
"Non-Final Office Action", U.S. Appl. No. 13/471,139, dated Mar. 21, 2013, 12 pages.
"Non-Final Office Action", U.S. Appl. No. 13/471,186, dated Feb. 27, 2014, 8 pages.
"Non-Final Office Action", U.S. Appl. No. 13/471,202, dated Feb. 11, 2013, 10 pages.
"Non-Final Office Action", U.S. Appl. No. 13/471,237, dated Mar. 24, 2014, 7 pages.
"Non-Final Office Action", U.S. Appl. No. 13/471,336, dated Jan. 18, 2013, 14 pages.
"Non-Final Office Action", U.S. Appl. No. 13/471,336, dated May 7, 2014, 17 pages.
"Non-Final Office Action", U.S. Appl. No. 13/471,376, dated Apr. 2, 2014, 17 pages.
"Non-Final Office Action", U.S. Appl. No. 13/471,405, dated Feb. 20, 2014, 37 pages.
"Non-Final Office Action", U.S. Appl. No. 13/492,232, dated Apr. 30, 2014, 9 pages.
"Non-Final Office Action", U.S. Appl. No. 13/527,263, dated Apr. 3, 2014, 6 pages.
"Non-Final Office Action", U.S. Appl. No. 13/527,263, dated Jul. 19, 2013, 5 pages.
"Non-Final Office Action", U.S. Appl. No. 13/563,435, dated Jun. 14, 2013, 6 pages.
"Non-Final Office Action", U.S. Appl. No. 13/564,520, dated Feb. 14, 2014, 5 pages.
"Non-Final Office Action", U.S. Appl. No. 13/564,520, dated Jun. 19, 2013, 8 pages.
"Non-Final Office Action", U.S. Appl. No. 13/564,520, dated Jun. 16, 2014, 5 pages.
"Non-Final Office Action", U.S. Appl. No. 13/565,124, dated Jun. 17, 2013, 5 pages.
"Non-Final Office Action", U.S. Appl. No. 13/651,195, dated Jan. 2, 2013, 14 pages.
"Non-Final Office Action", U.S. Appl. No. 13/651,232, dated Jan. 17, 2013, 15 pages.
"Non-Final Office Action", U.S. Appl. No. 13/651,232, dated Dec. 5, 2013, 15 pages.
"Non-Final Office Action", U.S. Appl. No. 13/651,272, dated Feb. 12, 2013, 10 pages.
"Non-Final Office Action", U.S. Appl. No. 13/651,287, dated Jan. 29, 2013, 13 pages.
"Non-Final Office Action", U.S. Appl. No. 13/651,304, dated Mar. 22, 2013, 9 pages.
"Non-Final Office Action", U.S. Appl. No. 13/651,327, dated Mar. 22, 2013, 6 pages.
"Non-Final Office Action", U.S. Appl. No. 13/651,726, dated Apr. 15, 2013, 6 pages.
"Non-Final Office Action", U.S. Appl. No. 13/651,871, dated Mar. 18, 2013, 14 pages.
"Non-Final Office Action", U.S. Appl. No. 13/651,871, dated Jul. 1, 2013, 5 pages.
"Non-Final Office Action", U.S. Appl. No. 13/651,976, dated Feb. 22, 2013, 16 pages.
"Non-Final Office Action", U.S. Appl. No. 13/651,976, dated Jun. 16, 2014, 23 pages.
"Non-Final Office Action", U.S. Appl. No. 13/653,321, dated Feb. 1, 2013, 13 pages.
"Non-Final Office Action", U.S. Appl. No. 13/653,682, dated Feb. 7, 2013, 11 pages.
"Non-Final Office Action", U.S. Appl. No. 13/653,682, dated Feb. 26, 2014, 10 pages.
"Non-Final Office Action", U.S. Appl. No. 13/653,682, dated Jun. 3, 2013, 14 pages.
"Non-Final Office Action", U.S. Appl. No. 13/656,055, dated Mar. 12, 2014, 17 pages.
"Non-Final Office Action", U.S. Appl. No. 13/656,055, dated Apr. 23, 2013, 11 pages.
"Non-Final Office Action", U.S. Appl. No. 13/780,228, dated Sep. 18, 2015, 19 pages.
"Non-Final Office Action", U.S. Appl. No. 13/780,228, dated Oct. 30, 2013, 12 pages.
"Non-Final Office Action", U.S. Appl. No. 13/852,848, dated Mar. 26, 2015, 7 pages.
"Non-Final Office Action", U.S. Appl. No. 13/938,930, dated Aug. 29, 2013, 9 pages.
"Non-Final Office Action", U.S. Appl. No. 13/939,002, dated Aug. 28, 2013, 6 pages.
"Non-Final Office Action", U.S. Appl. No. 13/939,002, dated Dec. 20, 2013, 5 pages.
"Non-Final Office Action", U.S. Appl. No. 13/939,032, dated Aug. 29, 2013, 7 pages.
"Non-Final Office Action", U.S. Appl. No. 14/063,912, dated Jan. 2, 2014, 10 pages.
"Non-Final Office Action", U.S. Appl. No. 14/199,924, dated Apr. 10, 2014, 6 pages.
"Non-Final Office Action", U.S. Appl. No. 14/200,595, dated Apr. 11, 2014, 4 pages.
"Non-Final Office Action", U.S. Appl. No. 14/225,250, dated Jun. 17, 2014, 5 pages.
"Non-Final Office Action", U.S. Appl. No. 14/225,276, dated Jun. 13, 2014, 6 pages.
"Non-Final Office Action", U.S. Appl. No. 14/277,240, dated Jun. 13, 2014, 6 pages.
"Non-Final Office Action", U.S. Appl. No. 14/281,905, dated Jul. 10, 2015, 6 pages.
"Notice of Allowance", U.S. Appl. No. 13/468,918, dated Jun. 17, 2014, 5 pages.
"Notice of Allowance", U.S. Appl. No. 13/470,633, dated Mar. 22, 2013, 7 pages.
"Notice of Allowance", U.S. Appl. No. 13/471,139, dated Mar. 17, 2014, 4 pages.
"Notice of Allowance", U.S. Appl. No. 13/471,202, dated May 28, 2013, 7 pages.
"Notice of Allowance", U.S. Appl. No. 13/471,237, dated May 12, 2014, 8 pages.
"Notice of Allowance", U.S. Appl. No. 13/563,435, dated Nov. 12, 2013, 5 pages.
"Notice of Allowance", U.S. Appl. No. 13/565,124, dated Dec. 24, 2013, 6 pages.
"Notice of Allowance", U.S. Appl. No. 13/651,195, dated Jul. 8, 2013, 9 pages.
"Notice of Allowance", U.S. Appl. No. 13/651,232, dated Apr. 25, 2014, 9 pages.
"Notice of Allowance", U.S. Appl. No. 13/651,272, dated May 2, 2013, 7 pages.
"Notice of Allowance", U.S. Appl. No. 13/651,287, dated May 2, 2014, 6 pages.
"Notice of Allowance", U.S. Appl. No. 13/651,304, dated Jul. 1, 2013, 5 pages.
"Notice of Allowance", U.S. Appl. No. 13/651,327, dated Jun. 11, 2013, 7 pages.
"Notice of Allowance", U.S. Appl. No. 13/651,726, dated May 31, 2013, 5 pages.
"Notice of Allowance", U.S. Appl. No. 13/651,871, dated Oct. 2, 2013, 7 pages.

(56) References Cited

OTHER PUBLICATIONS

"Notice of Allowance", U.S. Appl. No. 13/653,321, dated Dec. 18, 2013, 4 pages.
"Notice of Allowance", U.S. Appl. No. 13/852,848, dated Nov. 19, 2015, 4 pages.
"Notice of Allowance", U.S. Appl. No. 13/938,930, dated Feb. 20, 2014, 4 pages.
"Notice of Allowance", U.S. Appl. No. 13/939,002, dated Mar. 3, 2014, 4 pages.
"Notice of Allowance", U.S. Appl. No. 13/939,032, dated Apr. 3, 2014, 4 pages.
"Notice of Allowance", U.S. Appl. No. 14/018,286, dated May 23, 2014, 8 pages.
"Notice of Allowance", U.S. Appl. No. 14/199,924, dated Jun. 10, 2014, 4 pages.
"Notice to Grant", CN Application No. 201320097089.9, dated Sep. 29, 2013, 2 Pages.
"Notice to Grant", CN Application No. 201320097124.7, dated Oct. 8, 2013, 2 pages.
"Position Sensors", Android Developers—retrieved from <http://developer.android.com/guide/topics/sensors/sensors_position.html> on May 25, 2012, 5 pages.
"Reflex LCD Writing Tablets", retrieved from <http://www.kentdisplays.com/products/lcdwritingtablets.html> on Jun. 27, 2012, 3 pages.
"Restriction Requirement", U.S. Appl. No. 13/468,918, dated Nov. 29, 2013, 6 pages.
"Restriction Requirement", U.S. Appl. No. 13/471,139, dated Jan. 17, 2013, 7 pages.
"Restriction Requirement", U.S. Appl. No. 13/595,700, dated May 28, 2014, 6 pages.
"Restriction Requirement", U.S. Appl. No. 13/651,304, dated Jan. 18, 2013, 7 pages.
"Restriction Requirement", U.S. Appl. No. 13/651,726, dated Feb. 22, 2013, 6 pages.
"Restriction Requirement", U.S. Appl. No. 13/651,871, dated Feb. 7, 2013, 6 pages.
"Restriction Requirement", U.S. Appl. No. 14/502,867, dated Feb. 16, 2016, 7 pages.
"Smart Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>, 2009, 2 pages.
"SolRxTM E-Series Multidirectional Phototherapy ExpandableTM 2-Bulb Full Body Panel System", Retrieved from: <http://www.solarcsystems.com/us_multidirectional_uv_light_therapy_1_intro.html > on Jul. 25, 2012, 2011, 4 pages.
"Supplemental Notice of Allowance", U.S. Appl. No. 13/653,321, dated Mar. 28, 2014, 4 pages.
"Supplemental Notice of Allowance", U.S. Appl. No. 14/018,286, dated Jun. 11, 2014, 5 pages.
"Supplementary Euorpean Search Report", EP Application No. 13728568.0, dated Oct. 30, 2015, 7 pages.
"Teach Me Simply", Retrieved From: <http://techmesimply.blogspot.in/2013/05/yugatech_3.html> on Nov. 22, 2013, May 3, 2013, pp. 1-6.
"The Microsoft Surface Tablets Comes With Impressive Design and Specs", Retrieved from <http://microsofttablereview.com/the-microsoft-surface-tablets-comes-with-impressive-design-and-specs> on Jan. 30, 2013, Jun. 30, 2012, 2 pages.
"The New Lenovo Yoga Tablet 8", Retrieved From:<http://www.pricepanda.co.in/lenovo-yoga-tablet-8-pid1529091/> Jun. 11, 2014, 2014, 2 Pages.
"Tilt Shift Lenses: Perspective Control", retrieved from http://www.cambridgeincolour.com/tutorials/tilt-shift-lenses1.htm, Mar. 28, 2008, 11 Pages.
"Virtualization Getting Started Guide", Red Hat Enterprise Linux 6, Edition 0.2—retrieved from <http://docs.redhat.com/docs/en-US/Red_Hat_Enterprise_Linux/6/html-single/Virtualization_Getting_Started_Guide/index.html> on Jun. 13, 2012, 24 pages.
"Welcome to Windows 7", Retrieved from: <http://www.microsoft.com/en-us/download/confirmation.aspx?id=4984> on Aug. 1, 2013, Sep. 16, 2009, 3 pages.
"What is Active Alignment?", http://www.kasalis.com/active_alignment.html, retrieved on Nov. 22, 2012, Nov. 22, 2012, 2 Pages.
Arar,"HP Envy Rove: A Movable (If Underpowered) All-In-One PC", Retrieved From: <http://www.pcworld.com/article/2047032/hp-envy-rove-a-movable-if-underpowered-all-in-one-pc.html> Jun. 11, 2014, Aug. 21, 2013, 6 Pages.
Block,"DeviceOrientation Event Specification", W3C, Editor's Draft, retrieved from <https://developer.palm.com/content/api/dev-guide/pdk/accessing-device-sensors.html> on May 25, 2012, Jul. 12, 2011, 14 pages.
Brown,"Microsoft Shows Off Pressure-Sensitive Keyboard", retrieved from <http://news.cnet.com/8301-17938_105-10304792-1.html> on May 7, 2012, Aug. 6, 2009, 2 pages.
Butler,"SideSight: Multi-"touch" Interaction around Small Devices", In the proceedings of the 21st annual ACM symposium on User interface software and technology., retrieved from <http://research.microsoft.com/pubs/132534/sidesight_crv3.pdf> on May 29, 2012, Oct. 19, 2008, 4 pages.
Chavan,"Synthesis, Design and Analysis of a Novel Variable Lift Cam Follower System", In Proceedings: International Journal of Design Engineering, vol. 3, Issue 4, Inderscience Publishers, Jun. 3, 2010, 1 Page.
Crider,"Sony Slate Concept Tablet "Grows" a Kickstand", Retrieved from: <http://androidcommunity.com/sony-slate-concept-tablet-grows-a-kickstand-20120116/> on May 4, 2012, Jan. 16, 2012, 9 pages.
Das,"Study of Heat Transfer through Multilayer Clothing Assemblies: A Theoretical Prediction", Retrieved from <http://www.autexrj.com/cms/zalaczone_pliki/5_013_11.pdf>, Jun. 2011, 7 pages.
Dietz,"A Practical Pressure Sensitive Computer Keyboard", In Proceedings of UIST 2009, Oct. 2009, 4 pages.
Glatt,"Channel and Key Pressure (Aftertouch).", Retrieved from: <http://home.roadrunner.com/~jgglatt/tutr/touch.htm> on Jun. 11, 2012, 2012, 2 pages.
Hanlon,"ElekTex Smart Fabric Keyboard Goes Wireless", Retrieved from: <http://www.gizmag.com/go/5048/ > on May 7, 2012, Jan. 15, 2006, 5 pages.
Justin,"Seidio Active with Kickstand for the Galaxy SIII", Retrieved From: <http://www.t3chniq.com/seidio-active-with-kickstand-gs3/> on Nov. 22, 2013, Jan. 3, 2013, 5 Pages.
Kaur,"Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012, Jun. 21, 2010, 4 pages.
Khuntontong,"Fabrication of Molded Interconnection Devices by Ultrasonic Hot Embossing on Thin Polymer Films", IEEE Transactions on Electronics Packaging Manufacturing, vol. 32, No. 3, Jul. 2009, pp. 152-156.
Kraus,"HumanToolz Mobile Stand: A new iPad kickstand on Kickstarter", Retrieved From: www.technologytell.com/apple/100699/humantoolz-mobile-stand-a-new-ipad-kickstand-on-kickstarter, Jul. 31, 2012, 9 Pages.
Lahr,"Development of a Novel Cam-based Infinitely Variable Transmission", Proceedings: In Thesis of Master of Science in Mechanical Engineering, Virginia Polytechnic Institute and State University, Nov. 6, 2009, 91 pages.
Lambert,"Cam Design", In Proceedings: Kinematics and dynamics of Machine, University of Waterloo Department of Mechanical Engineering, Jul. 2, 2002, pp. 51-60.
Lee,"LED Light Coupler Design for a Ultra Thin Light Guide", Journal of the Optical Society of Korea, vol. 11, Issue.3, Retrieved from <http://opticslab.kongju.ac.kr/pdf/06.pdf>, Sep. 2007, 5 pages.
Linderholm,"Logitech Shows Cloth Keyboard for PDAs", Retrieved from: <http://www.pcworld.com/article/89084/logitech_shows_cloth_keyboard_for_pdas.html> on May 7, 2012, Mar. 15, 2002, 5 pages.
McLellan,"Eleksen Wireless Fabric Keyboard: a first look", Retrieved from: <http://www.zdnetasia.com/eleksen-wireless-fabric-keyboard-a-first-look-40278954.htm> on May 7, 2012, Jul. 17, 2006, 9 pages.

(56) References Cited

OTHER PUBLICATIONS

Park,"Hinge Mechanism with Multiple Preset", U.S. Appl. No. 14/502,867, filed Sep. 30, 2014., 71 pages.

Post,"E-Broidery: Design and Fabrication of Textile-Based Computing", IBM Systems Journal, vol. 39, Issue 3 & 4, Jul. 2000, pp. 840-860.

Prospero,"Samsung Outs Series 5 Hybrid PC Tablet", Retrieved from: <http://blog.laptopmag.com/samsung-outs-series-5-hybrid-pc-tablet-running-windows-8> on Oct. 31, 2013, Jun. 4, 2012, 7 pages.

Purcher,"Apple Designs a Future Built-In Stand for the iPad & More", Retrieved From: <http://www.patentlyapple.com/patently-apple/2011/02/apple-designs-a-future-built-in-stand-for-the-ipad-more.html> Jun. 11, 2014, Feb. 13, 2011, 9 pages.

Purcher,"Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012, Retrieved from: <http://www.patentlyapple.com/patently-apple/2012/01/apple-is-paving-the-way-for-a-new-3d-gui-for-ios-devices.html> on Jun. 4, 12, Jan. 12, 2012, 15 pages.

Qin,"pPen: Enabling Authenticated Pen and Touch Interaction on Tabletop Surfaces", In Proceedings of ITS 2010—Available at <http://www.dfki.de/its2010/papers/pdf/po172.pdf>, Nov. 2010, pp. 283-284.

Sanap,"Design and Analysis of Globoidal Cam Index Drive", Proceedings: In International Journal of Scientific Research Engineering & Technology, Jun. 2013, 6 Pages.

Siddiqui,"Hinge Mechanism for Rotatable Component Attachment", U.S. Appl. No. 13/852,848, filed Mar. 28, 2013, 51 pages.

Siddiqui,"Multistage Friction Hinge", U.S. Appl. No. 14/755,734, filed Jun. 30, 2015, 50 pages.

Smith,"Quirky Cloak iPad Case Review", Retrieved From: http://notebooks.com/2011/02/03/quirky-cloak-ipad-case-review/, Feb. 3, 2011, 5 Pages.

Sumimoto,"Touch & Write: Surface Computing With Touch and Pen Input", Retrieved from: <http://www.gottabemobile.com/2009/08/07/touch-write-surface-computing-with-touch-and-pen-input/> on Jun. 19, 2012, Aug. 7, 2009, 4 pages.

Takamatsu,"Flexible Fabric Keyboard with Conductive Polymer-Coated Fibers", In Proceedings of Sensors 2011, Oct. 28, 2011, 4 pages.

Thurrott,"Surface Pro 3: Continuous Kickstand", Retrieved From: <http://winsupersite.com/mobile-devices/surface-pro-3-continuous-kickstand> Jun. 11, 2014, May 21, 2014, 5 Pages.

Valliath,"Design of Hologram for Brightness Enhancement in Color LCDs", Retrieved from <http://www.loreti.it/Download/PDF/LCD/44_05.pdf> on Sep. 17, 2012, May 1998, 5 pages.

Williams,"A Fourth Generation of LCD Backlight Technology", Retrieved from <http://cds.linear.com/docs/Application%20Note/an65f.pdf>, Nov. 1995, 124 pages.

Zhang,"Model-Based Development of Dynamically Adaptive Software", In Proceedings of ICSE 2006, Available at <http://www.irisa.fr/lande/lande/icse-proceedings/icse/p371.pdf>, May 20, 2006, pp. 371-380.

"International Preliminary Report on Patentability", Application No. PCT/US2016/037472, dated Aug. 23, 2017, 6 pages.

"Notice of Allowance", U.S. Appl. No. 14/755,734, dated Aug. 25, 2017, 9 pages.

"International Search Report and Written Opinion", Application No. PCT/US2017/024652, dated Jul. 10, 2017, 14 pages.

"Foreign Office Action", EP Application No. 14720018.2, dated Mar. 7, 2017, 7 pages.

"Non-Final Office Action", U.S. Appl. No. 14/755,734, dated May 8, 2017, 8 pages.

"Corrected Notice of Allowance", U.S. Appl. No. 14/502,867, dated May 26, 2016, 2 pages.

"Notice of Allowance", U.S. Appl. No. 14/502,867, dated May 16, 2016, 14 pages.

"Corrected Notice of Allowance", U.S. Appl. No. 14/502,867, dated Aug. 8, 2016, 2 pages.

"International Preliminary Report on Patentability", Application No. PCT/US2015/052757, dated Sep. 5, 2016, 7 pages.

"International Search Report and Written Opinion", Application No. PCT/US2016/037472, dated Sep. 2, 2016, 11 pages.

\* cited by examiner

HINGE WITH MULTIPLE PRESET POSITIONS

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on.

Because mobile computing devices are configured to be mobile, the devices are typically designed to be used in a handheld manner. Traditional ways of adapting mobile devices for other uses (e.g., on a table or other surface) tend to be awkward and detract from the mobile aesthetic associated with mobile devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A hinge with multiple preset positions is described. According to various embodiments, the hinge mechanism enables a support component to be adjustably attached to an apparatus, such as a computing device. In at least some embodiments, the hinge mechanism utilizes preset hinge positions that enable the support component to be placed at different preset positions. For instance, the hinge mechanism is configured such that an attached support component tends to "snap" into various preset positions. In at least some embodiments, the hinge mechanism includes an emergency escape position that enables the support component to be rotated beyond normal operating positions without damaging the support component.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
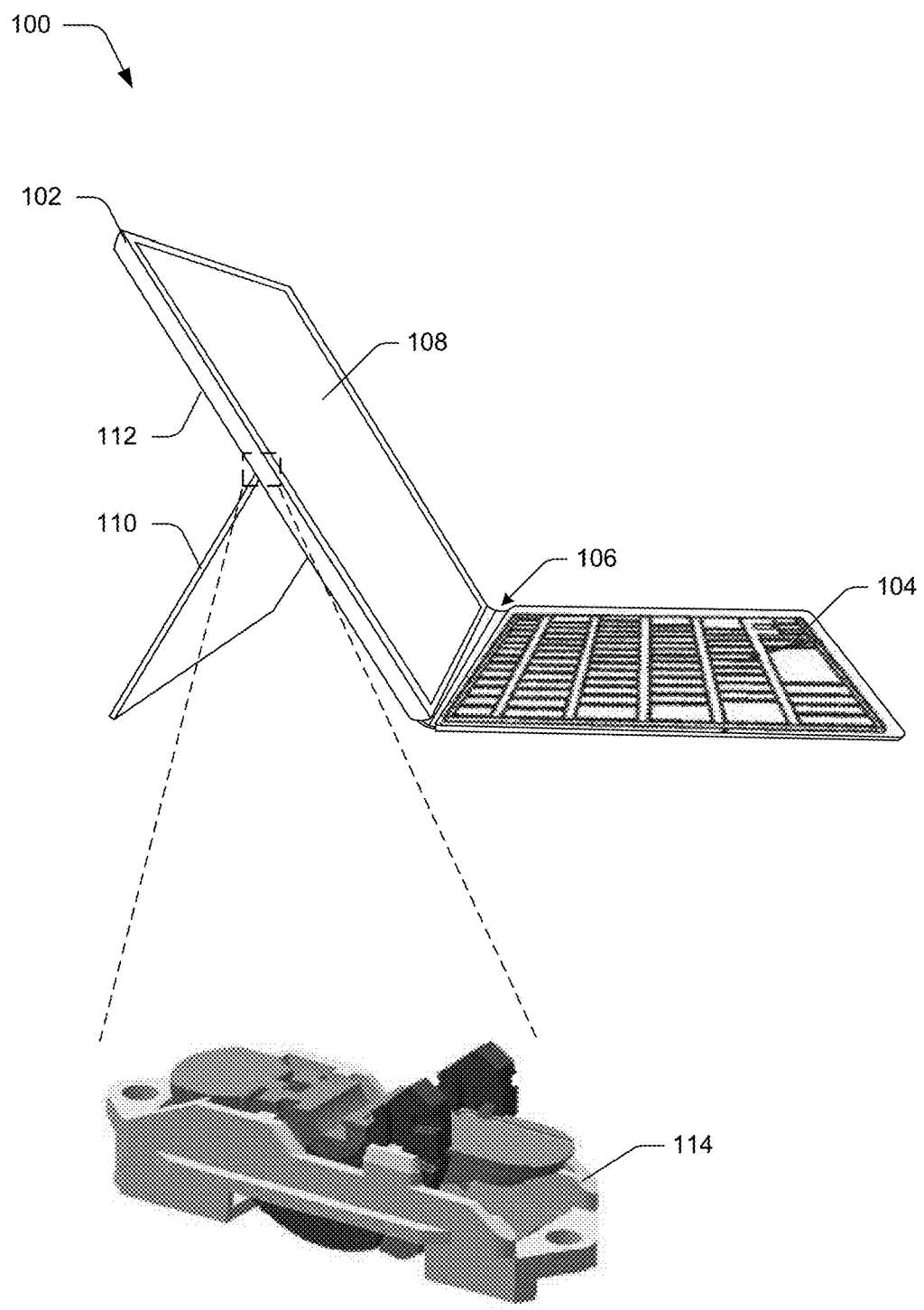
FIG. 1 is an illustration of an environment in an example implementation that is operable to employ the techniques described herein in accordance with one or more embodiments.

A hinge with multiple preset positions is described. In at least some implementations, the hinge mechanism enables a support component to be adjustably attached to an apparatus, such as a computing device. For example, the hinge mechanism can be employed to rotatably attach a support component (e.g., a "kickstand") to a mobile computing device. The support component can be rotated via the hinge mechanism to various positions to provide support for different orientations of the computing device.

In at least some implementations, a hinge mechanism utilizes preset hinge positions that enable a support component to be placed at different preset positions. Further, the hinge mechanism includes a center of rotation that is external to the hinge mechanism. Thus, the support component can conform to a contour of the computing device when in a closed position, and maintain a minimal external profile when moving between the different preset positions. According to various implementations, the hinge mechanism includes an emergency escape position that enables the support component to be rotated beyond normal operating positions without damaging the support component or detaching the support component from an associated device.

In at least some implementations, the hinge mechanism discussed herein is configured such that an attached support component tends to "snap" into various preset positions. Generally, snapping refers to movement of the hinge mechanism in response to force generated internally to the hinge mechanism, e.g., via a hinge spring and/or other component that provides elastic force for the hinge mechanism. In at least some implementations, snapping occurs when a user releases a support component, e.g., independent of user-applied force to the support component. For instance, torque forces that apply during movement of the hinge mechanism are such that the hinge mechanism typically does not rest at positions outside of the preset positions unless held there by a user. Thus, torque forces at work during movement of an attached support component provide a form of tactile feedback that indicates to a user whether the support component is positioned in a normal operating position, e.g., at a preset position for the hinge mechanism. Various attributes and components of example hinge mechanisms are presented in detail below.

In the following discussion, an example environment is first described that may employ the techniques described herein. Embodiments discussed herein are not limited to the example environment, and the example environment is not limited to embodiments discussed herein. Next, example device orientations and an example support component is described in accordance with one or more embodiments. Following this, example hinges for support component attachment are discussed in accordance with one or more embodiments. Finally, an example system and device are discussed that may implement various techniques described herein.

Example Environment

FIG. 1 is an illustration of an environment 100 in an example implementation that is operable to employ the techniques described herein. The illustrated environment 100 includes an example of a computing device 102 that is physically and communicatively coupled to an input device 104 via a flexible hinge 106. The computing device 102 may be configured in a variety of ways. For example, the computing device 102 may be configured for mobile use, such as a mobile phone, a tablet computer as illustrated, a wearable device, and so on.

While implementations presented herein are discussed in the context of a tablet device, it is to be appreciated that various other types and form factors of devices may be utilized in accordance with the claimed implementations. Thus, the computing device 102 may range from full resource devices with substantial memory and processor resources, to a low-resource device with limited memory and/or processing resources. An example implementation of the computing device 102 is discussed below with reference to FIG. 23.

In the illustrated example, the input device 104 is configured as having an input portion that includes a keyboard having a QWERTY arrangement of keys and track pad although other arrangements of keys are also contemplated. Further, other non-conventional configurations are also contemplated, such as a game controller, configuration to mimic a musical instrument, and so forth. Thus, the input device 104 and keys incorporated by the input device 104 may assume a variety of different configurations to support a variety of different functionality.

The computing device 102 further includes a display 108 and a support component 110. The display 108 is configured as a visual output functionality of the computing device 102. The support component 110 is rotatably and/or pivotably attached to a rear surface 112 of the computing device 102 via one or more instances of a hinge 114. For instance, the support component 110 is pivotable via the hinge 114 to different angles relative to the rear surface 112 to support different orientations of the computing device 102. An enlarged side view of the hinge 114 is presented here, and further attributes and implementations of the hinge 114 are detailed below. Consider now some example orientations of the computing device 102.

Example Device Orientations and Support Component

Figure 2:
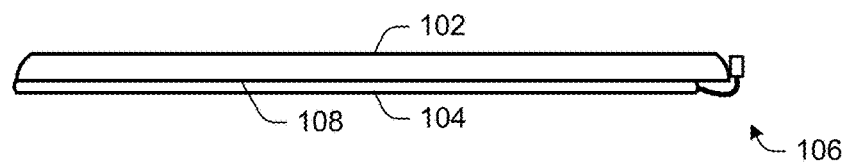
FIG. 2 depicts an example orientation of the input device in relation to the computing device as covering a display device of the computing device in accordance with one or more embodiments.

According to various embodiments, a variety of different orientations of the computing device 102 are supported. For example, rotational movement may be supported by the flexible hinge 106 such that the input device 104 may be placed against the display 108 of the computing device 102 and thereby act as a cover as shown in the example orientation 200 of FIG. 2. Thus, the input device 104 may act to protect the display 108 of the computing device 102 from harm.

Figure 3:
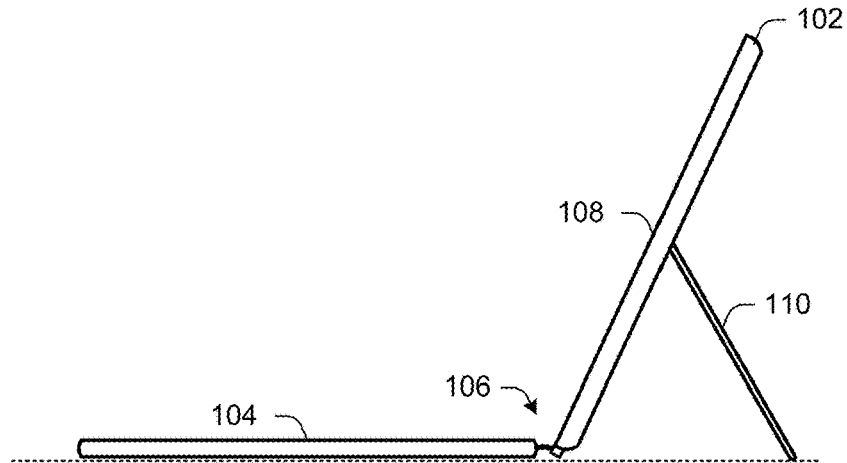
FIG. 3 depicts an example orientation of the input device in relation to the computing device as assuming a typing orientation in accordance with one or more embodiments.

As shown in the example orientation 300 of FIG. 3, a typing arrangement may be supported. In this orientation, the input device 104 is laid flat against a surface and the computing device 102 is disposed at an angle to permit viewing of the display 108, e.g., such as through use of the support component 110 disposed on the rear surface 112 of the computing device 102. The described support component can be employed as a support component to enable a variety of different orientations for the computing device 102. For instance, consider the following implementations of a support component in accordance with various embodiments.

Figure 4:
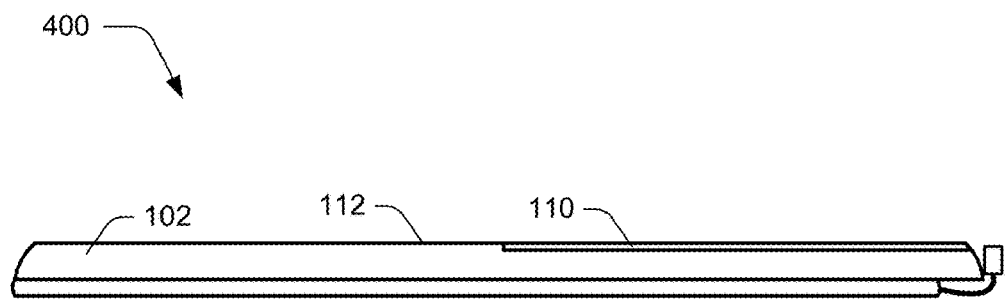
FIG. 4 depicts an example orientation of a computing device with a support component in accordance with one or more embodiments.

FIG. 4 depicts an orientation 400, and includes the support component 110 in a closed position. In the closed position, the support component 110 forms a portion of the rear surface 112 of the computing device 102 such that the support component 110 conforms to a surface contour of the computing device 102. For instance, when the support component 110 is in the closed position, the support component 110 integrates into the computing device 102 and does not protrude from a plane formed by the rear surface 112.

Figure 5:
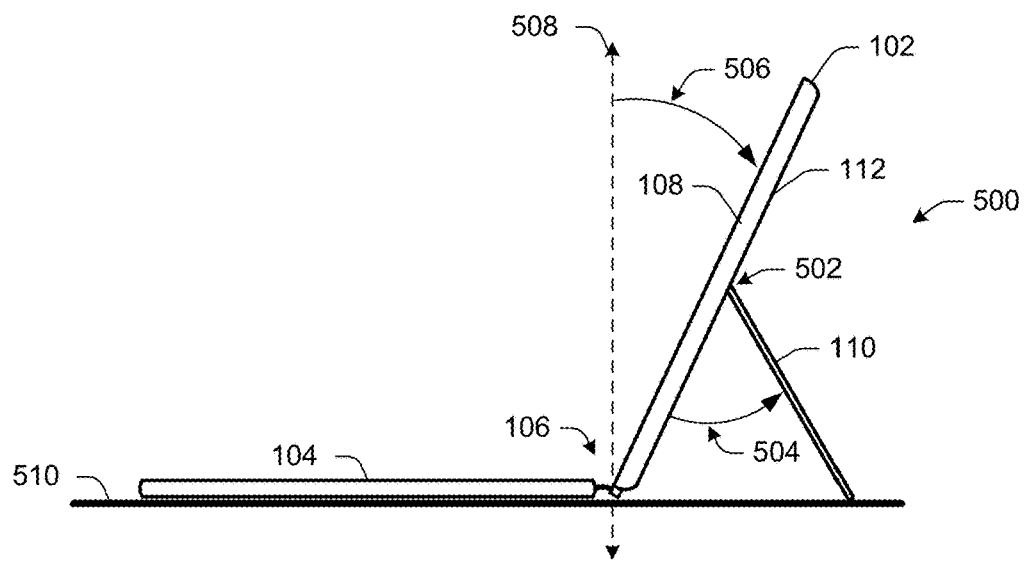
FIG. 5 depicts an example orientation of a computing device with a support component in accordance with one or more embodiments.

FIG. 5 depicts that the support component 110 can be rotated away from the rear surface 112 of the computing device 102 to a position 500. For instance, the support component 110 can be rotatably attached to the computing device 102 along a seam 502 via a hinge mechanism. Examples of such a hinge mechanism are detailed below.

In at least some implementations, the position 500 corresponds to a preset position for the support component 110. For instance, when a user applies pressure to the support component 110 away from the rear surface 112, the support component 110 can snap into the position 500. As detailed below, a hinge mechanism employed to attach the support component 110 to the computing device 102 can utilize spring pressure and detent settings to provide preset open positions for the support component 110. In this example, the position 500 is associated with an angle 504 between the rear surface of the computing device 102 and the support component 110. For instance, the angle 504 can range from 45 degrees (45°) to 55 degrees (55°). The angle 504, for example, is approximately 48°, +/−3°. Any suitable angle and/or range of angles may be employed, however.

According to various implementations, the position 500 places the front surface of the display 108 at an angle 506 relative to a vertical line 508. The vertical line 508, for instance, is normal (i.e., 90°) to a surface 510 on which the computing device 102 and the support component 110 are disposed. In this particular example, the angle 506 is approximately 24°, +/−3°. The angle 506, for instance, is one-half of the angle 504.

As illustrated, the input device 104 can be rotated away from the computing device 102 while the computing device 102 is supported by the support component 110. The position 500, for instance, enables the display 108 to be viewed and input to be provided to the computing device 102 via the input device 104. Alternatively or additionally, the position 500 enables a user to interact with a touchscreen portion of the display 108.

Figure 6:
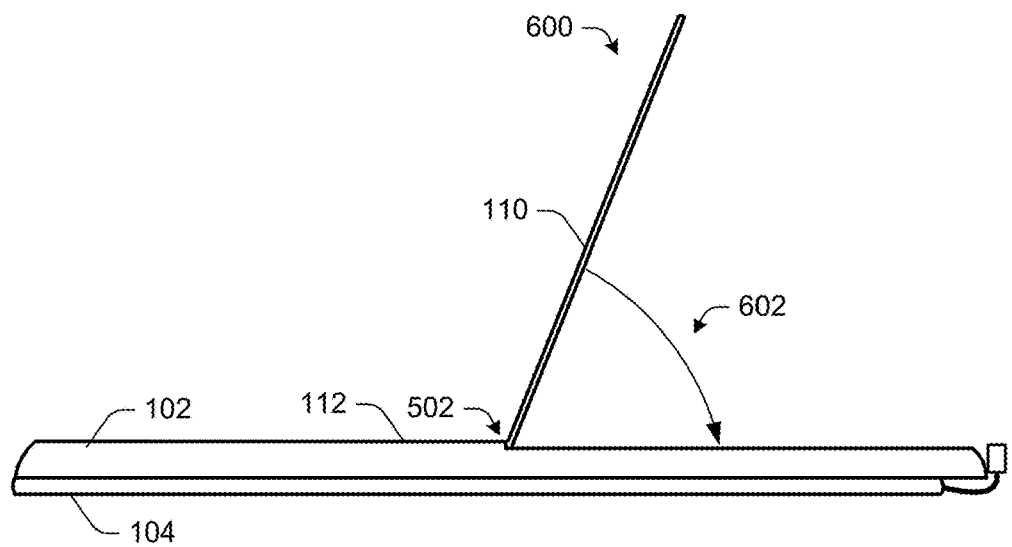
FIG. 6 depicts an example orientation of a computing device with a support component in accordance with one or more embodiments.

FIG. 6 depicts that the support component 110 can be rotated away from the rear surface 112 of the computing device 102 to a position 600. For instance, the support component 110 can be rotated further past the position 500 to the position 600.

In at least some implementations, the position 600 corresponds to a further preset position for the support component 110. For example, when a user applies pressure to the support component 110 away from the rear surface 112 (e.g., past the position 500), the support component 110 can snap into the position 600. In this example, the position 600 is associated with an angle 602 between the rear surface of the computing device 102 and the support component 110. For instance, the angle 602 can range from 80 degrees (80°) to 85 degrees (90°). The angle 602, for example, is approximately 84°, +/−4°. Any suitable angle and/or range of angles may be employed, however. Further, the seam 502 can be maintained (e.g., the width of the seam) during rotation to the position 600.

With the support component 110 in the position 600, the computing device 102 supports a variety of different usage scenarios. For instance, consider the following two example scenarios.

Figure 7A:
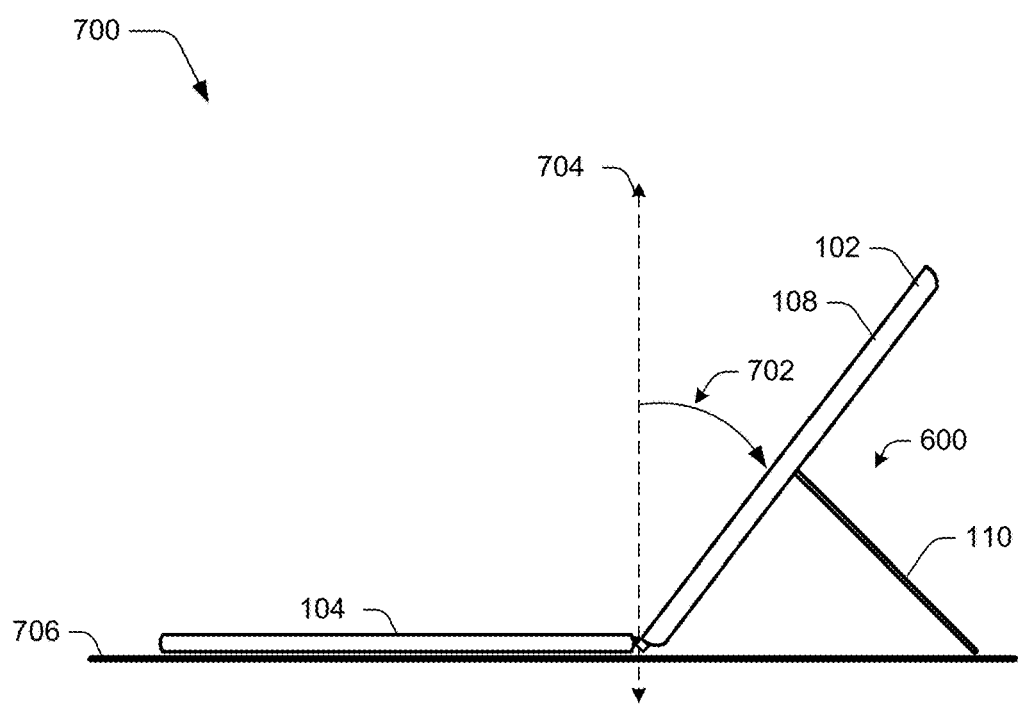
FIG. 7a depicts an example orientation of a computing device with a support component in accordance with one or more embodiments.

FIG. 7a depicts a side view of the computing device 102 in an orientation 700 and with the support component 110 positioned in the position 600. In the position 700, the computing device is reclined in comparison to previously-discussed orientations, such as the orientation 300 discussed above with reference to FIG. 3. As illustrated, the orientation 700 presents the display 108 at a more open angle that supports different usage scenarios. For instance, the orientation 700 supports use of the computing device 102 in a user's lap, such as during air travel. A variety of other usage scenarios are supported by the orientation 700, such as for tall users that may have a higher viewing angle, use on a low surface (e.g., a coffee table), and so forth.

According to various implementations, the orientation 700 places the front surface of the display 108 at an angle 702 relative to a vertical line 704. The vertical line 704, for instance, is normal (i.e., 90°) to a surface 706 on which the computing device 102 and the support component 110 are disposed. In this particular example, the angle 702 is approximately 42°, +/−5°. The angle 702, for instance, is one-half of the angle 602.

With the support component 110 in the position 600, the computing device 102 can also be rotated sideways (e.g., to a portrait viewing position) and supported via the support component 110. For instance, consider an orientation 708 illustrated in FIG. 7b.

Figure 7B:
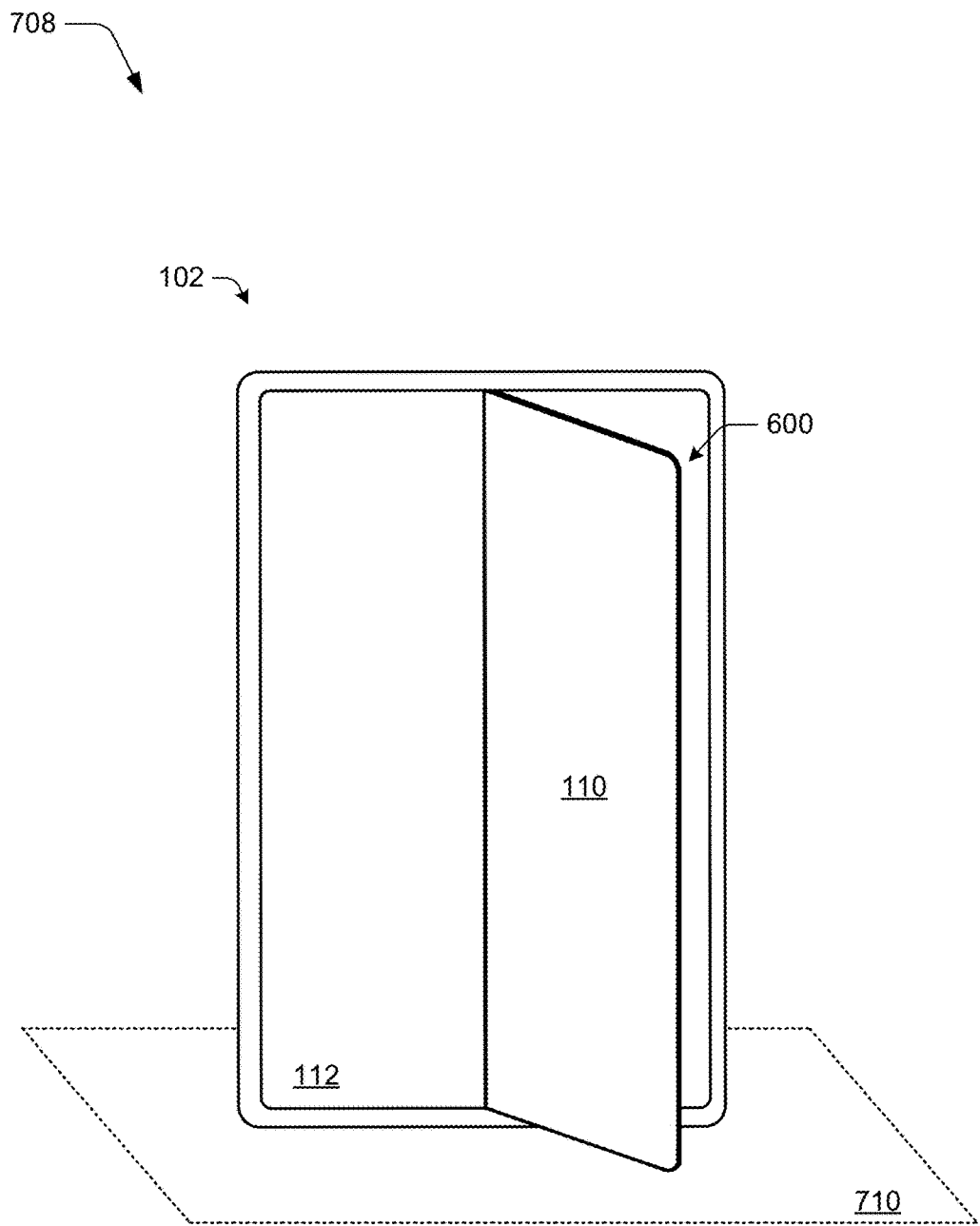
FIG. 7b depicts a rear view of an example orientation of a computing device with a support component in accordance with one or more embodiments.

FIG. 7b depicts a rear view of the computing device 102 in the orientation 708, showing that the computing device 102 is rotated to a portrait viewing position, such as 90 degrees (90°) to the orientation illustrated in FIG. 1. Further, the support component 110 is positioned in the position 600 such that the computing device 102 reclines back and is supported by the support component 110 on a surface 710.

According to various implementations, placing the computing device 102 in the orientation 708 can cause a view orientation of the display 108 to be rotated to a portrait view.

In FIG. 7b, the computing device 102 is illustrated without the input device 104. Thus, in at least some embodiments the input device 104 can be separated from the computing device 102 such that the computing device 102 has functionality independent of the input device 104. For example, the flexible hinge 106 can employ a magnetic attachment mechanism that holds the input device 104 to the computing device 102 via magnetic force. Thus, a user can grasp the computing device 102 and the input device 104, and can pull the two apart by overcoming the magnetic attraction between them.

When separate from the input device 104, the computing device 102 can provide various functionality. For example, a user can view content via the computing device 102, such as movies and/or streaming content. Further, a user can interact with touch screen functionality of the display 108.

Thus, placing the support component 110 in the position 600 can enable a user to place the computing device in a landscape and/or portrait orientation, and to view and/or interact with the computing device in such orientations.

Figure 8A:
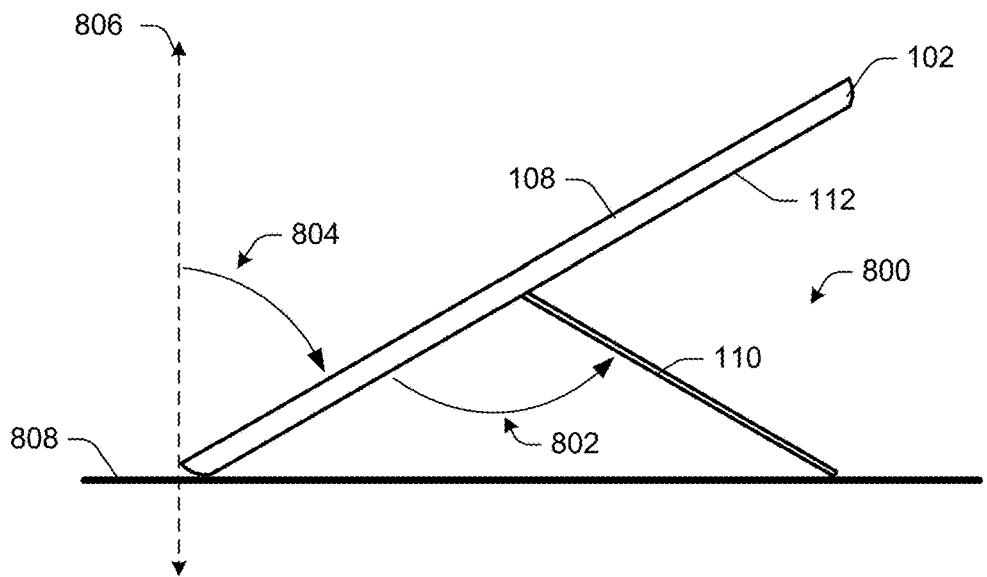
FIG. 8a depicts an example orientation of a computing device with a support component in accordance with one or more embodiments.

FIG. 8a depicts that the support component 110 can be rotated away from the rear surface 112 of the computing device 102 to a position 800. For instance, the support component 110 can be rotated further past the position 600 to the position 800.

In at least some implementations, the position 800 corresponds to a further preset position for the support component 110. For example, when a user applies pressure to the support component 110 away from the rear surface 112 (e.g., past the position 600), the support component 110 can snap into the position 800. In this example, the position 800 is associated with an angle 802 between the rear surface of the computing device 102 and the support component 110. For instance, the angle 802 can range from 113 degrees (113°) to 123 degrees (123°). The angle 602, for example, is approximately 118, +/−5°. Any suitable angle and/or range of angles may be employed, however.

According to various implementations, the position 800 places the front surface of the display 108 at an angle 804 relative to a vertical line 806. The vertical line 806, for instance, is normal (i.e., 90°) to a surface 808 on which the computing device 102 and the support component 110 are disposed. In this particular example, the angle 804 is approximately 59°, +/−5°. The angle 804, for instance, is one-half of the angle 802.

Figure 8B:
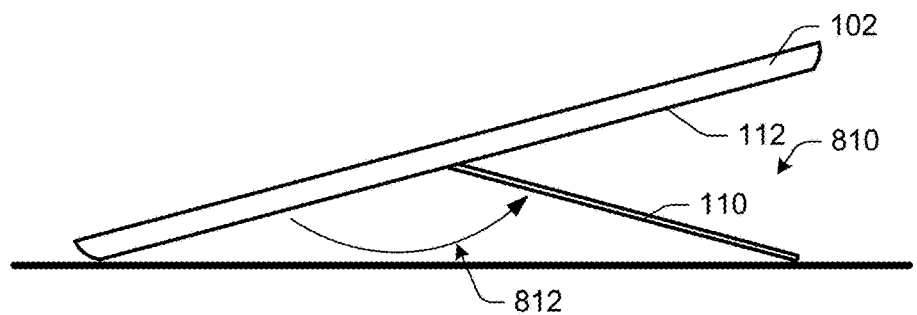
FIG. 8b depicts an example orientation of a computing device with a support component in accordance with one or more embodiments.

FIG. 8b depicts that the support component 110 can be rotated away from the rear surface 112 of the computing device 102 to a position 810. For instance, the support component 110 can be rotated further past the position 800 to the position 810.

In at least some implementations, the position 810 corresponds to a further preset position for the support component 110. For example, when a user applies pressure to the support component 110 away from the rear surface 112 (e.g., past the position 800), the support component 110 can snap into the position 810. In this example, the position 800 is associated with an angle 812 between the rear surface of the computing device 102 and the support component 110. For instance, the angle 812 can range from 145 degrees (145°) to 123 degrees (155°). The angle 812, for example, is approximately 150°, +/−5°. Any suitable angle and/or range of angles may be employed, however.

Figure 9:
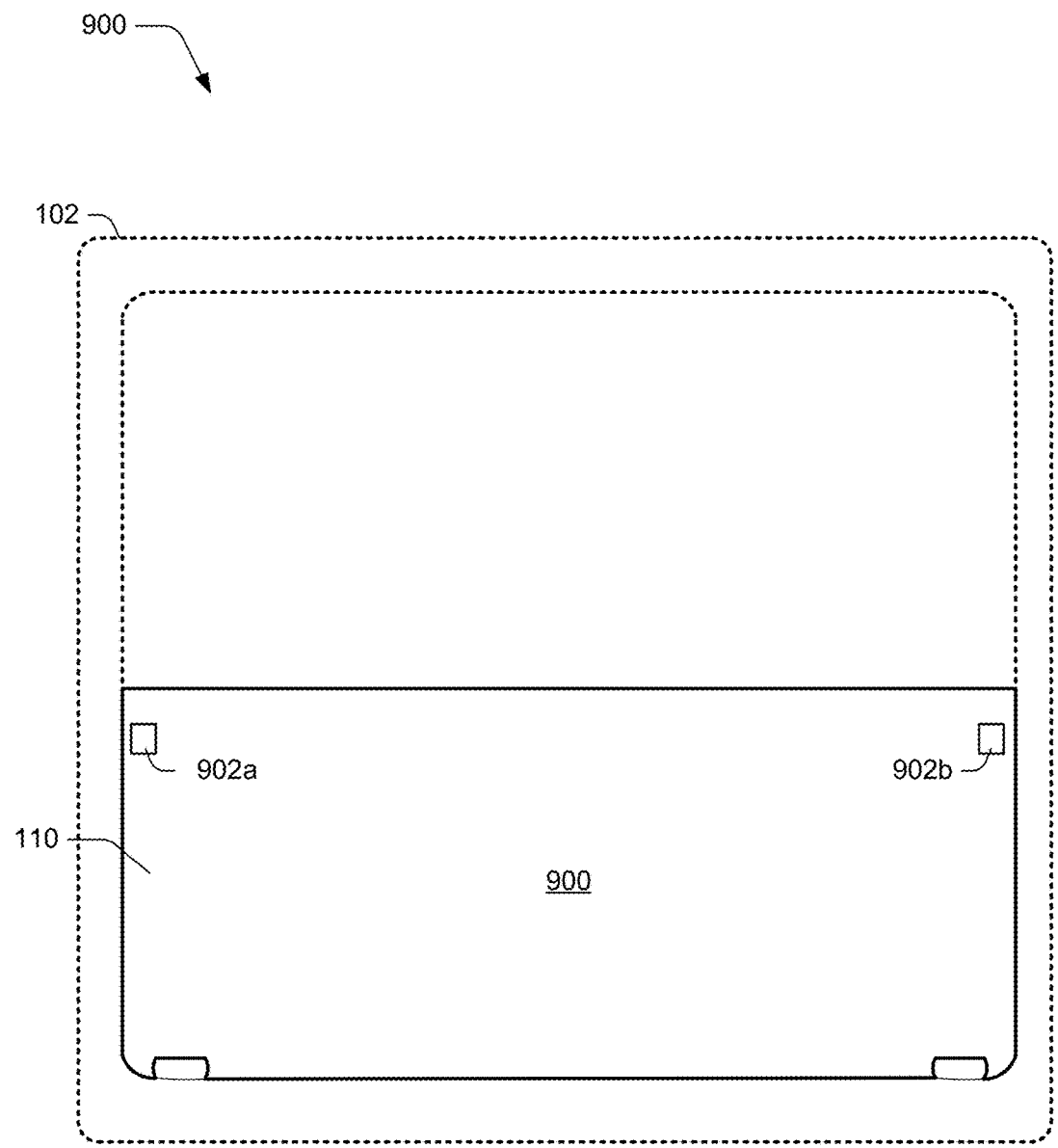
FIG. 9 depicts an example inner surface of a support component in accordance with one or more embodiments.

FIG. 9 depicts a view of an inner surface 900 of the support component 110 in accordance with one or more embodiments. In this example, the support component 110 is illustrated in the context of an outline of a chassis of the computing device 102. The inner surface 900 includes hinge mounts 902a, 902b, which function as mounting points for hinge mechanisms that are employed to attach the support component 110 to the computing device 102. Examples of such hinge mechanisms are discussed below.

Hinges for Component Attachment

A variety of different hinge mechanisms can be employed for attaching various components in accordance with various embodiments. Some example hinge mechanisms and hinge arrangements are discussed below.

Figure 10:
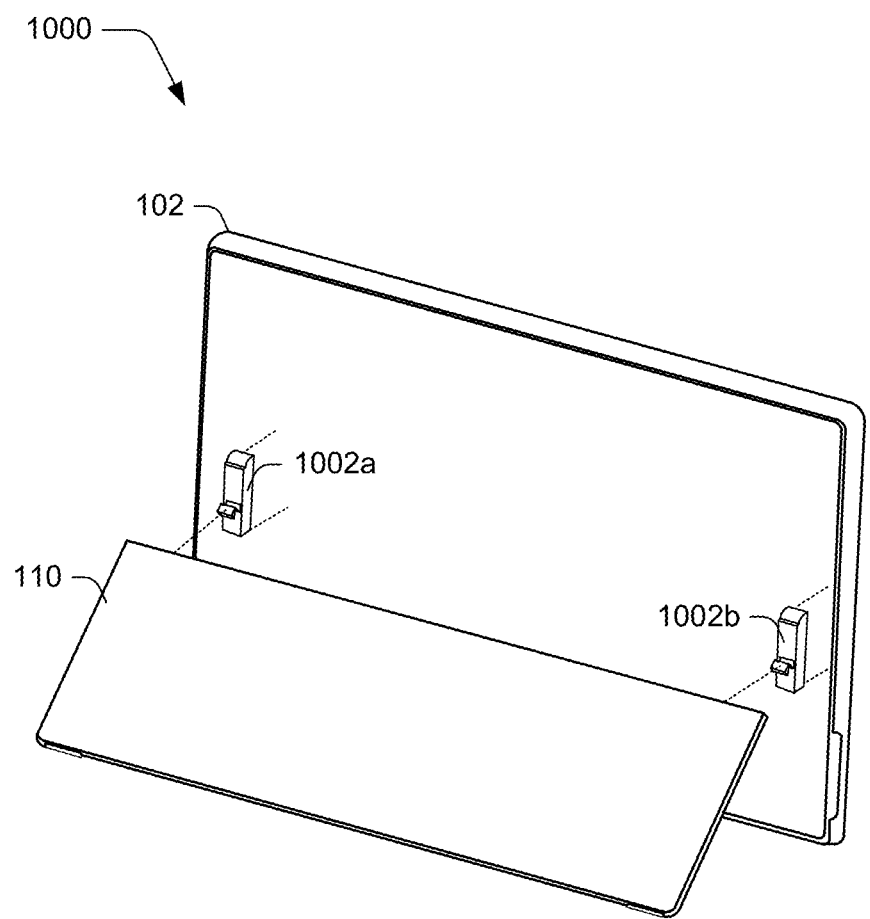
FIG. 10 depicts an example exploded view of a computing device with a support component in accordance with one or more embodiments.

FIG. 10 depicts an exploded rear view 1000 of a chassis of the computing device 102 and the support component 110. Included in the rear view 1000 are hinges 1002a and 1002b, which are employed to attach the support component 110 to the computing device 102. The hinges 1002a, 1002b are configured to be installed internally in the computing device 102, such as via a suitable attachment method and/or device. The hinges 1002a, 1002b, for instance, represent instances of the hinge 114 introduced with reference to FIG. 1.

The support component 110 can be attached to a pivoting portion of the hinges 1002a, 1002b via the hinge mounts 902a, 902b, discussed above with reference to FIG. 9. Thus, attachment to the hinges 1002a, 1002b enables the support component 110 to pivot between various positions with reference to the computing device 102.

Figure 11:
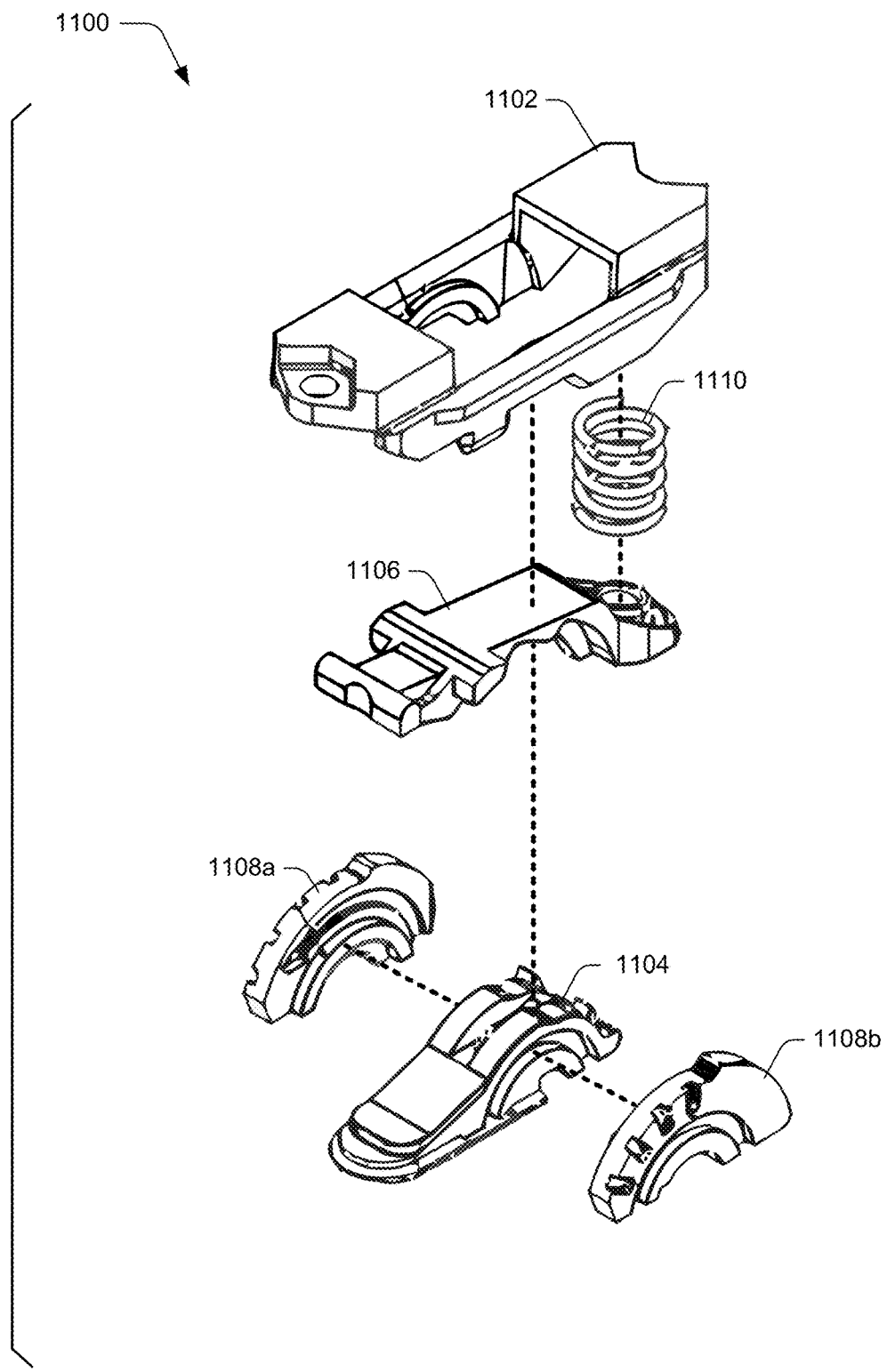
FIG. 11 depicts components of an example hinge mechanism in accordance with one or more embodiments.

FIG. 11 depicts components of an example hinge 1100 in accordance with one or more embodiments. The hinge 1100, for instance, can represent an implementation of the hinge 114 and/or the hinges 1002a, 1002b discussed above. This is not intended to be limiting, however, and the hinge 1100 can be employed as a hinge mechanism for a variety of different components and in a variety of different attachment scenarios. The hinge 1100 and its various components can be formed using any suitable material and/or combination of materials, such as metals, plastics, polymers, alloys, and so forth.

Components of the hinge 1100 include a hinge frame 1102 in which various other components of the hinge 1100 can be disposed. For example, the hinge frame 1102 can be mounted to and/or within a device (e.g., the computing device 102) and function as a support structure for other components of the hinge 1100.

Further included are a cam 1104, a cam follower 1106, a support plate 1108a, and a support plate 1108b. As detailed elsewhere herein, interaction between the cam 1104 and the cam follower 1106 within the hinge 1100 provides a particular responsiveness profile during user manipulation of a component attached to the hinge 1100, e.g., the support component 110. Further, the support plates 1108a, 1108b provide lateral support for the hinge 1100 in various open positions and enable the hinge 1100 to be positioned in various open positions.

The hinge 1100 also includes a hinge spring 1110, which applies pressure to the cam follower 1106 when the various components are placed in their respective positions within the hinge frame 1102. Further details concerning components and functionality of the hinge 1100 are now discussed.

Figure 12:
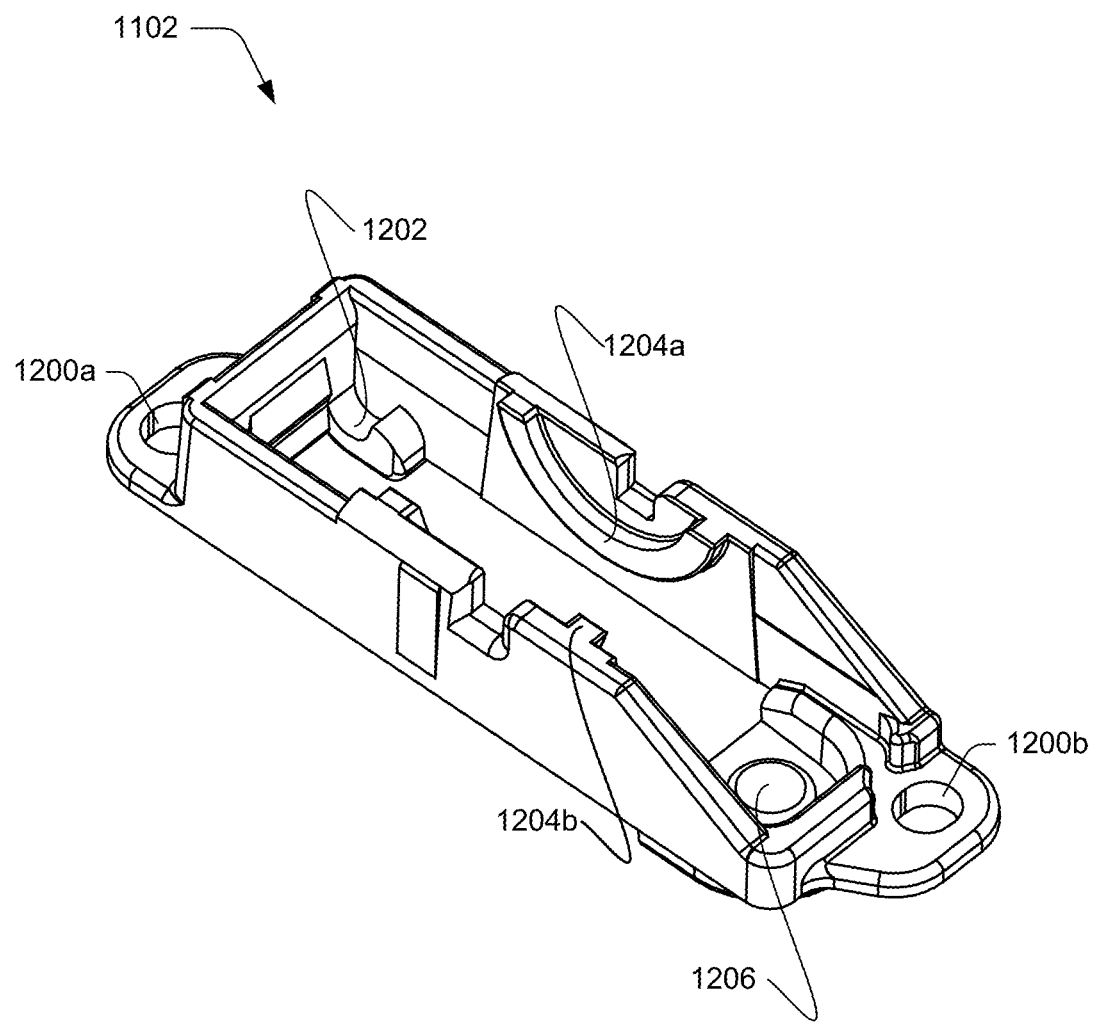
FIG. 12 depicts a detail of portions of a hinge frame in accordance with one or more embodiments.

FIG. 12 depicts a detail of portions of the hinge frame 1102. The view of the hinge frame 1102 presented in FIG. 12 is rotated 180 degrees relative to the view illustrated in FIG. 11. The hinge frame 1102 includes hinge mounts 1200a and 1200b by which the hinge frame 1102, and thus the hinge 1100, can be mounted to an apparatus. For instance, the hinge mounts 1200a, 1200b represent apertures through which a fastening mechanism such as a screw or bolt can be positioned and fastened into an apparatus, such as the computing device 102.

The hinge frame 1102 further includes a cam follower mount 1202 into which the cam follower 1106 can be mounted. While not expressly illustrated here, the cam follower mount 1202 includes a similar portion on the opposite inside surface of the hinge frame 1102, thus forming a cradle into which a mounting portion of the cam follower 1106 can be attached.

Plate guides 1204a, 1204b represent raised portions on the inside surface of the hinge frame 1102 which are employed for mounting the support plates 1108a, 1108b into the hinge frame 1102. For instance, the plate guides 1204a, 1204b represent raised portions (e.g., curved rails) that are mirror images of one another on opposite inside surfaces of the hinge frame 1102. Generally, the support plates 1108a, 1108b engage with the plate guides 1204a, 1204b to hold the support plates 1108a, 1108b within the hinge frame 1102. During movement of a component attached to the hinge 1100 between one or more open positions, the plate guides 1204a, 1204b cause rotational movement of the support plates 1108a, 1108b relative to the hinge frame 1102. As further illustrated herein, rotational movement of the support plates 1108a, 1108b enables an attached component to be positioned in various different positions.

The hinge frame 1102 further includes a spring mount 1206, which represents a surface onto which the hinge spring 1110 is placed. Generally, placement of the hinge spring 1110 onto the spring mount 1206 enables the hinge spring 1110 to exert pressure upon the cam follower 1106. Spring pressure on the cam follower 1106 holds the cam follower against the cam 1104 and thus enables the cam 1104 to be held in various preset positions.

Figure 13:
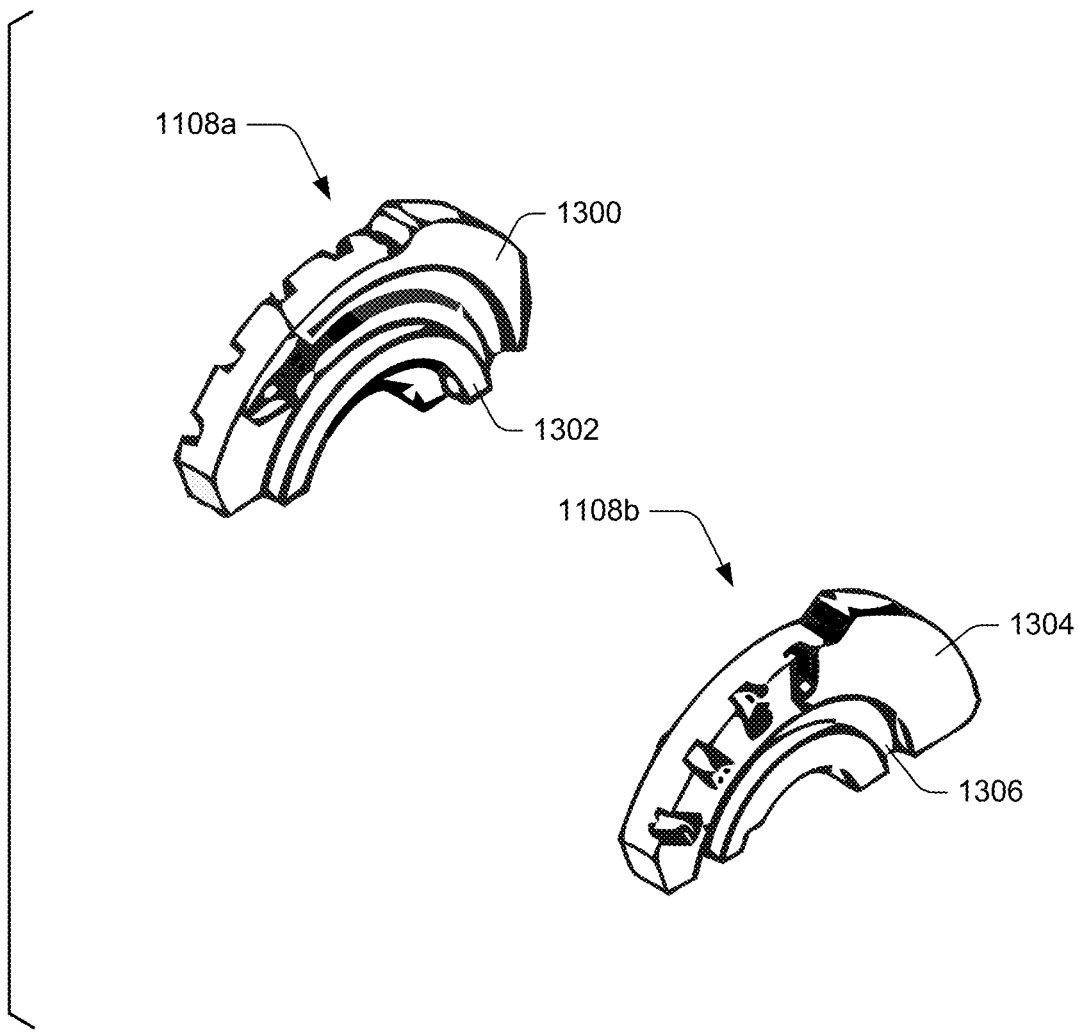
FIG. 13 depicts a detail of portions of example support plates in accordance with one or more embodiments.

FIG. 13 depicts a detail of portions of the support plates 1108a, 1108b. Illustrated as part of an inner support surface 1300 of the support plate 1108a is a cam guide 1302. Although not illustrated here, the support plate 1108b similarly includes a respective cam guide 1302 on its inner surface. Generally, the cam guides 1302 protrude from the surfaces of the respective support plates 1108a, 1108b and engage with the cam 1104 to moveably attach the cam 1104 to the hinge 1100. During movement of a component attached to the cam 1104, the cam guides 1302 enable rotational movement of the cam 1104 relative to the support plates 1108a, 1108b and the hinge frame 1102. As further illustrated herein, rotational movement of the cam 1104 enables an attached component to be placed in various positions.

An outer surface 1304 of the support plate 1108b includes a support channel 1306 that engages with the plate guide 1204b of the hinge frame 1102, introduced above. For instance, the dimensions of the support channel 1306 are such that the plate guide 1204b fits within the support channel 1306 when the support plate 1108b is mounted within the hinge frame 1102. During movement of the support plate 1108b relative to the hinge frame 1102, the support channel 1306 slides relative to the plate guide 1204b to enable rotational movement of the support plate 1108b relative to the hinge frame 1102. Although not illustrated here, an outer surface of the support plate 1108a similarly includes a respective plate channel 1306 that engages with the plate guide 1204a of the hinge frame 1102. Further features of the support plates 1108 are discussed below.

Figure 14:
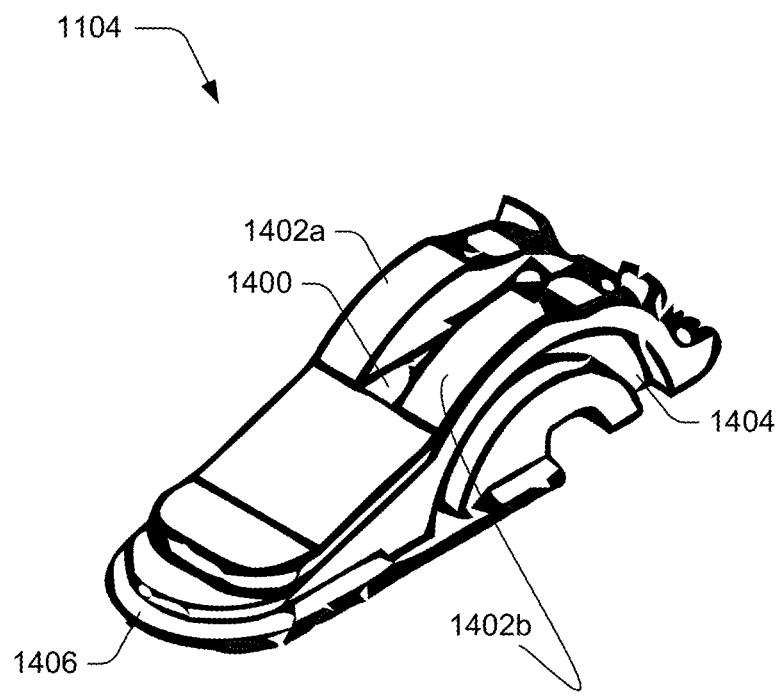
FIG. 14 depicts a detail of portions of a hinge cam in accordance with one or more embodiments.

FIG. 14 depicts example details of the cam 1104. The cam 1104 includes an inner cam surface 1400 and outer cam surfaces 1402a, 1402b. As illustrated, the inner cam surface 1400 is recessed in a channel along an inside portion of the cam 1104. The inner cam surface 1400, for instance, is positioned along center lengthwise axis of the cam 1104.

The outer cam surfaces 1402a, 1402b are positioned on either side of the inner cam surface 1400 and protrude above the inner cam surface 1400. According to various implementations, the outer cam surfaces 1402a, 1402b are mirror images of one another, and may be referred to herein as an outer cam surface 1402. As further detailed below, the inner cam surface 1400 and the outer cam surfaces 1402a, 1402b have specific surface profiles that interact with the cam follower 1106 to provide a particular response profile during movement of an attached component.

The cam 1104 further includes a cam channel 1404 and a component mounting portion 1406. The cam channel 1404 is formed such that when the cam 1104 is mounted within the hinge frame 1102 relative to the support plates 1108, the cam channel 1404 engages with the cam guide 1302 of the support plate 1108. Although not illustrated here, the opposite side of the cam 1104 includes a respective cam channel 1404. The dimensions of the cam guide 1302 of the support plate 1108, for instance, are such that the cam guide 1302 fits within the cam channel 1404. During movement of the cam 1104 relative to the hinge frame 1102, the cam channel 1404 slides relative to the cam guide 1302 to enable rotational movement of the cam 1104 relative to the support plates 1108a, 1108b.

The component mounting surface 1406 is representative of a portion of the cam 1104 to which a component (e.g., the support component 110) can be mounted. For instance, the component mounting surface 1406 includes surface attributes that engage and/or interlock with a component to stabilize the component relative to the cam 1104. Alternatively or additionally, the component mounting surface 1406 may include one or more apertures through which a fastening device such as a screw or bolt may be placed to fasten the hinge to a component.

Figure 15:
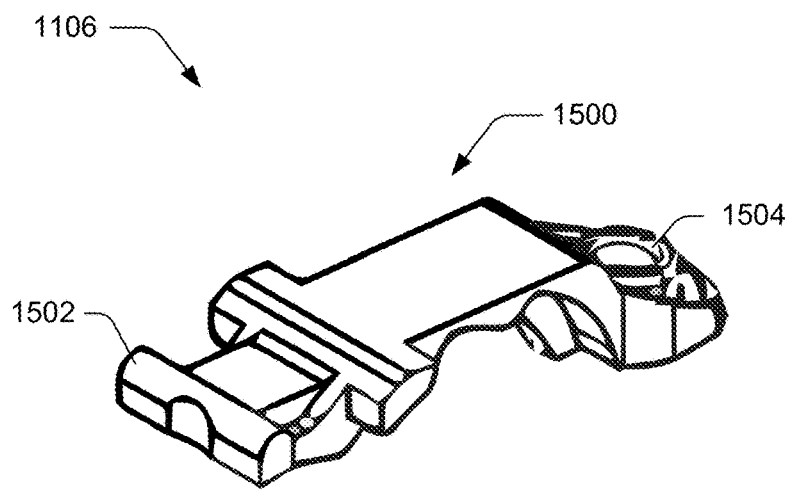
FIG. 15 depicts a detail of a top surface of a cam follower in accordance with one or more embodiments.

FIG. 15 depicts a detail of a top surface 1500 of the cam follower 1106. The top surface 1500 includes a follower pivot 1502 which is formed to engage within the cam follower mount 1202 (introduced above) of the hinge frame 1102. For instance, the follower pivot 1502 is fashioned such that the follower pivot slidably rotates within the cam follower mount 1202 during movement of various components of the hinge 1100.

The top surface 1500 of the cam follower 1106 further includes a spring platform 1504 which is configured to engage with the hinge spring 1110. For example, spring tension from the hinge spring 1110 against the spring platform 1504 holds the cam follower 1106 against the cam 1104. Thus, spring tension against the cam follower 1106 results in a reaction at the cam 1104 that provides a torque response at the cam 1104. As discussed herein, the torque response results at least in part from the shape of the cam 1104 and the cam follower 1106, and the interaction between their respective surfaces.

For instance, depending on the angular position of the cam 1104 and the direction of motion, movement of the cam 1104 may be either resisted (e.g., opposed) or driven. This interaction between the different elements of the hinge 1100 provides for a "snappy" response of an attached component, e.g., the support component 110.

Figure 16:
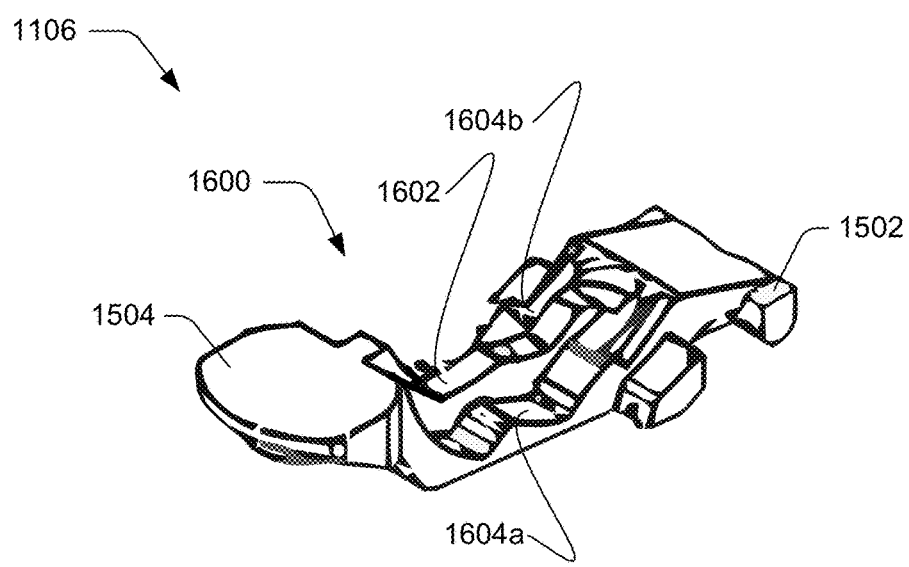
FIG. 16 depicts a detail of a bottom surface of a cam follower in accordance with one or more embodiments.

FIG. 16 depicts a detail of a bottom surface 1600 of the cam follower 1106. The bottom surface 1600 includes lower portions of the follower pivot 1502 and the spring platform 1504, introduced above.

The bottom surface 1600 further includes an inner follower surface 1602 and outer follower surfaces 1604a, 1604b. For purpose of discussion, the outer follower surfaces 1604a, 1604b may be referred to as an outer follower surface 1604. The inner follower surface 1602 protrudes from the bottom surface 1600 relative to the outer follower surfaces 1604a, 1604b. As detailed elsewhere herein, the inner follower surface 1602 and the outer follower surfaces 1604a, 1604b interact with surfaces of the cam 1104 to provide a particular torque response for a component attached to the hinge 1100.

Figure 17:
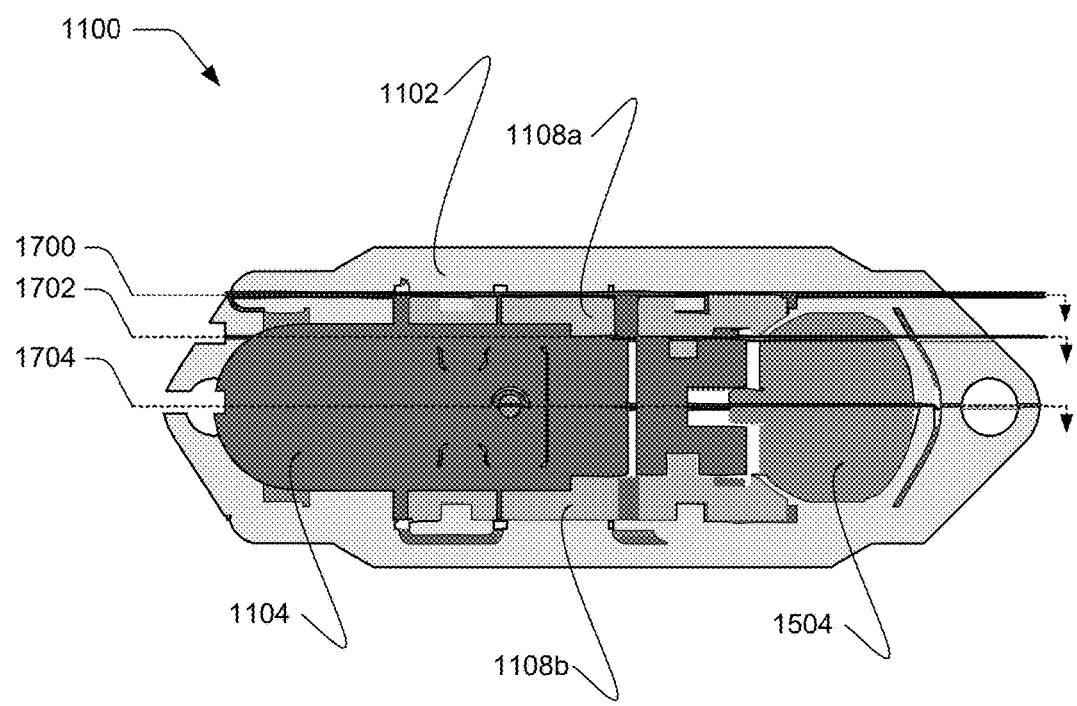
FIG. 17 depicts example cross-section regions of a hinge mechanism in accordance with one or more embodiments.

FIG. 17 depicts locations of vertical cross-sections of the hinge 1100 which will be used to describe function and attributes of the hinge 1100 in subsequent figures. Included are a first cross-section 1700, a second cross-section 1702, and a third cross-section 1704. Generally, these cross-sections define respective planes through the hinge 1100. Reference to these different cross-sections will be made in the subsequent discussion. Further illustrated are the hinge frame 1102, the cam 1104, the support plates 1108a, 1108b, and the bottom portion of the spring platform 1504 of the cam follower 1106.

Figure 18:
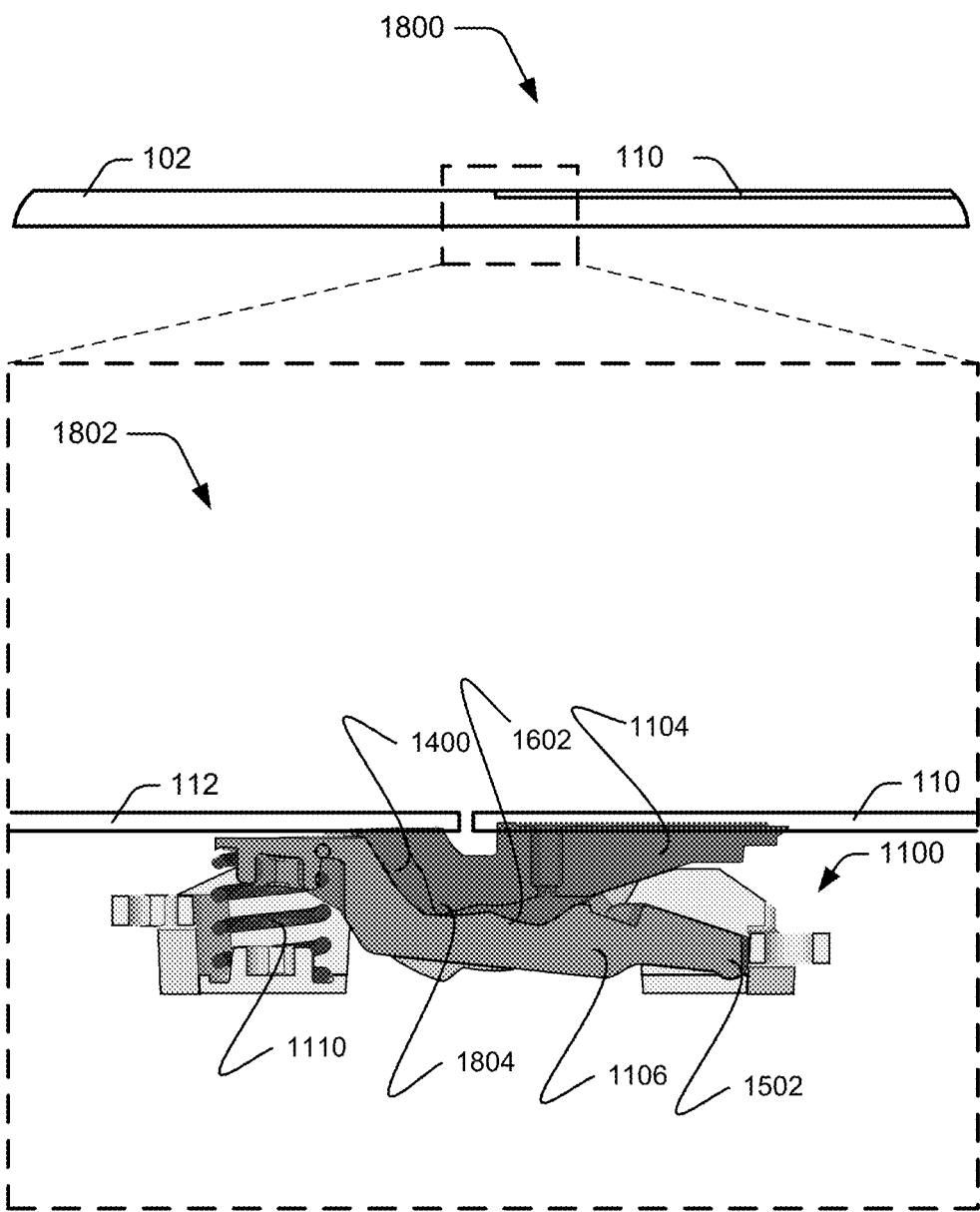
FIG. 18 depicts a computing device with a support component in a closed position in accordance with one or more embodiments.

FIG. 18 depicts the computing device 102 with the support component 110 in a position 1800. In at least some embodiments, the position 1800 corresponds to a closed position for the support component 110, such as the orientation 400 discussed above with reference to FIG. 4. Further illustrated is a partial side section view 1802 of the computing device 102, including the support component 110 attached to the cam 1104 of the hinge 1100 in a closed position. The section view 1802, for instance, corresponds to the cross-section 1704 illustrated above. In the partial side view 1802 and subsequent views presented in subsequent figures, the hinge 1100 is illustrated with the support component 110 and the portions of the rear surface 112 of the computing device 102, but without other portions of the computing device 102.

In the section view 1802, the cam 1104 is sectioned lengthwise down the center, and thus the illustrated section of the cam 1104 illustrates a surface profile of the inner cam surface 1400, introduced above. The cam follower 1106 is also sectioned lengthwise down the center, and thus the illustrated section of the cam follower 1106 illustrates a surface profile of the inner follower surface 1602.

In the position 1800, force applied by the hinge spring 1110 holds the cam follower 1106 against the cam 1104. Further, the interface between the cam follower 1106 and the cam 1104 is such that movement of the support component 110 is resisted. For instance, the inner follower surface 1602 presses against an inner cam contact 1804, and the hinge spring 1110 resists rotational movement of the cam follower 1106 on the follower pivot 1502. Thus, absent force applied by a user to the support component 110, pressure from the cam follower 1106 against the cam 1104 holds the support component 110 in a closed position against the computing device 102.

Figure 19:
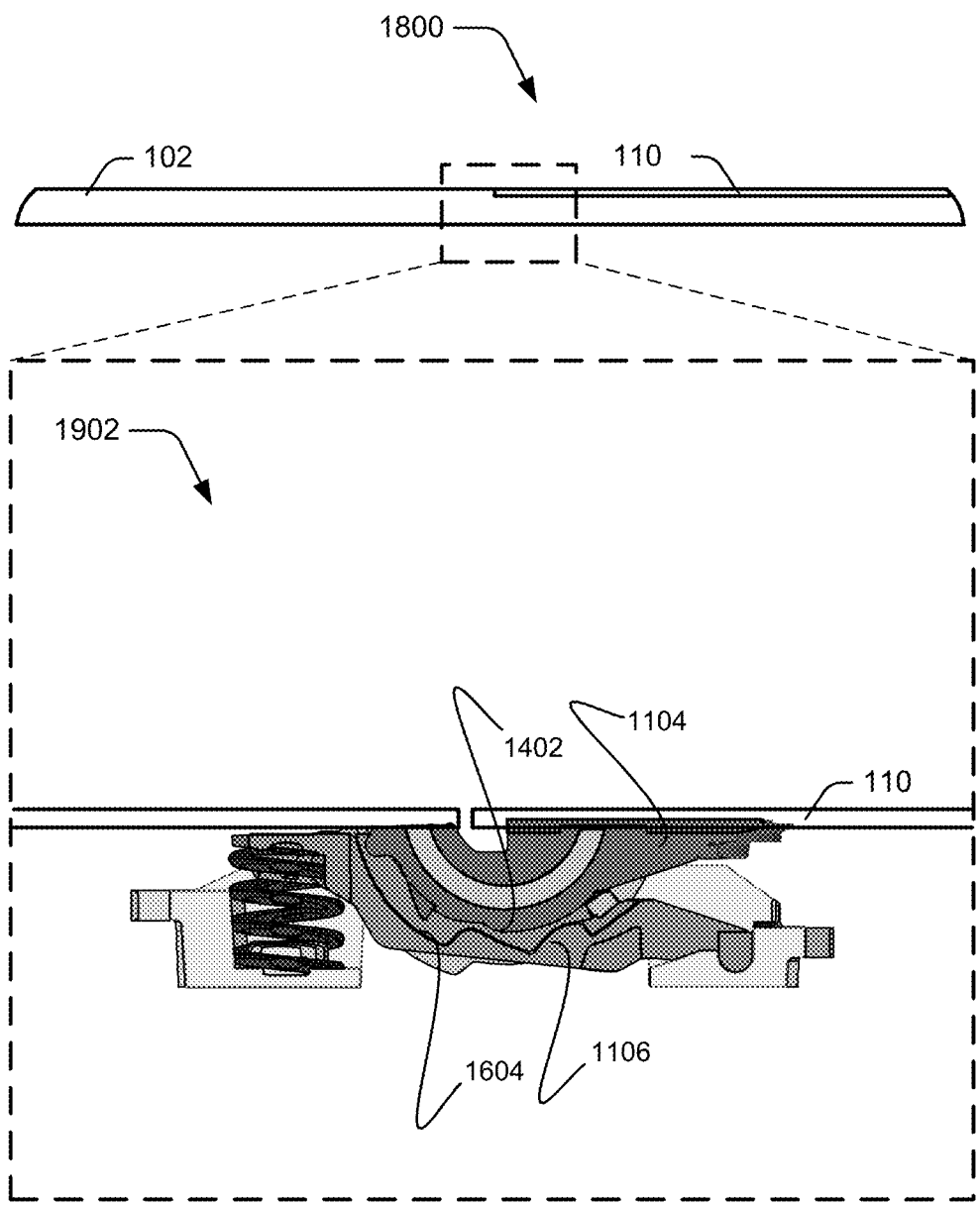
FIG. 19 depicts a computing device with a support component in a closed position in accordance with one or more embodiments.

FIG. 19 depicts the computing device 102 with the support component 110 in the position 1800, introduced above. Further illustrated is a partial side section view 1902 of the computing device 102, including the support component 110 attached to the cam 1104 of the hinge 1100 in a closed position. The section view 1902, for instance, corresponds to the cross-section 1702 illustrated above.

Illustrated as part of the section view 1902 are the outer follower surface 1604 of the cam follower 1106, and the outer cam surface 1402 of the cam 1104. As illustrated, in the position 1800 (e.g., a closed position), the outer follower surface 1604 does not contact the outer cam surface 1402.

Figure 20:
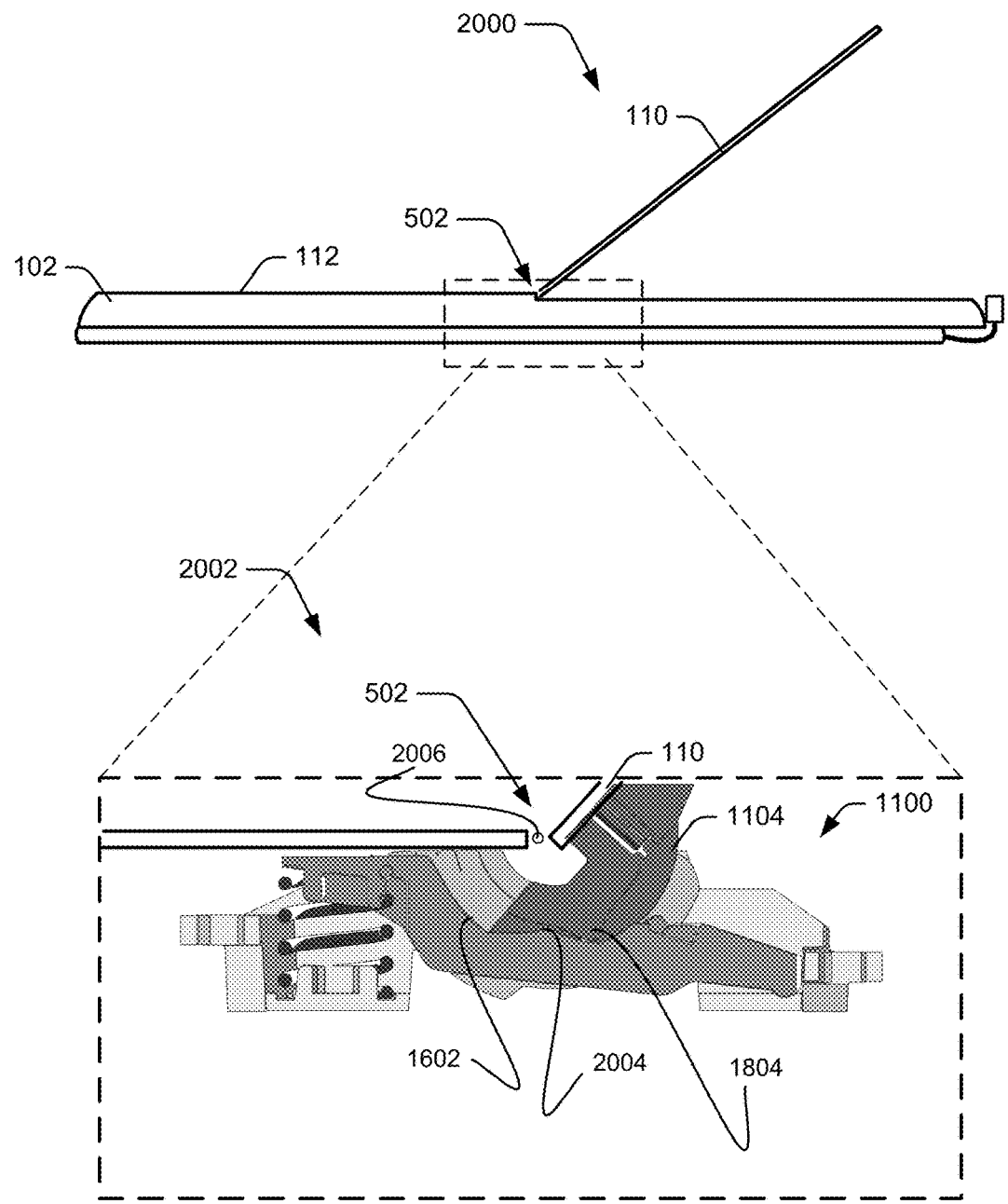
FIG. 20 depicts a computing device with a support component in a first preset open position in accordance with one or more embodiments.

FIG. 20 depicts the support component 110 in a position 2000. In at least some embodiments, the position 2000 corresponds to a first preset open position for the support component 110, such as the position 500 illustrated with reference to FIG. 5. Further illustrated is a partial side section view 2002 of the computing device 102, including the support component 110 attached to the cam 1104 of the hinge 1100 in a first open position. The section view 2002, for instance, corresponds to the cross-section 1704 illustrated in FIG. 17.

According to various implementations, movement of the support component 110 from the position 1800 to the position 2000 is initially resisted by pressure from the inner follower surface 1602 against the inner cam contact 1804. However, when movement of the inner cam contact 1804 proceeds past an inner follower point 2004, pressure from the inner follower surface 1602 against the inner cam contact 1804 drives the cam 1104 to the position 2000. For instance, if a user begins opening the support component 110 from the position 1800 but releases the support component 110 before the inner cam contact 1804 proceeds past the inner follower point 2004, the cam 1104 and thus the support component 110 will snap back into a closed position, e.g., the position 1800.

However, if the user manipulates the support component 110 such that the inner cam contact 1804 proceeds past the inner follower point 2004, pressure from the cam follower 1106 against the cam 1104 drives the cam 1104 into the position 2000, e.g., a first open position. For instance, if the user releases the support component 110 after the inner cam contact 1804 proceeds past the inner follower point 2004, the cam 1104 (and thus the support component 110) will snap into the position 2000.

According to various implementations, the hinge 1100 has a center of rotation 2006 this is external to the hinge itself. For instance, the center of rotation 2006 substantially coincides with the seam 502 between the support component 110 and stationary portions of the rear surface 112 of the computing device 102. Further, in at least some implementations, the center of rotation 2006 is consistent (e.g., does not change) when the hinge 1100 is repositioned among the various preset open positions discussed herein. This enables the support component 110 to maintain a consistent rotational profile and causes a width of the seam 502 to remain substantially consistent (e.g., within +/−0.050 millimeters) during rotation of the support component 110 among the different preset positions discussed herein.

Figure 21:
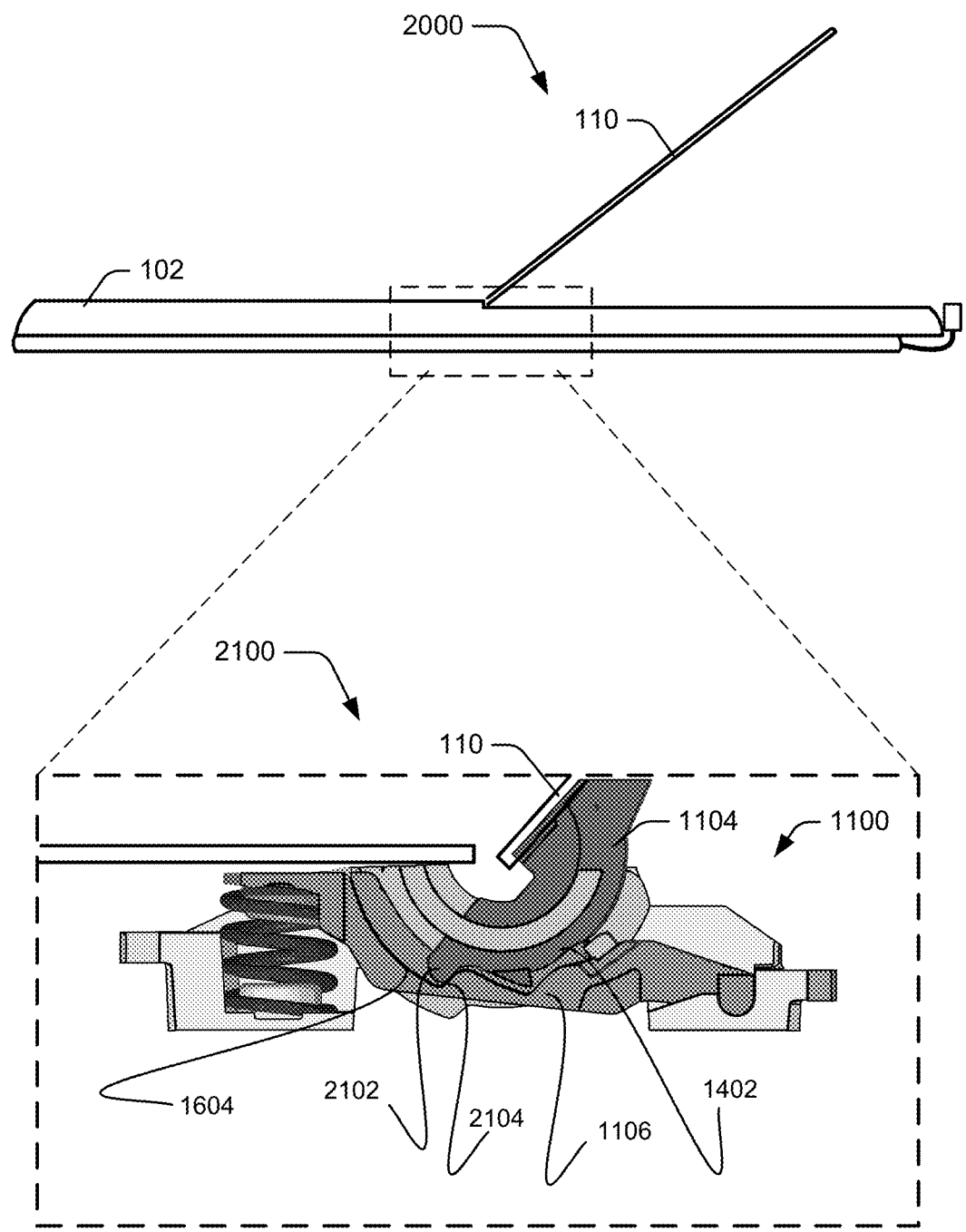
FIG. 21 depicts a computing device with a support component in a first preset open position in accordance with one or more embodiments.

FIG. 21 depicts the computing device 102 with the support component 110 in the position 2000, introduced above. Further illustrated is a partial side section view 2100 of the computing device 102, including the support component 110 attached to the cam 1104 of the hinge 1100 in an open position. The section view 2100, for instance, corresponds to the cross-section 1702 illustrated above. According to various implementations, the section view 2002 (above) and the section view 2100 illustrate different cross-sections of the same position for the hinge 1100, e.g., the position 2000.

Illustrated in the section view 2100 is the outer cam surface 1402 of the cam 1104 and the outer follower surface 1604 of the cam follower 1106. Further illustrated is that a first cam catch 2102 on the outer cam surface 1402 engages with a first follower catch 2104 on the outer follower surface 1604. Generally, the first cam catch 2102 and the first follower catch 2104 represent surface features on the outer cam surface 1402 and the outer follower surface 1604, respectively.

According to various implementations, engagement of the first cam catch 2102 with the first follower catch 2104 enables the support component 110 to persist in the position 2000. For instance, spring pressure from the hinge spring 1110 holds the first cam catch 2102 against the first follower catch 2104. In at least some implementations, absent external force directly and/or indirectly applied to the support component 110, the first cam catch 2102 will not disengage from the first follower catch 2104.

For example, the hinge 1100 is constructed such that unless a specified threshold force is applied to the support component 110, the hinge 1100 will not disengage from the position 2000. In at least some implementations, exceeding a threshold closing force against the support component 110 in one direction closes the support component, and exceeding a threshold opening force against the support component 110 in another direction opens the support component 110 further past the position 2000.

According to one or more implementations, contact between the cam 1104 and the cam follower 1106 occurs between the inner cam surface 1400 and the inner follower surface 1602 when the hinge 1100 is in a position from the closed position 1800 and up to the open position 2000. For instance, for a support component angle range of 0 degrees (e.g., position 1800) up to the position 2000, the outer cam surface 1402 does not contact the outer follower surface 1604.

However, starting with the position 2000 and continuing to further open positions such as those discussed below, contact between the cam 1104 and the cam follower 1106 transitions to the outer cam surface 1402 and the outer follower surface 1604. In these further open positions, for example, the inner cam surface 1400 is positioned away from and does not contact the inner follower surface 1602. Thus, as detailed herein, responsiveness of the hinge 1100 between at least some positions changes based on surface profiles of the different cam and cam follower surfaces, and also based on which surfaces are engaged at a particular position.

While the discussion herein is presented with reference to a particular outer follower surface 1604 and a particular outer cam surface 1402, it is to be appreciated that according to various implementations, similar features and interactions apply to the other outer follower surface and outer cam surface.

Figure 22:
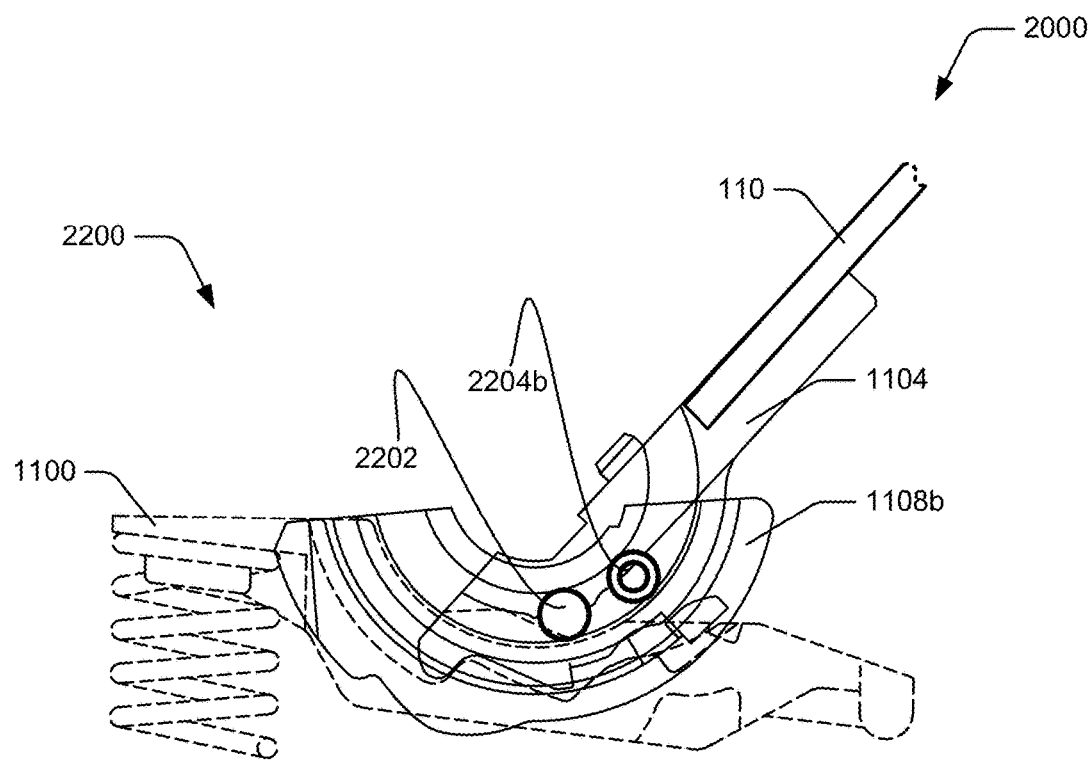
FIG. 22 depicts a partial rear view of a computing device with a support component in a first preset open position in accordance with one or more embodiments.

FIG. 22 depicts a side view 2200 of the hinge 1100 with the support component 110 attached to the cam 1104 and in the position 2000, introduced above. The side view 2200 shows a side view of a cam pin 2202 positioned within the cam 1104 and a plate pin 2204b positioned within the support plate 1108b. As further detailed below, the cam pin 2202 is positioned such that it is engageable with the plate pin 2204b to enable engagement of the cam 1104 with the support plates 1108a, 1108b.

Figure 23:
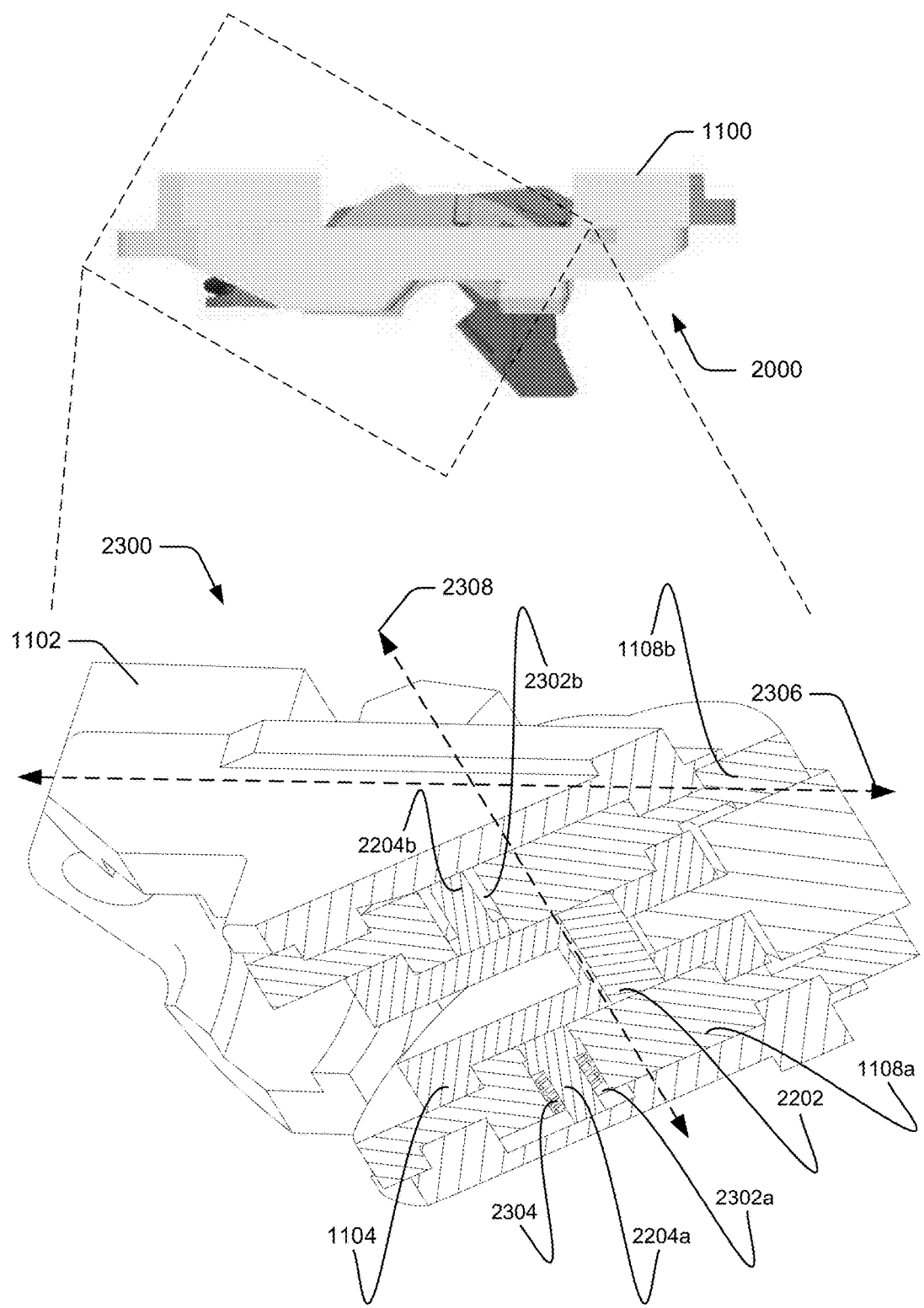
FIG. 23 depicts a diagonal cross-section of a hinge in accordance with one or more embodiments.

FIG. 23 depicts a diagonal cross-section 2300 of the hinge 1100 in the position 2000 introduced above. The cross-section 2300 includes the hinge frame 1102, the cam 1104, and the support plates 1108a, 1108b. Further shown are the cam pin 2202 positioned within the cam 1104, a plate pin 2204a within the support plate 1108a, and the plate pin 2204b within the support plate 1108b. The plate pin 2204a is positioned within a plate cavity 2302a in the support plate 1108a, and is slidable within the plate cavity 2302a. The plate pin 2204b is positioned within a plate cavity 2302b in the support plate 1108b, and is slidable within the plate cavity 2302b. Positioned within the plate cavity 2302a is a pin spring 2304, which provides spring force against the plate pin 2204a.

In at least some implementations, the plate pins 2204a, 220b and the cam pin 2202 are cylindrical. This is not intended to be limiting, however, and one or more of the plate pins 2204a, 220b and the cam pin 2202 may be implemented using any suitable shape and/or form factor.

The cross-section 2300 also shows a longitudinal axis 2306 and a lateral axis of the hinge 1100. Generally, the longitudinal axis runs along a length of the hinge frame 1102, and the lateral axis along a width of the hinge frame 1102. According to various implementations, movement of the various components of the hinge 1100 can be described directionally with reference to these axes. For instance, during opening and closing of the hinge 1100, the cam 1104 and the support plates 1108a, 1108b pivot relative to the longitudinal axis 2306. Further, and as discussed below, movement of the cam pin 2202 and the plate pins 2204a, 2204b is co-directional (e.g., axially) with the lateral axis 2308.

Figure 24:
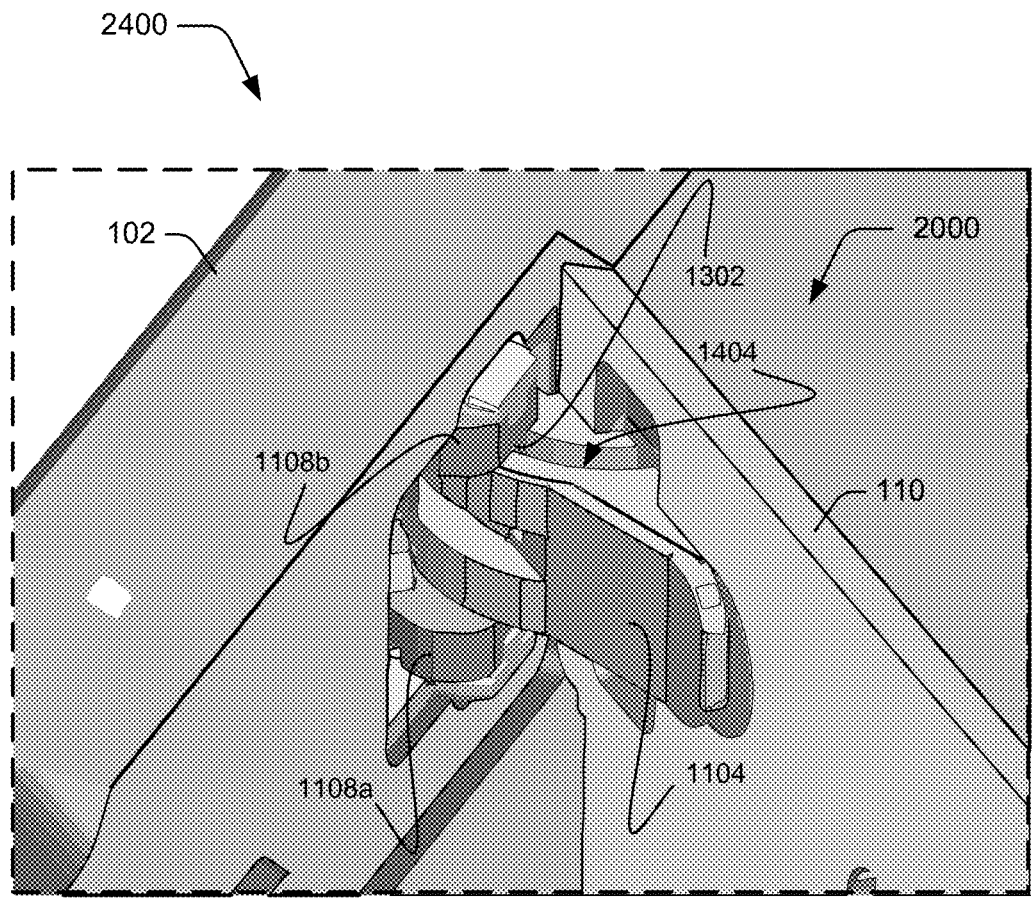
FIG. 24 depicts a partial rear view of a computing device with a support component in a first preset open position in accordance with one or more embodiments.

FIG. 24 depicts a partial rear view 2400 of the computing device 102 with the support component 110 in the position 2000. The rear view 2400 depicts that in at least some implementations, the support plates 1108a, 1108b remain recessed within the hinge frame 1102 and the cam 1104 rotates out of the hinge frame 1102 when the support component is moved to the position 2000. This is not intended to be limiting, however, and the support plates 1108 may move in response to movement of the cam 1104, e.g., due to contact between the cam guide 1302 and the cam channel 1404.

Figure 25:
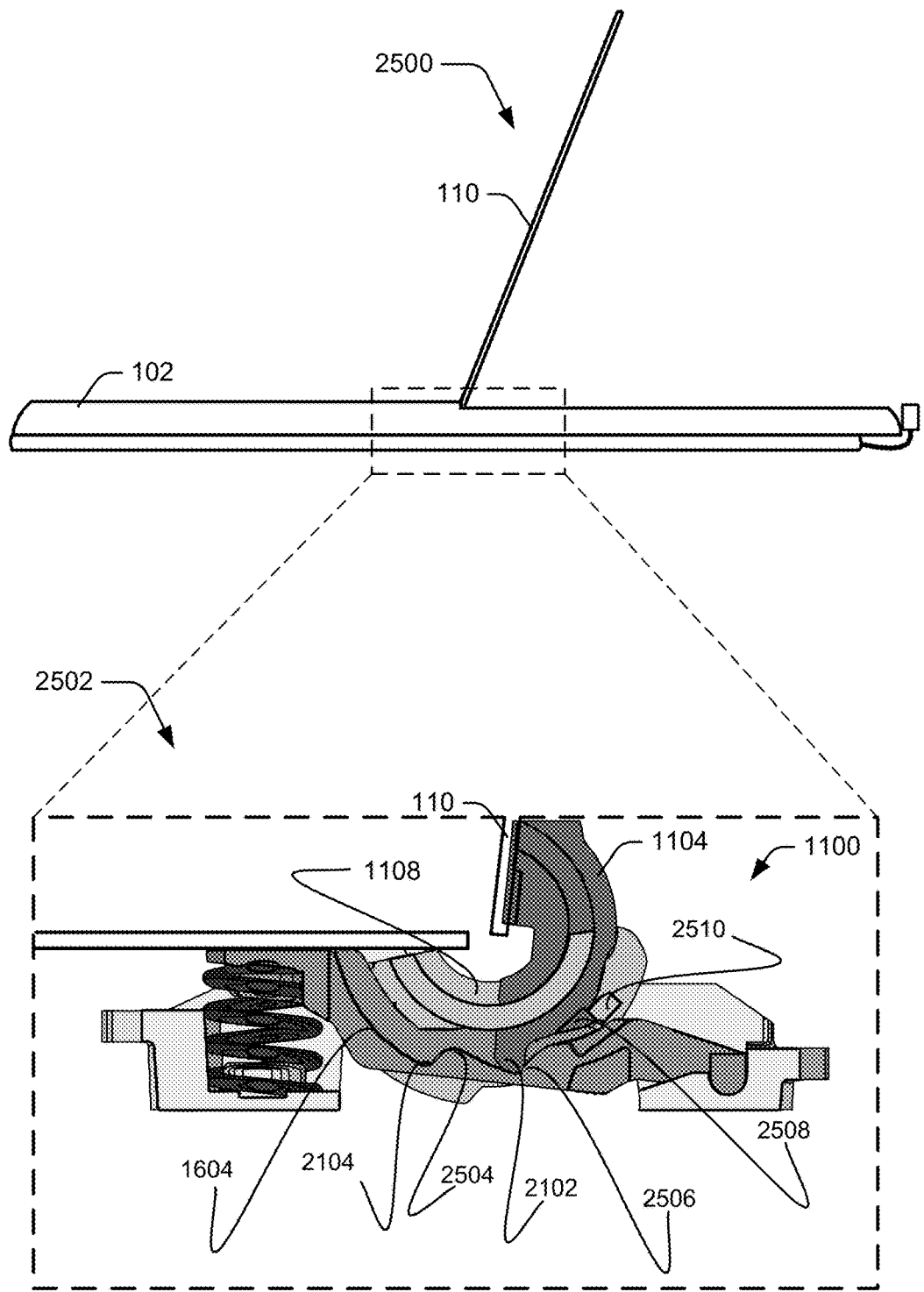
FIG. 25 depicts a computing device with a support component in a second preset open position in accordance with one or more embodiments.

FIG. 25 depicts the support component 110 in a position 2500. In at least some embodiments, the position 2500 corresponds to a second preset open position for the support component 110, such as the position 600 illustrated with reference to FIG. 6. The support component 110 is placed in the position 2500, for instance, responsive to a user further opening the support component 110 past the position 2000 introduced above. Further illustrated is a partial side section view 2502 of the computing device 102, including the support component 110 attached to the cam 1104 of the hinge 1100 in a first open position. The section view 2502, for instance, corresponds to the cross-section 1702 illustrated above.

According to various implementations, movement of the support component 110 from the position 2000 to the position 2500 is initially resisted by pressure from the first follower catch 2104 against the first cam catch 2102. However, when movement of the first cam catch 2102 proceeds past an outer follower point 2504, pressure from the outer follower surface 1604 against the first cam catch 2102 drives the cam 1104 to the position 2500. In the position 2500, the first cam catch 2102 engages with a second follower catch 2506.

For instance, if a user begins opening the support component 110 further past the position 2000 but releases the support component 110 before the first cam catch 2102 proceeds past the outer follower point 2504, the cam 1104 and thus the support component 110 will snap back into the position 2000. However, when movement of the support component 110 proceeds past the position 2000 such that the first cam catch 2102 proceeds past the outer follower point 2504, the cam 1104 and thus the support component 110 will snap into the position 2500. For example, consider that a user releases the support component 110 when the first cam catch is between the outer follower point 2504 and the second follower catch 2506. In such a case, the sloped profile of the outer follower surface 1604 is such that pressure from outer cam follower 1604 (provided by the hinge spring 1110) drives the cam 1104 and thus the support component 110 into the position 2500 independent of an externally applied (e.g., user-applied) force.

According to various implementations, engagement of the first cam catch 2102 with the second follower catch 2506 enables the support component 110 to persist in the position 2500. For instance, spring pressure from the hinge spring 1110 holds the second follower catch 2506 against the first cam catch 2101 and thus prevents the cam 1104 and thus the support component 110 from disengaging from the position 2500 unless sufficient external force is applied. Thus, absent force directly and/or indirectly applied to the support component 110, the first cam catch 2102 will not disengage from the second follower catch 2506.

For example, the hinge 1100 is constructed such that unless a specified threshold force is applied to the support component 110, the hinge 1100 will not disengage from the position 2500. In at least some implementations, exceeding a threshold closing force against the support component 110 causes the support component 110 to transition back to the position 2000, and exceeding a threshold opening force against the support component 110 opens the support component 110 further past the position 2500.

Notice that in the position 2500, a second cam catch 2508 engages with a cam stop 2510 of the support plate 1108. As further detailed below, engagement of the second cam catch 2508 with the cam stop 2510 enables movement of the support plate 1108 to support further open positions for the support component 110.

Figure 26:
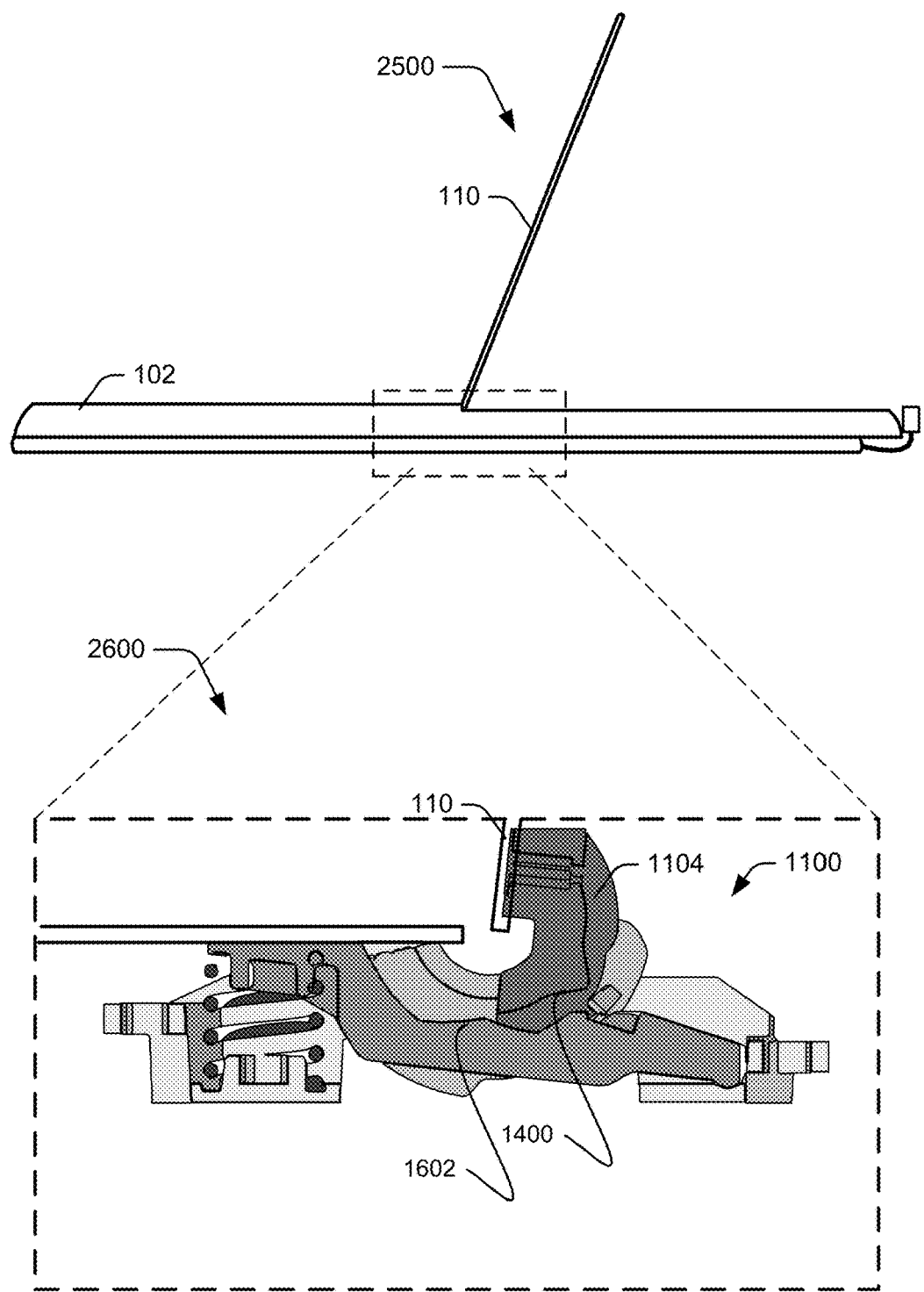
FIG. 26 depicts a computing device with a support component in a second preset open position in accordance with one or more embodiments.

FIG. 26 depicts the support component 110 in the position 2500, introduced above. Further illustrated is a partial side section view 2600 of the computing device 102, including the support component 110 attached to the cam 1104 of the hinge 1100 in a second open position. The section view 2600, for instance, corresponds to the cross-section 1704 illustrated in FIG. 17.

The section view 2600 depicts that when the support component 110 is in the position 2500, the inner cam surface 1400 is not in contact with the inner follower surface 1602. As mentioned above, contact between the cam 1104 and the cam follower 1106 in open positions after the open position 2000 occurs between the outer cam surface 1402 and the outer follower surfaces 1604 (illustrated in other FIGS.), and not between the inner cam surface 1400 and the inner follower surface 1602.

Figure 27:
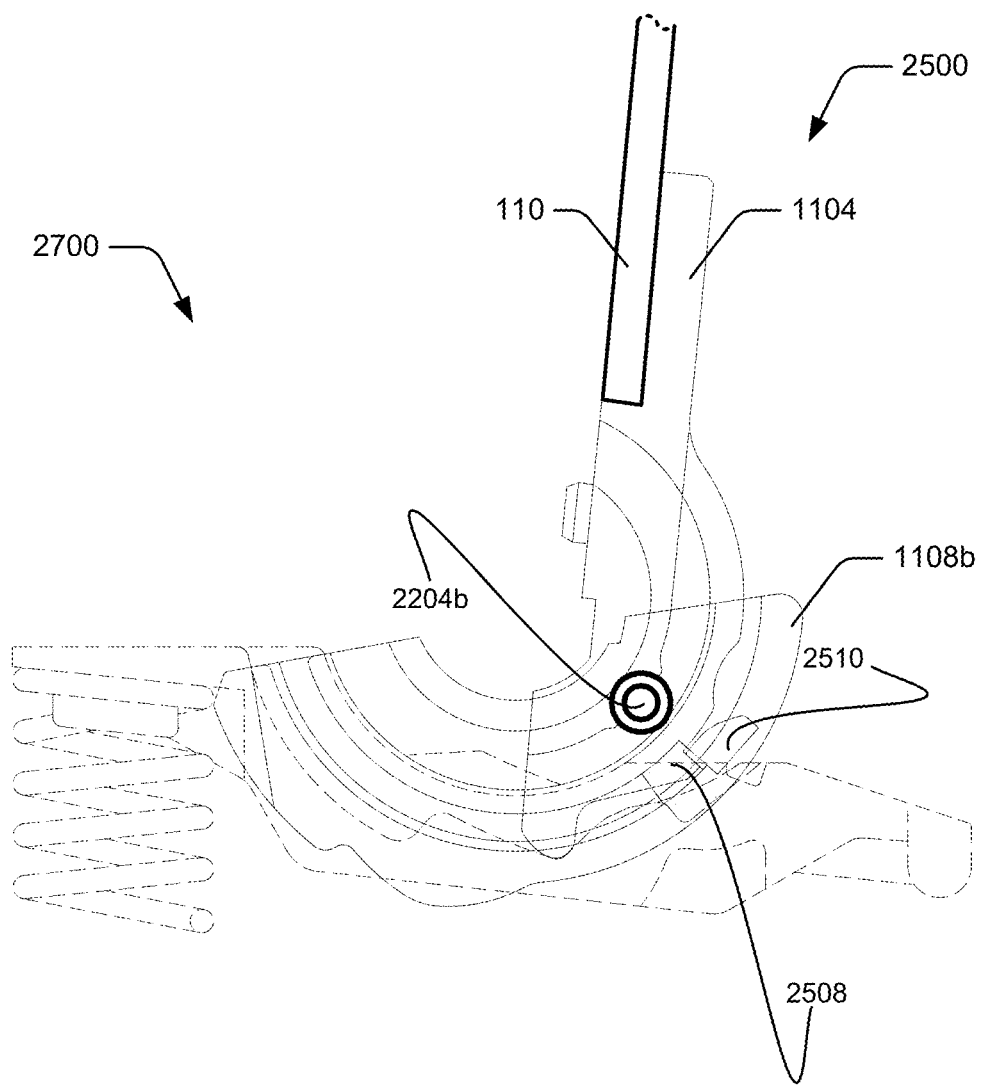
FIG. 27 depicts a side view of a hinge in a second preset open position in accordance with one or more embodiments.

FIG. 27 depicts a side view 2700 of the hinge 1100 with the support component 110 attached to the cam 1104 and in the position 2500, introduced above. The side view 2700 shows a side view of the plate pin 2204b positioned within the support plate 1108b. As further detailed below, in the position 2500, the cam pin 2202 (not shown here) engages with the plate pin 2204b.

Figure 28:
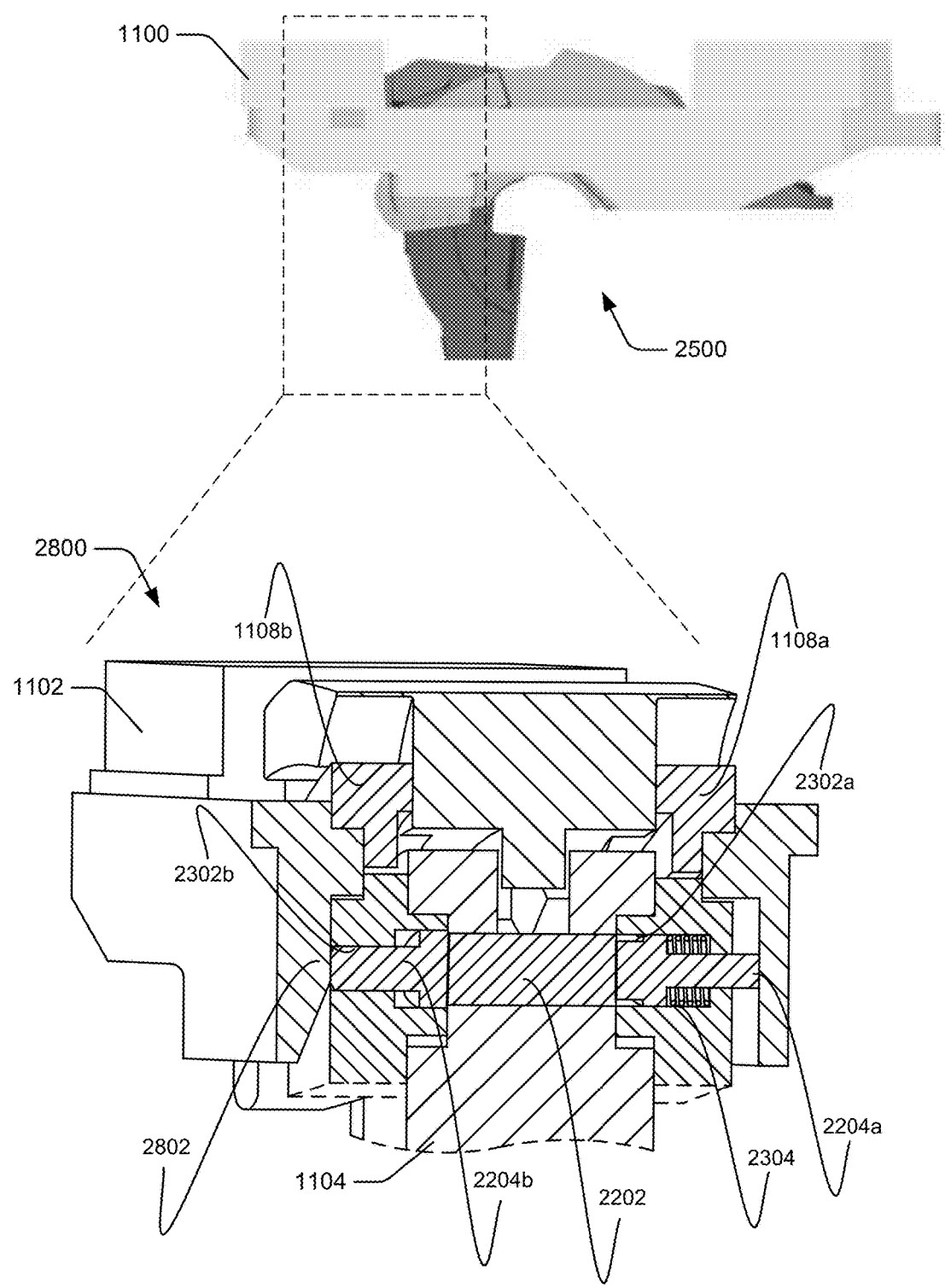
FIG. 28 depicts a partial cross-section of a hinge in a second preset open position in accordance with one or more embodiments.

FIG. 28 depicts a partial cross-section 2800 of a portion of the hinge 1100 in the position 2500 introduced above. The cross-section 2800 includes the hinge frame 1102, the cam 1104, and the support plates 1108a, 1108b. In the position 2500, the plate pin 2204b, the cam pin 2202, and the plate pin 2204a are aligned, e.g., axially aligned. For instance, movement of the cam 1104 from the position 2000 to the position 2500 causes the plate pins 2204a, 2204b to be aligned with the cam pin 2202. Notice that in the position 2500, the plate pins 2204a, 2204b remain constrained within the respective plate cavities 2302a, 2302b. For instance, spring pressure from the pin spring 2304 presses the plate pin 2204a against the cam pin 2202, which in turn causes the cam pin 2202 to press against the plate pin 2204b. A side rail 2802 of the hinge frame 1102, however, constrains movement of the plate pin 2204b and prevents the plate pin 2204b from sliding out of the plate cavity 2302b, and thus prevents lateral sliding of the cam pin 2202 and the plate pin 2204a.

Figure 29:
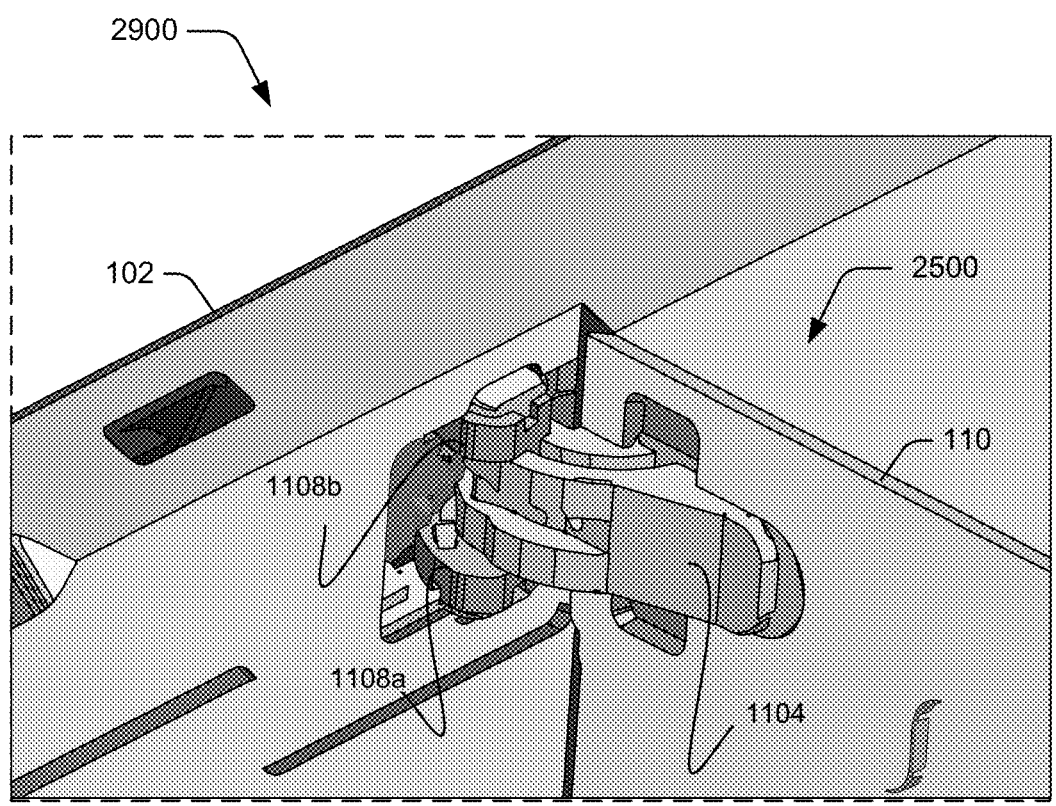
FIG. 29 depicts a partial rear view of a computing device with a support component in a second preset open position in accordance with one or more embodiments.

FIG. 29 depicts a partial rear view 2900 of the computing device 102 with the support component 110 in the position 2500. Further illustrated are the cam 1104 and the support plates 1108a, 1108b.

Figure 30:
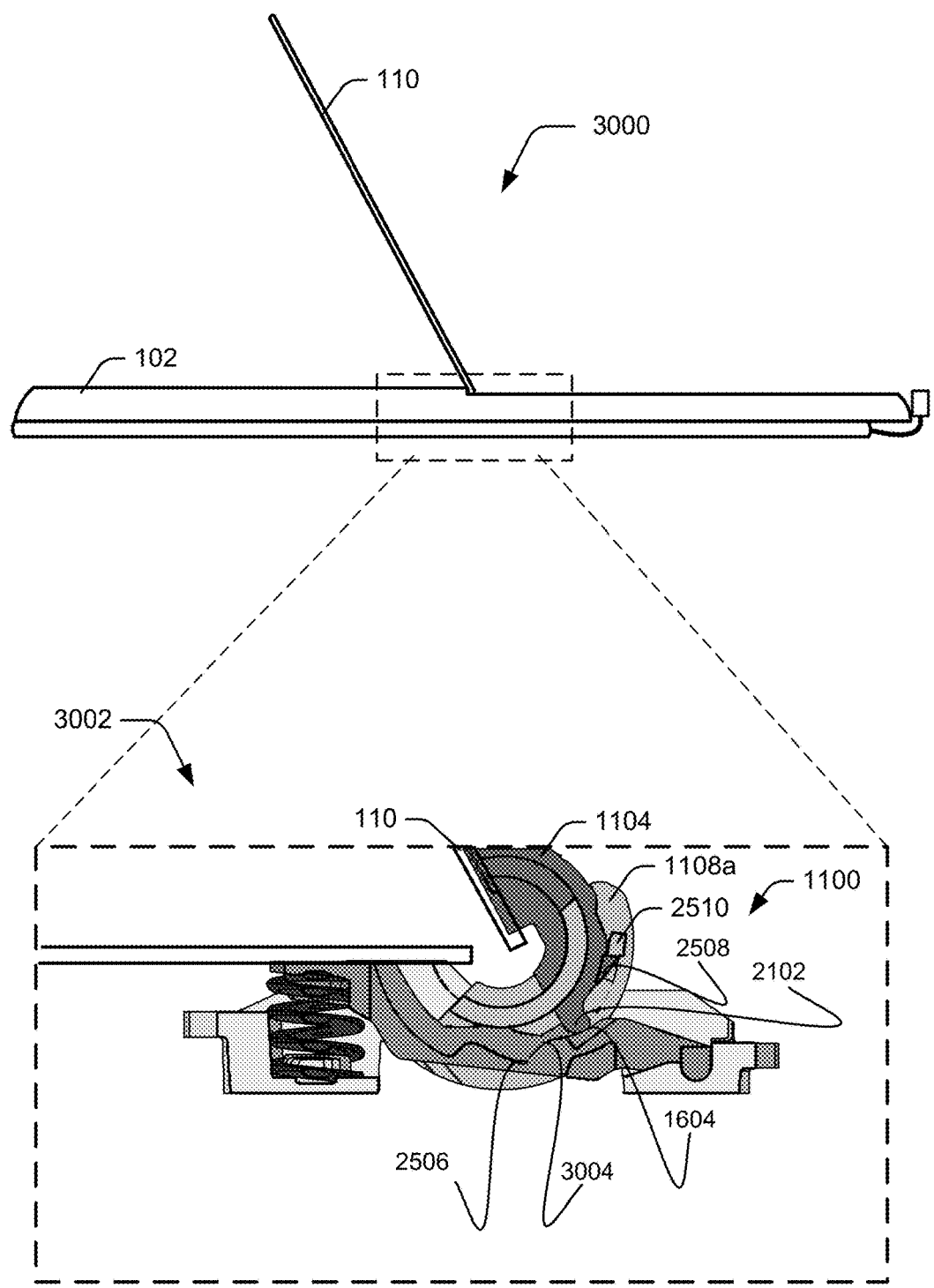
FIG. 30 depicts a support component in a third preset open position in accordance with one or more embodiments.

FIG. 30 depicts the support component 110 in a position 3000. In at least some embodiments, the position 3000 corresponds to a third preset open position for the support component 110, such as the position 800 illustrated with reference to FIG. 8a. The support component 110 is placed in the position 3000, for instance, responsive to a user further opening the support component 110 past the position 2500 introduced above. Further illustrated is a partial side section view 3002 of the computing device 102, including the support component 110 attached to the cam 1104 of the hinge 1100 in a third open position. The section view 3002, for instance, corresponds to the cross-section 1702 illustrated in FIG. 17.

According to various implementations, movement of the support component 110 from the position 2500 to the position 3000 is initially resisted by pressure from the second follower catch 2506 against the first cam catch 2102. However, when movement of the first cam catch 2102 proceeds past an outer follower point 3004, pressure from the outer follower surface 1604 against the first cam catch 2102 drives the cam 1104 to the position 3000. In the position 3000, the first cam catch 2102 engages with the outer follower surface 1604.

For instance, if a user begins opening the support component 110 further past the position 2500 but releases the support component 110 before the first cam catch 2102 proceeds past the outer follower point 3004, the cam 1104 and thus the support component 110 will snap back into the position 2500. However, when movement of the support component 110 proceeds past the position 2500 such that the first cam catch 2102 proceeds past the outer follower point 3004, the cam 1104 and thus the support component 110 will snap into the position 3000. For example, consider that a user releases the support component 110 when the first cam catch 2102 is past outer follower point 3004. In such a case, the sloped profile of the outer follower surface 1604 is such that pressure from outer follower surface 1604 (provided by the hinge spring 1110) against the first cam catch 2102 drives the cam 1104 and thus the support component 110 into the position 3000 independent of an externally applied (e.g., user-applied) force.

For example, the hinge 1100 is constructed such that unless a specified threshold force is applied to the support component 110, the hinge 1100 will not disengage from the position 3000.

Further illustrated is that in moving from the position 2500 to the position 3000, engagement of the second cam catch 2508 with the cam stop 2510 causes the support plate 1108a to rotate with the cam 1104. Generally, movement of the support plates 1108a, 1108b enables the hinge 1100 to provide stability to the support component 110 when open to various open positions.

Figure 31:
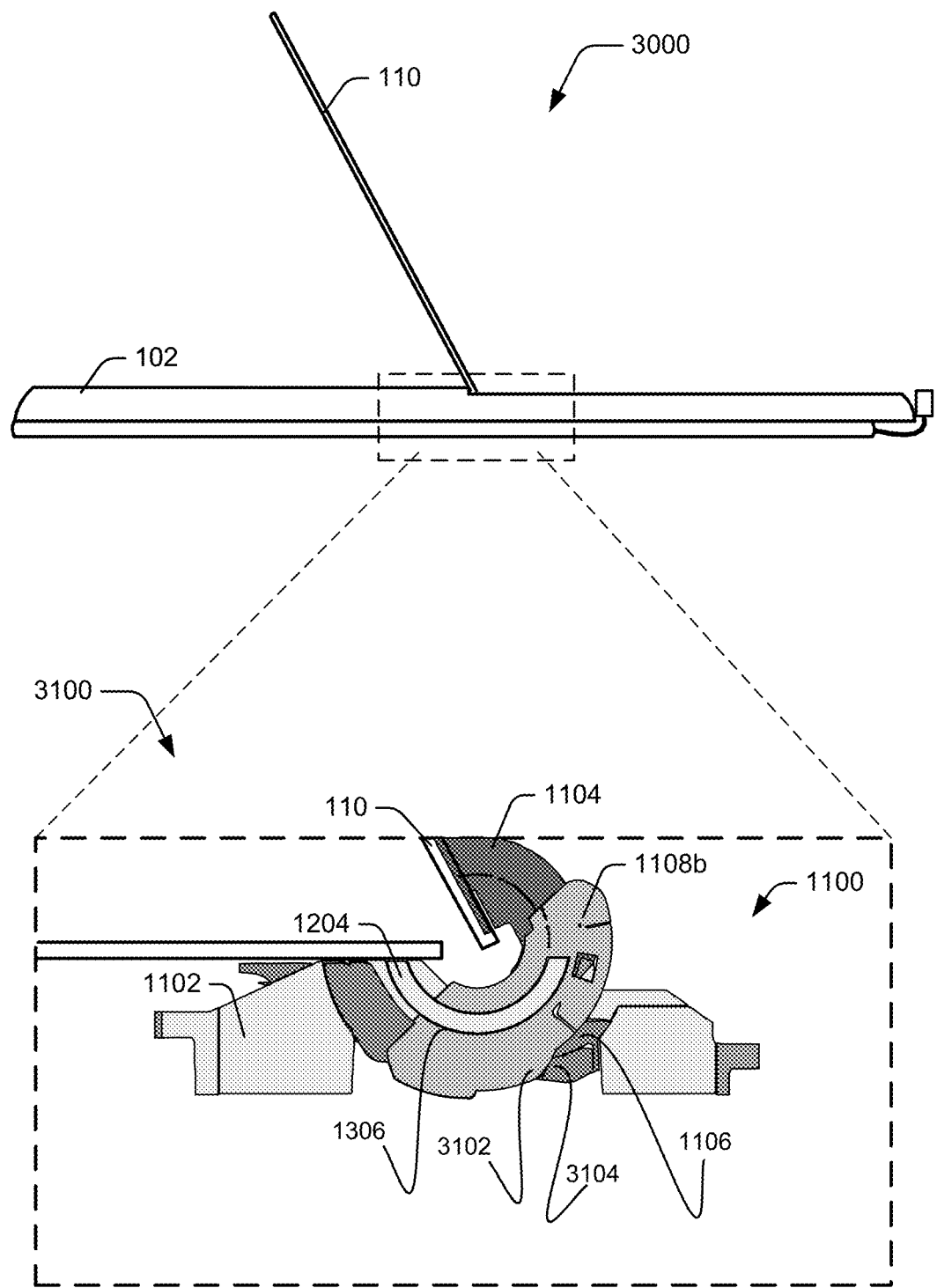
FIG. 31 depicts a support component in a third preset open position in accordance with one or more embodiments.

FIG. 31 depicts the support component 110 in the position 3000 introduced above. Further illustrated is a partial side section view 3100 of the computing device 102, including the support component 110 attached to the cam 1104 of the hinge 1100 in a third open position. The section view 3100, for instance, corresponds to the cross-section 1700 illustrated in FIG. 17.

As illustrated here, in the position 3000 the support plate 1108*b* partially protrudes from the hinge frame 1102. Movement of the support plate 1108*b* to the position 3000, for instance, is based on the interface between the plate guide 1204 of the hinge frame 1102 and the support channel 1306 of the support plate 1108*b*. Further, a plate catch 3102 of the support plate 1108*b* engages with a follower contact 3104 of the cam follower 1106. The plate catch 3102, for instance, represents a raised portion of the outer edge of the support plate 1108*b*. According to various implementations, engagement of the plate catch 3102 with the follower contact 3104 provides resistance to the support plate 1108*b* rotating toward a further open position unless sufficient force is applied to the support component 110.

For instance, engagement of the plate catch 3102 with the follower contact 3104 enables the support component 110 to persist in the position 3000. Spring pressure from the hinge spring 1110, for example, holds the follower contact 3104 against the plate catch 3102 and thus prevents the support plate 1108*b* and thus the support component 110 from disengaging from the position 3000 unless sufficient external force is applied.

Figure 32:
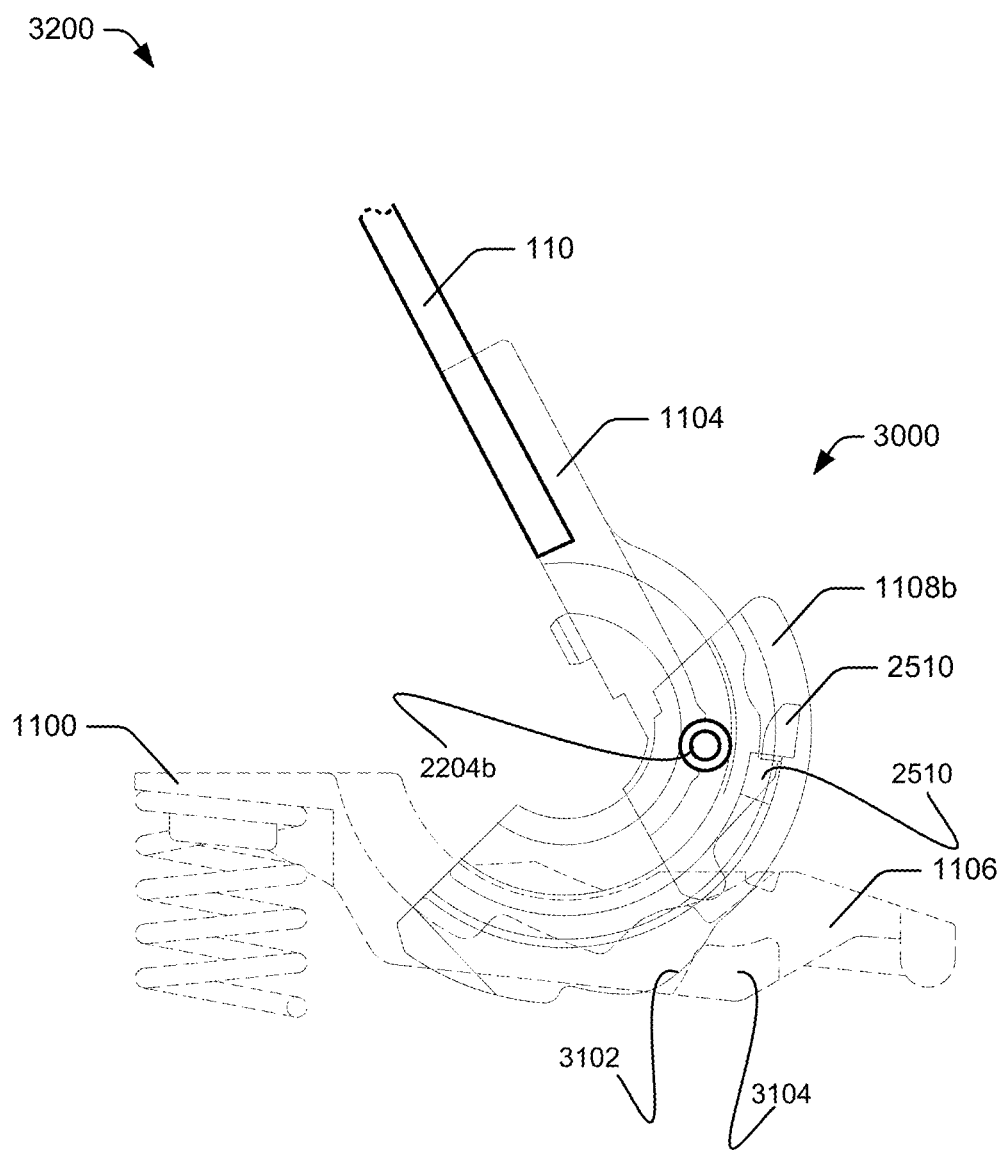
FIG. 32 depicts a side view of a hinge in a third preset open position in accordance with one or more embodiments.

FIG. 32 depicts a side view 3200 of the hinge 1100 with the support component 110 attached to the cam 1104 and in the position 3000, introduced above. The side view 3200 shows a side view of the plate pin 2204*b* positioned within the support plate 1108*b*. As further detailed below, in the position 3000, the cam pin 2202 engages with the plate pin 2204*b*. The side view 3200 also shows the plate catch 3102 engaged with the follower contact 2104 of the cam follower 1106.

As further depicted in FIG. 32, the second cam catch 2508 engages with the cam stop 2510, as described above. According to various implementations, this engagement enables the pins described herein to remain aligned when the hinge opens from the position 2500 and beyond, as further described below.

Figure 33:
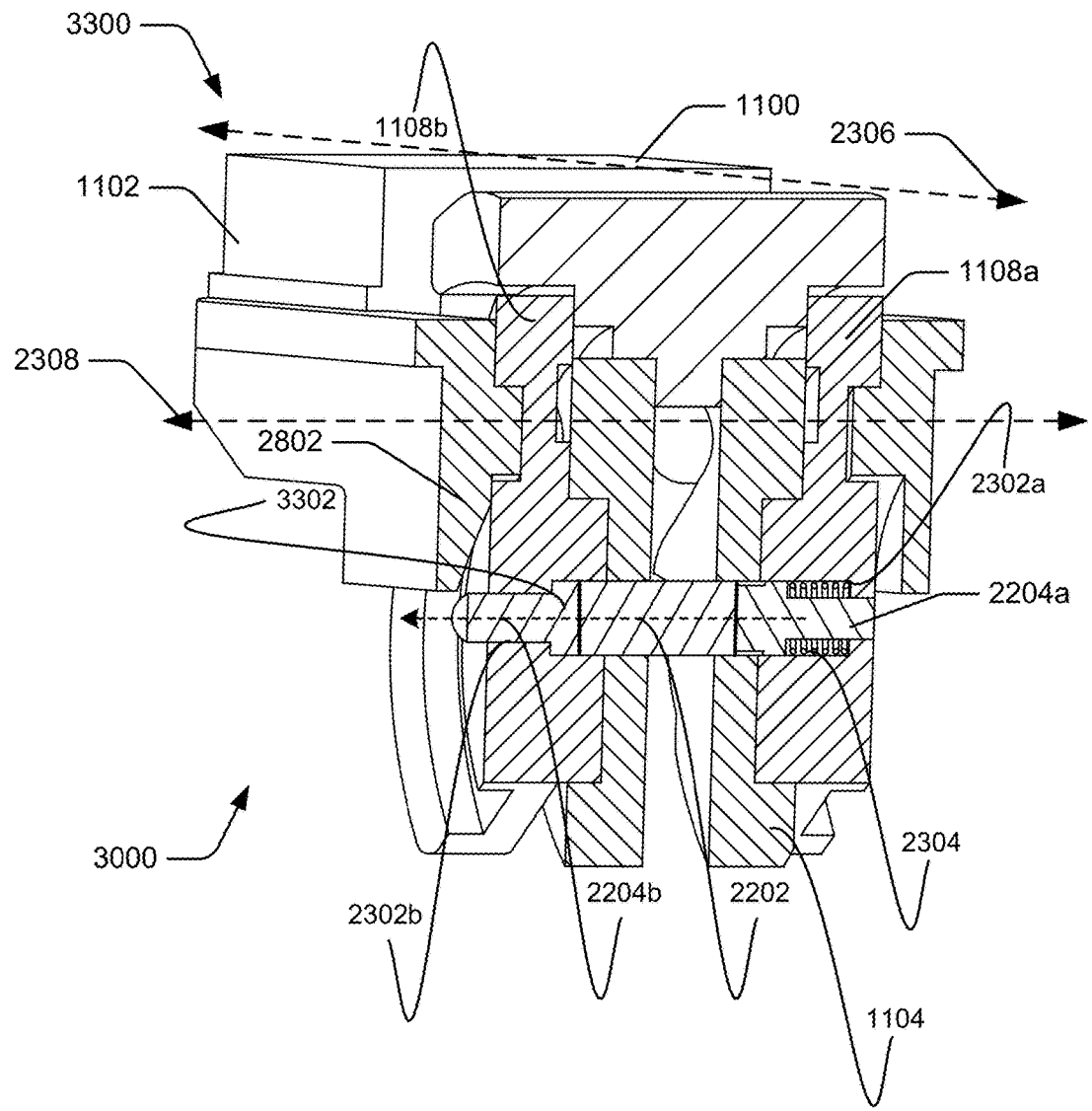
FIG. 33 depicts a partial cross-section of a portion of a hinge in a third preset open position in accordance with one or more embodiments.

FIG. 33 depicts a partial cross-section 3300 of a portion of the hinge 1100 in the position 3000 introduced above. The cross-section 3300 includes the hinge frame 1102, the cam 1104, and the support plates 1108*a*, 1108*b*. In the position 3000, the plate pin 2204*b*, the cam pin 2202, and the plate pin 2204*a* are aligned, e.g., axially aligned. Further, the support plate 1108*b* has rotated out of the hinge frame 1102 far enough that the plate pin 2204*b* escapes from the side rail 2802. The side rail 2802, for instance, does not constrain lateral movement of the plate pin 2204*b* in the position 3000. Accordingly, spring pressure from the pin spring 2304 presses the plate pin 2204*a* against the cam pin 2202, which in turn applies pressure against the plate pin 2204*a*. Since the plate pin 2204*a* is no longer constrained by the side rail 2802, the plate pin 2204*a* slides within the plate cavity 2302*b*, which allows the cam pin 2202 to slide laterally relative to the cam 1104, and the plate pin 2204*a* to slide within the plate cavity 2302*a*. Generally, the plate pins 2204*a*, 2204*b* and the cam pin 2202 slide laterally relative to the hinge frame 1102, i.e., co-directionally and/or parallel with the lateral axis 2308 and normal (orthogonally) to the longitudinal axis 2306. Further, during opening and closing of the hinge 1100, the cam 1104 and the support plates 1108*a*, 1108*b* pivot relative to the longitudinal axis 2306 and rotate relative to the lateral axis 2308.

Notice that sliding of the different pins causes the cam pin 2202 to engage partially within the plate cavity 2302*b*, and the plate pin 2204*a* to engage partially within the cam 1104. Further, the plate pin 2204*b* does not slide completely out of the plate cavity 2302*b*, but is prevented from completely exiting the plate cavity 2302*b* by a pin head 3302 that engages with a narrow portion of the plate cavity 2302*b*. As shown, the pin head 3302 is wider than the outer portion of the plate cavity 2302*b*, and thus prevents the plate pin 2204*b* from escaping the plate cavity 2302*b*.

Generally, this engagement of the various pins binds the cam 1104 to the support plates 1108*a*, 1108*b* such that further opening of the cam 1104 past the position 3000 is subject to movement of the support plates 1108*a*, 1108*b* along with the cam 1104. For instance, resistance to movement of the support plates 1108*a*, 1108*b* creates a corresponding resistance to movement of the cam 1104 since the cam 1104 is physically interlocked with the support plates 1108*a*, 1108*b* via the plate pin 2204*a* and the cam pin 2202.

Notice that the inside surface of the side rail 2802 adjacent the support plate 1108*b* is ramped inwardly. Generally, when the hinge 1100 is pivoted from the position 3000 back toward a closed position, this ramped surface of the side rail 2802 pushes the plate pin 2204*b* inwardly within the plate cavity 2302*b*. The plate pin 2204*b* applies a corresponding inward pressure against the cam pin 2202, which in turn applies pressure against the plate pin 2204*a*. When the hinge is pivoted back to the position 2500, the cam pin 2202 disengages from the support plate 1108*b*, and the plate pin 2204*a* disengages from the cam 1104. Generally, this disengagement is depicted in FIG. 28.

Figure 34:
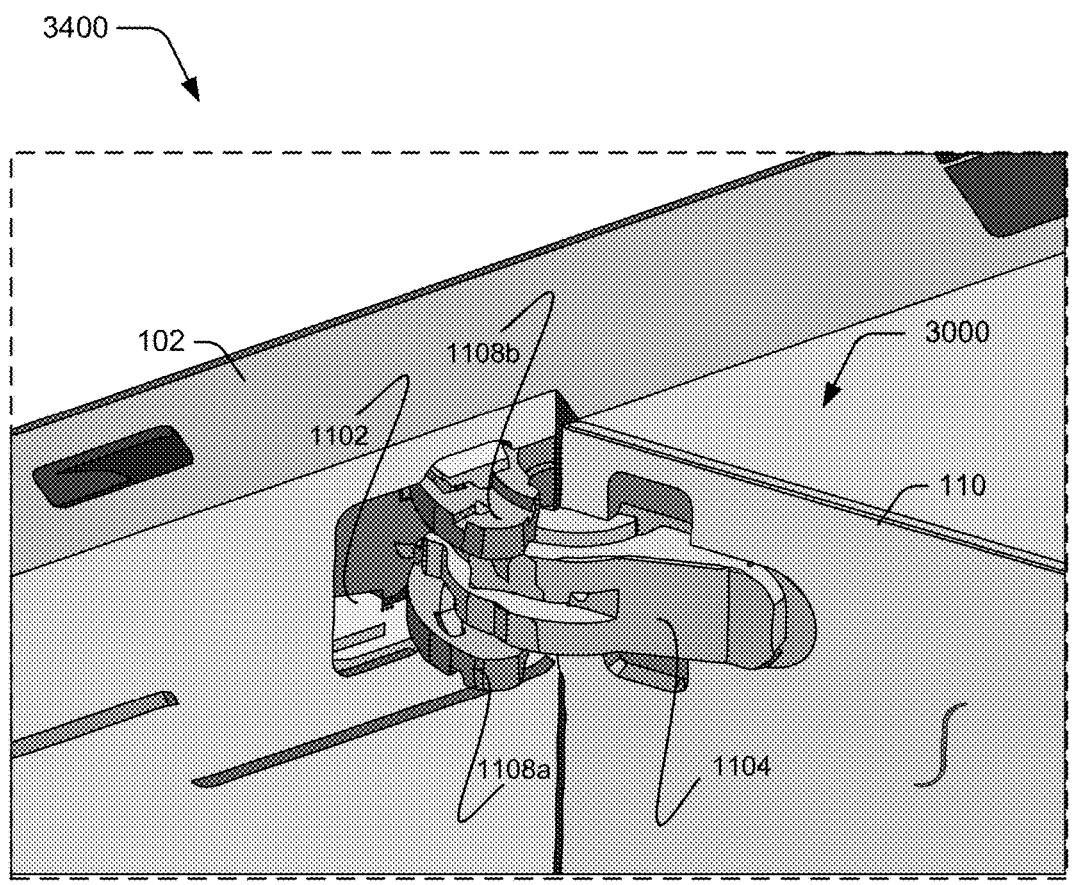
FIG. 34 depicts a partial rear view of a computing device in accordance with one or more embodiments.

FIG. 34 depicts a partial rear view 3400 of the computing device 102 with the support component 110 in the position 3000. The rear view 3400 depicts that in the position 3000, the support plates 1108*a*, 1108*b* partially protrude from the hinge frame 1102.

Figure 35:
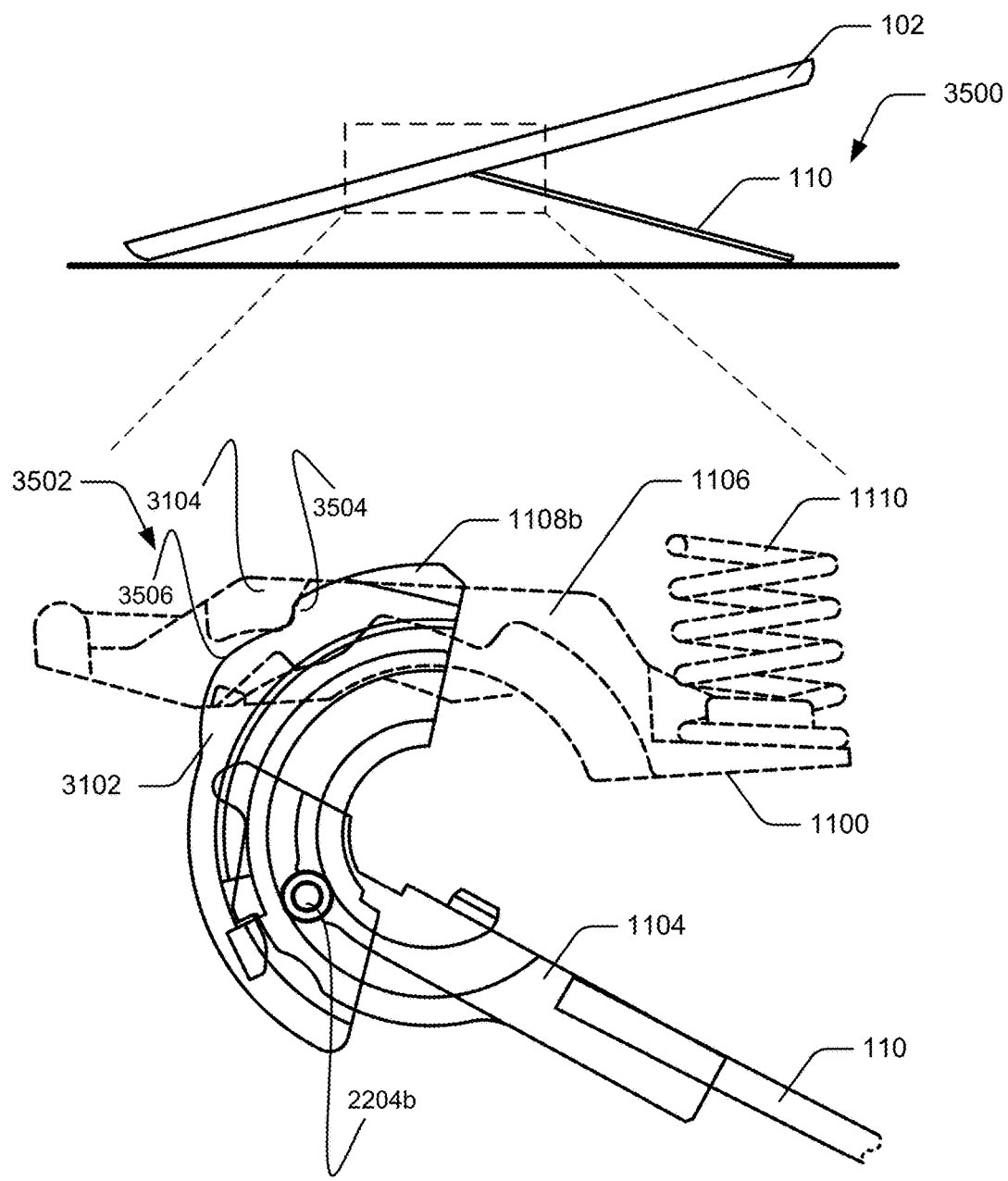
FIG. 35 depicts a side view of the computing device in a fourth preset open position in accordance with one or more embodiments.

FIG. 35 depicts a side view of the computing device 102 with the support component 110 in a position 3500. In at least some embodiments, the position 3500 corresponds to a fourth preset open position for the support component 110, such as the position 810 illustrated with reference to FIG. 8*b*. The support component 110 is placed in the position 3500, for instance, responsive to a user further opening the support component 110 past the position 3000 introduced above.

FIG. 35 also depicts a side view 3502 of the hinge 1100 with the support component 110 attached to the cam 1104 and in the position 3500. The side view 3502 shows a side view of the plate pin 2204*b* positioned within the support plate 1108*b*. In the position 3500, the cam pin 2202 is engaged with the support plate 1108*b*, and the plate pin 2204*a* is engaged with the cam 1104. An example depiction of this engagement is discussed above with reference to FIG. 33. Generally, this engagement of the pins with different components of the hinge 1100 interlocks the cam 1104 with the support plates 1108*a*, 1108*b* such that pivoting of the cam 1104 away from the position 3500 is subject to corresponding movement of the support plates 1108*a*, 1108*b*.

The side view 3502 also shows a plate stop 3504 on the support plate 1108*b* engaged with the follower contact 3104. The plate stop 3504, for instance, represents a depression in the surface of the outer edge of the support plate 1108*b*. Generally, spring pressure from the hinge spring 1110 applies force against the cam follower 1106, which holds the follower contact 3104 within the plate stop 3504.

According to various implementations, movement of the support component 110 from the position 3000 to the position 3500 is initially resisted by pressure from the follower contact 3104 against the plate catch 3102. However, when movement of the plate catch 3102 relative to the follower contact 3104 proceeds past a catch point 3506 on the plate catch 3102, pressure from the follower contact 3104 against the sloped rear surface of the plate catch 3102 drives the of the support plate 1108b to the position 3500. As detailed above, engagement of the various pins with different components of the hinge 1100 interlocks the cam 1104 with the support plates 1108a, 1108b. Thus, the cam 1104 and the attached support component 110 are driven to the position 3500 along with the support plates 1108a, 1108b.

For instance, if a user begins opening the support component 110 further past the position 3000 but releases the support component 110 before the plate catch 3102 proceeds past the catch point 3506 relative to the follower contact 3104, the support plate 1108b and thus the cam 1104 and the support component 110 will snap back into the position 3000. However, when movement of the support component 110 proceeds past the position 3000 such that the plate catch 3102 proceeds past the catch point 3506 relative to the follower contact 3104, the support plate 1108b and thus the cam 1104 and the support component 110 will snap into the position 3500. For example, consider that a user releases the support component 110 when the catch point 3506 is past contact with the follower contact 3104. In such a case, the sloped profile of the rear surface of the plate catch 3102 is such that pressure from the follower contact 3104 (provided by the hinge spring 1110) against the sloped surface of the plate catch 3102 drives the support plate 1108b and thus the cam 1104 and the support component 110 into the position 3500 independent of an externally applied (e.g., user-applied) force.

For example, the hinge 1100 is constructed such that unless a specified threshold force is applied to the support component 110, the hinge 1100 will not disengage from the position 3000.

As depicted in FIG. 35, in the position 3500 the cam 1104 does not contact the cam follower 1106. The cam 1104, however, is engaged with one or more of the support plates 1108a, 1108b via one or more of the pins as described above. Thus, the interlocking mechanism provided by interaction of the pins with the various components of the hinge 1100 enables the torque profile generated via the interaction of the support plates 1108a, 1108b and the cam follower 1106 to affect movement of the cam 1104 and thus enables the cam 1104 and the attached support component 110 to be opened to angles where the cam 1104 is not directly engaged with the cam follower 1106.

In at least some implementations, the position 3500 is considered a maximum open position for the support component 110 under normal operating conditions. For instance, torque required to open the hinge 1100 further past the position 3500 is significantly greater than torque required to open the hinge 1100 from a closed position to the various other open positions discussed above. A further illustrated below, movement of the hinge 1100 past the position 3500 is possible but is considered to be an emergency escape option that prevents damage to the support component 110 when excessive force is applied to the support component 110.

Figure 36:
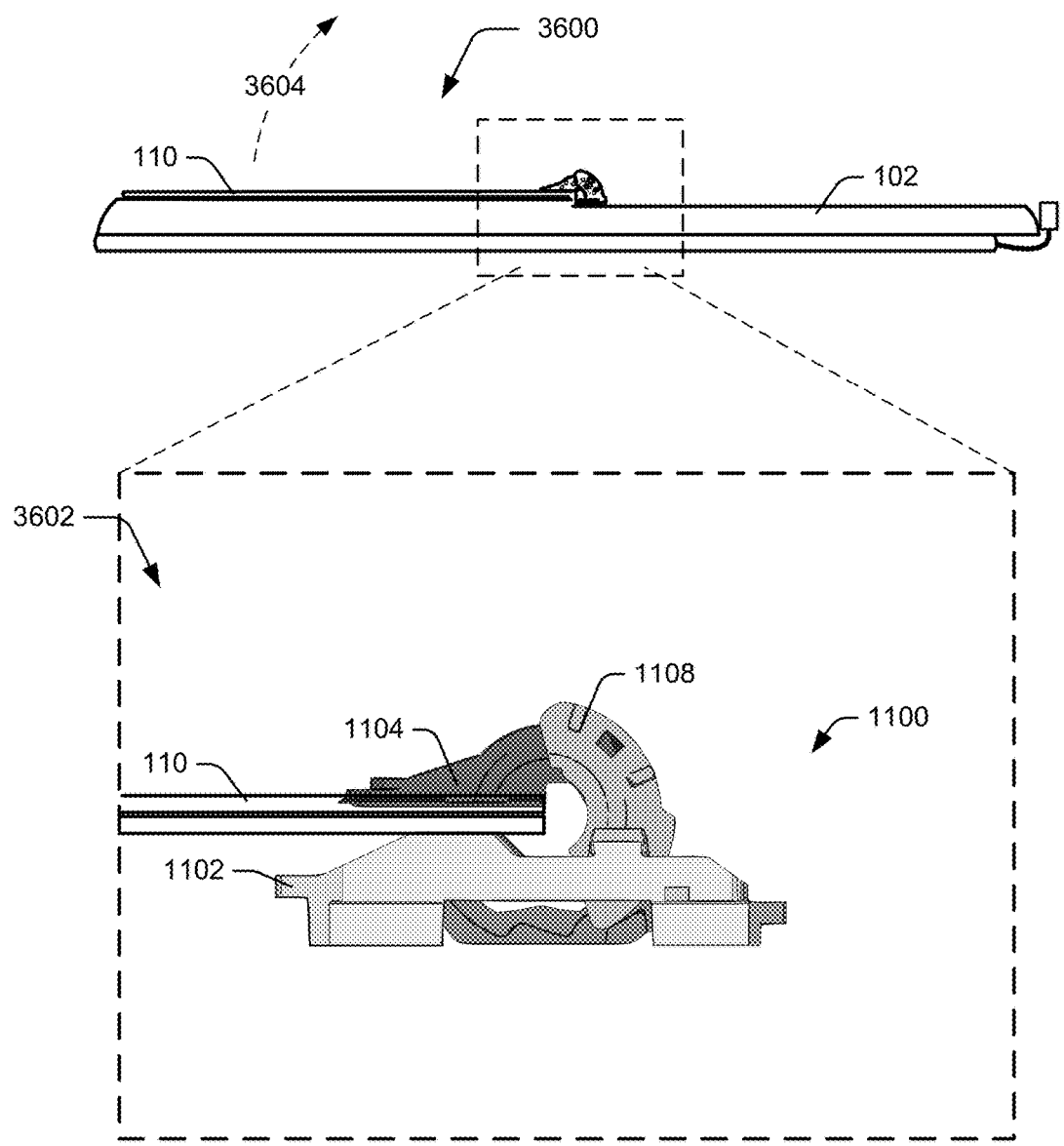
FIG. 36 depicts a side view of a computing device in an emergency escape position in accordance with one or more embodiments.

FIG. 36 depicts the support component 110 in a position 3600. The position 3600, for instance, represents an approximately 180 degree rotation (+/−10°) of the support component 110 from a fully closed position, e.g., from the position 1800 discussed above. In at least some embodiments, the position 3600 corresponds to an emergency escape position that is provided to prevent damage to the support component 110 and/or other components. For instance, rotation of the support component 110 to a further open position past the position 3500 discussed above (e.g., a fourth preset open position) is not considered to be a normal operating condition. However, such rotation may occur, such as inadvertently in response to various events.

For example, consider that the computing device 102 is resting on a table or other surface with the support component in the position 3500. A user may accidentally place an object such as a book on the computing device 102, which exerts sufficient force on the support component 110 such that the support component 110 disengages from the position 3500 and rotates to the position 3600. Generally, the force required to cause the support component 110 to rotate from the position 3500 to the position 3600 is significantly greater than the force required to transition between other open positions discussed above.

Further illustrated in FIG. 36 is a side view 3602 of the hinge 1100 in the position 3600, including the hinge frame 1102, the cam 1104, the cam follower 1106, and the support plate 1108. In the position 3600, the cam 1104 disengages from the cam follower 1106 and the support plate 1108 remains engaged with the cam follower 1106 to enable the hinge 1100 to function as an integrated and interconnected mechanism even in an emergency escape scenario. As further discussed below, this enables a user to return the support component 110 to a functioning position (e.g., one of the preset open positions discussed above) with minimal effort. For instance, a user may apply force to the support component 110 in a direction 3604 to return the support component 110 to one or more of the positions discussed above.

When the hinge 1100 is in the position 3600, the plate pins 2204a, 2204b and the cam pin 2202 remain engaged as detailed above. Thus, closing the support component 110 from the position 3600 is subject to movement of the support plates 1108a, 1108b along with the cam 1104. When closing of the hinge 1100 transitions from the position 3000 to the position 2500, the plate pins 2204a, 2204b and the cam pin 2202 are pushed inwardly and thus the cam pin 2202 disengages from the support plate 1108b, and the plate pin 2204a disengages from the cam 1104. This enables the cam 1104 to proceed to a closed position without resistance from the support plates 1108a, 1108b.

Figure 37:
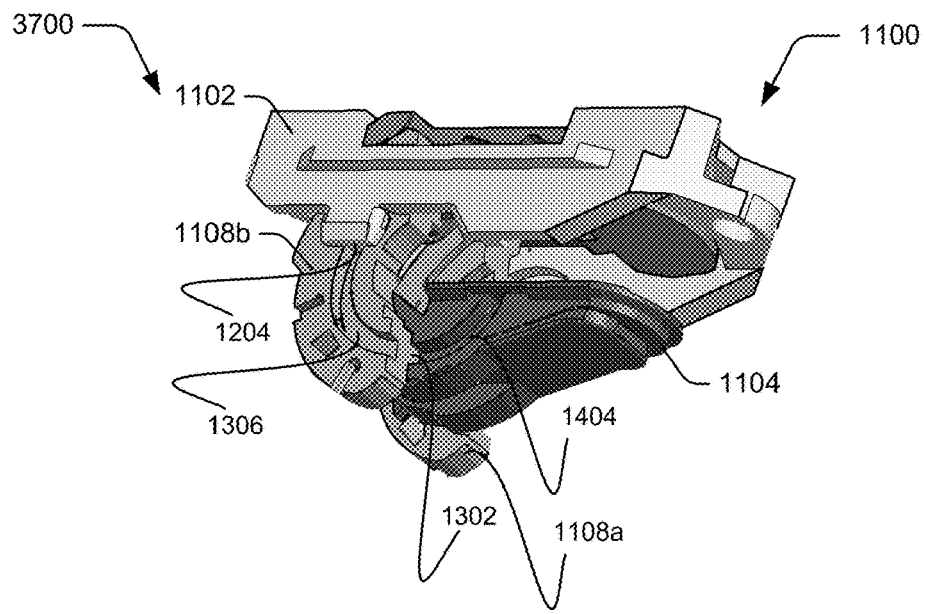
FIG. 37 depicts a bottom view of a hinge mechanism in an emergency escape position in accordance with one or more embodiments.

FIG. 37 depicts a side view 3700 of the hinge 1100 in the position 3600, introduced above. The side view 3700 depicts that in the position 3600, the cam 1104 is engaged with the support plates 1108a, 1108b via engagement of the cam channel 1404 with the cam guide 1302. Further, the support plates 1108a, 1108b are engaged with the hinge frame 1102 via engagement of the support channel 1306 with the plate guide 1204. This engagement of the cam 1104 with the support plates 1108, and the support plates 1108 with the hinge frame 1102, enables components of the hinge 1100 to remain interconnected in the position 3600. Thus, even with the cam 1104 completely removed from the hinge frame 1102, the support component 110 remains connected to the computing device 102 and can be returned to normal operating positions, such as those discussed above.

Figure 38:
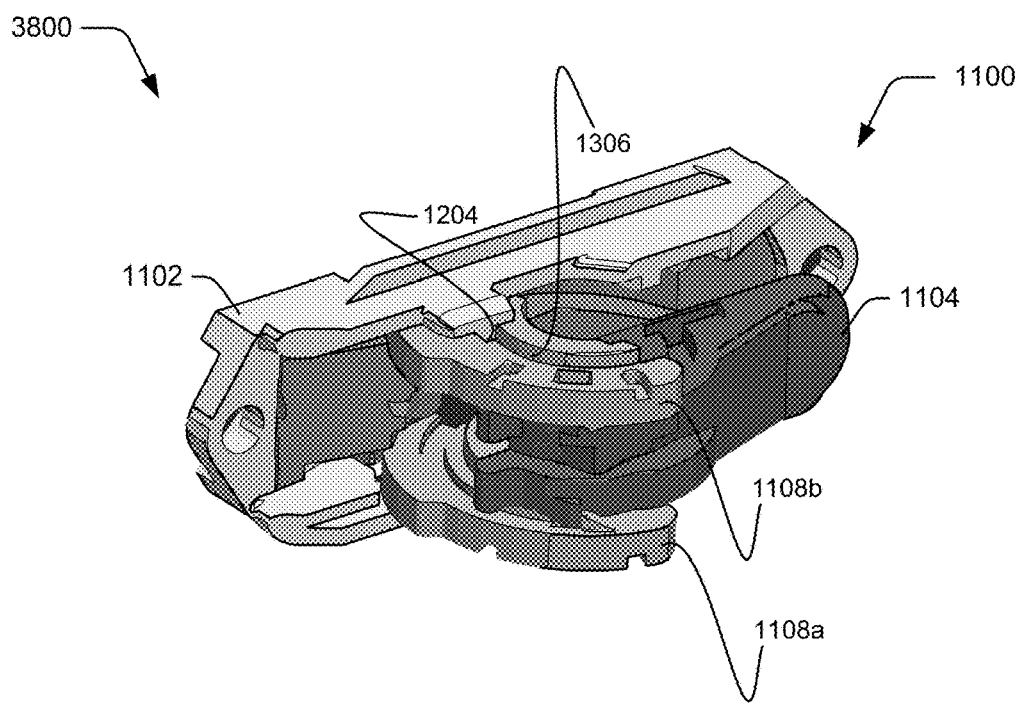
FIG. 38 depicts a bottom view of a hinge mechanism in an emergency escape position in accordance with one or more embodiments.

FIG. 38 depicts a bottom view 3800 of the hinge 1100 in the position 3600. The view 3800 illustrates engagement of the support plate 1108b with the hinge frame 1102 via engagement of the support channel 1306 with the plate guide 1204.

Accordingly, embodiments discussed herein provide a stable hinge mechanism that enables an attached component (e.g., a support component) to be adjusted between multiple preset positions. It is to be appreciated that the example device orientations, support component positions, hinge positions, and so forth discussed above are presented for purposes of example only. Thus, a wide variety of different device orientations, support component positions, hinge positions, hinge preset positions, and torque values not specifically mentioned herein may be implemented within the spirit and scope of the claimed embodiments.

For instance, an attachment mechanism used to attach a support component to a computing device (e.g., the hinge 1100 discussed above) can include any number and/or configuration of suitable preset stop positions to enable the support component to be opened to a variety of different positions to support various orientations of a computing device. Further, example hinges can be attached at any suitable position and/or portion of a support component and/or computing device in accordance with the claimed embodiments.

Example System and Device

Figure 39:
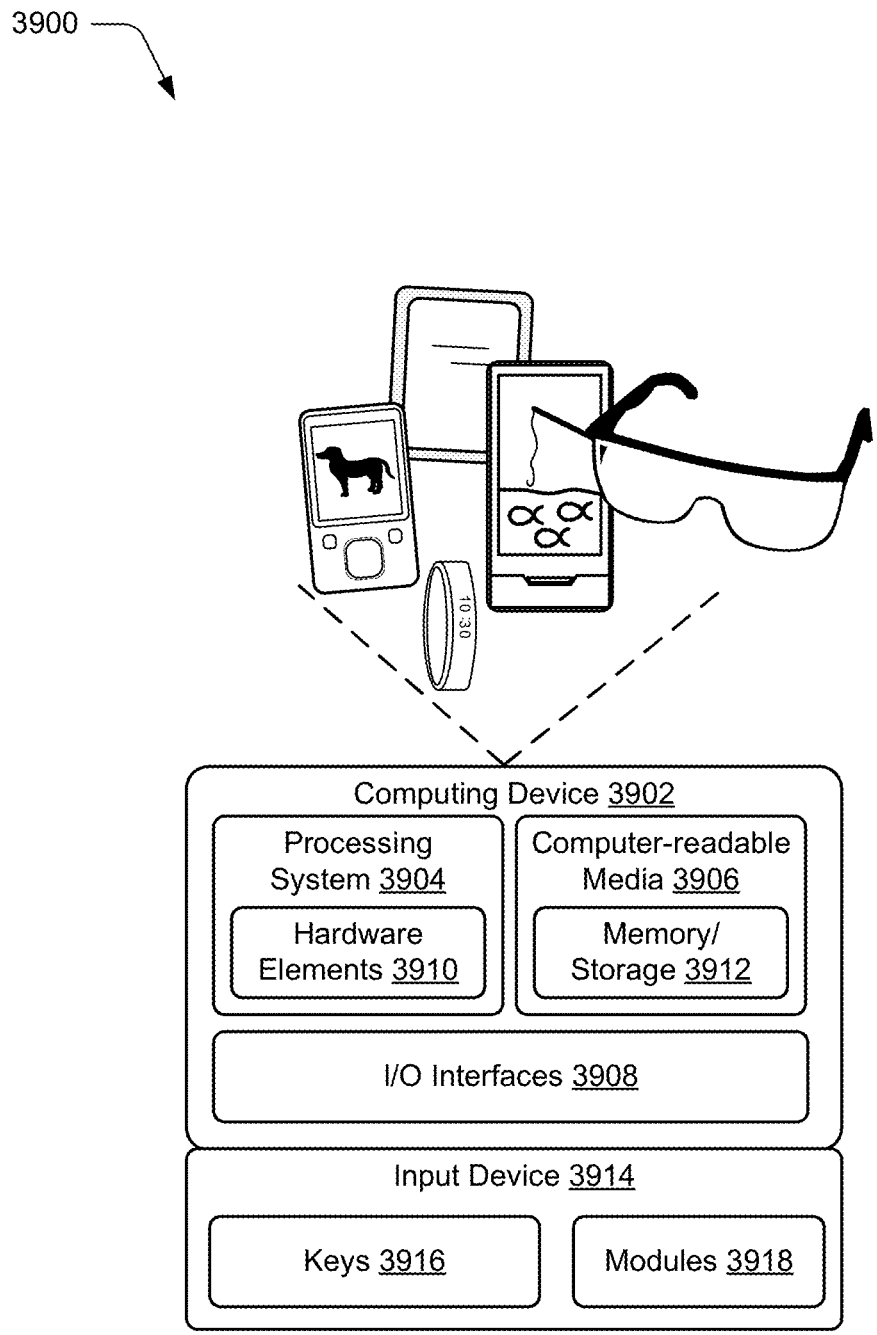
FIG. 39 depicts an example system including various components of an example device that can be implemented as any type of computing device as described with reference to FIGS. 1-38 to implement embodiments of the techniques described herein.

FIG. 39 depicts an example system generally at 3900 that includes an example computing device 3902 that is representative of one or more computing systems and/or devices that may implement the various techniques described herein. In at least some implementations, the computing device 3902 represents an implementation of the computing device 102 discussed above. The computing device 3902 may be, for example, be configured to assume a mobile configuration through use of a housing formed and sized to be grasped and carried by one or more hands of a user, illustrated examples of which include a mobile phone, mobile game and music device, and tablet computer although other examples are also contemplated. In at least some implementations, the computing device 102 may be implemented as a wearable device, such as a smart watch, smart glasses, and so forth.

The example computing device 3902 as illustrated includes a processing system 3904, one or more computer-readable media 3906, and one or more I/O interface 3908 that are communicatively coupled, one to another. Although not shown, the computing device 3902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 3904 is representative of functionality to perform one or more operations using hardware. Accordingly, the processing system 3904 is illustrated as including hardware element 3910 that may be configured as processors, functional blocks, and so forth. This may include implementation in hardware as an application specific integrated circuit or other logic device formed using one or more semiconductors. The hardware elements 3910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 3906 is illustrated as including memory/storage 3912. The memory/storage 3912 represents memory/storage capacity associated with one or more computer-readable media. The memory/storage component 3912 may include volatile media (such as random access memory (RAM)) and/or nonvolatile media (such as read only memory (ROM), Flash memory, optical disks, magnetic disks, and so forth). The memory/storage component 3912 may include fixed media (e.g., RAM, ROM, a fixed hard drive, and so on) as well as removable media (e.g., Flash memory, a removable hard drive, an optical disc, and so forth). The computer-readable media 3906 may be configured in a variety of other ways as further described below.

Input/output interface(s) 3908 are representative of functionality to allow a user to enter commands and information to computing device 3902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 3902 may be configured in a variety of ways to support user interaction.

The computing device 3902 is further illustrated as being communicatively and physically coupled to an input device 3914 that is physically and communicatively removable from the computing device 3902. In this way, a variety of different input devices may be coupled to the computing device 3902 having a wide variety of configurations to support a wide variety of functionality. In this example, the input device 3914 includes one or more keys 3916, which may be configured as pressure sensitive keys, mechanically switched keys, and so forth.

The input device 3914 is further illustrated as include one or more modules 3918 that may be configured to support a variety of functionality. The one or more modules 3918, for instance, may be configured to process analog and/or digital signals received from the keys 3916 to determine whether a keystroke was intended, determine whether an input is indicative of resting pressure, support authentication of the input device 3914 for operation with the computing device 3902, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 3902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 3902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 3910 and computer-readable media 3906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 3910. The computing device 3902 may be configured to implement particular instructions and/or functions corresponding to the software and/or hardware modules. Accordingly, implementation of a module that is executable by the computing device 3902 as software may be achieved at least partially in hardware, e.g., through use of computer-readable storage media and/or hardware elements 3910 of the processing system 3904. The instructions and/or functions may be executable/operable by one or more articles of manufacture (for example, one or more computing devices 3902 and/or processing systems 3904) to implement techniques, modules, and examples described herein.

Implementations discussed herein include:

Example 1

A device including: a movable component pivotably attached to a rear portion of the device; and a hinge with multiple preset open positions and that attaches a portion of the movable component to the device, the hinge including: a hinge frame; a support plate rotatably engaged with the hinge frame; a cam rotatably engaged with the at least one support plate, the cam being attached to the movable component to enable pivotable attachment of the movable component to the hinge mechanism; a spring loaded pin being positioned such that pivoting of the cam to a particular open position relative to the support plate enables the pin to engage the cam with the support plate, and further pivoting of the cam causes a corresponding pivoting of the support plate relative to the hinge frame; and a cam follower pivotably mounted within the hinge frame and positioned such that in at least some of the multiple preset open positions, the cam follower interfaces with the cam to provide resistance to transitioning between the at least some of the multiple preset open positions.

Example 2

A device as described in example 1, wherein the pin includes a plate pin positioned within a cavity within the support plate, the support plate further including a pin spring positioned within the cavity and that exerts force against the plate pin to enable the plate pin to slide relative to the support plate and engage the cam in response to the cam pivoting to the particular open position.

Example 3

A device as described in one or more of examples 1 or 2, wherein the pin includes a spring-loaded plate pin slidably positioned at least partially within the support plate, and the support plate further includes a pin spring that exerts force against the plate pin to enable the plate pin to slide relative to the support plate and laterally relative to the hinge frame to engage the cam in response to the cam pivoting to the particular open position.

Example 4

A device as described in one or more of examples 1-3, wherein the pin includes a spring-loaded plate pin slidably positioned at least partially within the support plate, and the support plate further includes a pin spring that exerts force against the plate pin to enable the plate pin to slide in a direction that is normal to a pivoting direction of the cam and engage the cam in response to the cam pivoting to the particular open position.

Example 5

A device as described in one or more of examples 1-4, wherein the pin includes a cam pin positioned within a cavity of the cam to engage the support plate in response to the cam pivoting to the particular open position.

Example 6

A device as described in one or more of examples 1-5, wherein the support plate engages with the cam follower in one or more of the multiple preset open positions such that interaction between the support plate and the cam follower in the one or more of the multiple preset open positions resists pivoting of the support plate relative to the hinge frame, and engagement of the plate pin with the cam enables the support plate to provide resistance to pivoting of the cam relative to the hinge frame.

Example 7

A device as described in one or more of examples 1-6, wherein the pin is engageable in a cavity within the cam to engage the support plate with the cam in response to the cam pivoting to the particular open position, and wherein pivoting of the cam from the particular open position towards a closed position relative to the hinge frame enables the pin to disengage from the cam.

Example 8

A device as described in one or more of examples 1-7, wherein the support plate is rotatably engaged with a first inside surface of the hinge frame, the cam is rotatably engaged with the support plate on a first side of the cam, and the hinge further includes a different support plate rotatably engaged with a second inside surface of the hinge frame, and the cam is rotatably engaged with the different support plate on a second side of the cam.

Example 9

A device as described in one or more of examples 1-8, wherein the support plate is rotatably engaged with a first inside surface of the hinge frame, the cam is rotatably engaged with the support plate on a first side of the cam, and the hinge further includes: a different support plate rotatably engaged with a second inside surface of the hinge frame, wherein the cam is rotatably engaged with the different support plate on a second side of the cam; and a cam pin slidably positioned at least partially within the cam, wherein pivoting of the cam to the particular open position relative to the support plate causes the pin to apply pressure against the cam pin such that the cam pin slides relative to the cam and engages with the different support plate.

Example 10

A device as described in one or more of examples 1-9, wherein the device includes a mobile computing device, and the moveable component is moveable relative to a chassis of the computing device.

Example 11

A hinge including: a hinge frame with a support plate rotatably mounted on an interior surface of the hinge frame; a cam rotatably mounted on an interior surface of the support plate, the cam including a mounting portion for mounting a moveable component to the cam; a spring-loaded pin slidably positioned such that pivoting of the cam to a particular open position relative to the support plate enables the pin to engage the cam with the support plate, and further pivoting of the cam causes a corresponding pivoting of the support plate relative to the hinge frame; a cam follower pivotably mounted within the hinge frame; and a hinge spring mounted within the hinge frame and that applies force to the cam follower such that the cam follower is held in contact with the cam in at least some positions of the hinge.

Example 12

A hinge as described in example 11, wherein the pin is positioned within a plate cavity within the support plate, the support plate further including a pin spring positioned within the plate cavity and that exerts force against the pin to enable the pin to slide relative to the support plate and engage the cam in response to the cam pivoting to the particular open position.

Example 13

A hinge as described in one or more of examples 11 or 12, wherein the support plate further includes a pin spring that exerts force against the pin to enable the pin to slide in a direction that is normal to a pivoting direction of the cam and engage the cam in response to the cam pivoting to the particular open position.

Example 14

A hinge as described in one or more of examples 11-13, wherein the support plate is rotatably engaged with a first inside surface of the hinge frame, the cam is rotatably engaged with the support plate on a first side of the cam, and the hinge further includes a different support plate rotatably engaged with a second inside surface of the hinge frame, and the cam is rotatably engaged with the different support plate on a second side of the cam.

Example 15

A hinge as described in one or more of examples 11-14, wherein the support plate is rotatably engaged with a first inside surface of the hinge frame, the cam is rotatably engaged with the support plate on a first side of the cam, and the hinge further includes: a different support plate rotatably engaged with a second inside surface of the hinge frame, wherein the cam is rotatably engaged with the different support plate on a second side of the cam; and a cam pin slidably positioned at least partially within the cam, wherein pivoting of the cam to the particular open position relative to the support plate causes the pin to apply pressure against the cam pin such that the cam pin slides relative to the cam and engages with the different support plate.

Example 16

A hinge as described in one or more of examples 11-15, wherein the support plate is rotatably engaged with a first inside surface of the hinge frame, the cam is rotatably engaged with the support plate on a first side of the cam, and the hinge further includes: a different support plate rotatably engaged with a second inside surface of the hinge frame, wherein the cam is rotatably engaged with the different support plate on a second side of the cam; a cam pin slidably positioned at least partially within the cam; and a different pin slidably positioned at least partially within the different support plate and positioned such that when the hinge is in a closed position, the second inside surface of the hinge frame constrains sliding movement of the different pin, wherein pivoting of the cam to the particular open position relative to the support plate causes the pin, the cam pin, and the different pin to align and the different pin to not be constrained by the second inside surface of the hinge frame such that the different pin slides relative to the different support plate, the cam pin slides relative to the cam, and the pin slides relative to the support plate to enable the cam pin to engage the different support plate and the pin to engage the cam.

Example 17

An apparatus including: a chassis; and a hinge that pivotably attaches a support component to the chassis, the hinge being positionable in multiple preset open positions relative to the chassis, the hinge including: a hinge frame; a support plate rotatably engaged with the hinge frame; a cam rotatably engaged with the at least one support plate, the cam being attached to the movable component to enable moveable attachment of the component to the hinge mechanism; a spring-loaded pin slidably positioned such that pivoting of the cam to a particular open position relative to the support plate enables the pin to cause the cam to engage with the support plate, and further pivoting of the cam causes a corresponding pivoting of the support plate relative to the hinge frame; and a cam follower pivotably mounted within the hinge frame and positioned such that in at least some of the multiple preset open positions, the cam follower interfaces with the cam to provide resistance to transitioning between the at least some of the multiple preset open positions.

Example 18

An apparatus as described in example 17, wherein the pin is positioned within a cavity within the support plate, the support plate further including a pin spring positioned within the cavity and that exerts force against the pin to enable the pin to slide relative to the support plate and engage the cam in response to the cam pivoting to the particular open position.

Example 19

An apparatus as described in examples 17 or 18, wherein the support plate further includes a pin spring that exerts force against the pin to enable the pin to slide in a direction that is normal to a pivoting direction of the cam and engage the cam in response to the cam pivoting to the particular open position.

Example 20

An apparatus as described in examples 17-19, wherein the support plate further includes a pin spring that exerts force against the pin to enable the pin to slide relative to the support plate and laterally relative to the hinge frame to engage the cam in response to the cam pivoting to the particular open position.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:
1. A hinge comprising:
    a hinge frame with a support plate rotatably mounted on an interior surface of the hinge frame;
    a cam rotatably mounted on an interior surface of the support plate, the cam including a mounting portion for mounting a moveable component to the cam;
    a spring-loaded pin slidably positioned such that pivoting of the cam to a particular open position relative to the support plate enables the spring-loaded pin to engage the cam with the support plate, and further pivoting of the cam causes a corresponding pivoting of the support plate relative to the hinge frame;
    a cam follower pivotably mounted within the hinge frame; and
    a hinge spring mounted within the hinge frame and that applies force to the cam follower such that the cam follower is held in contact with the cam in at least some positions of the hinge.
2. A hinge as recited in claim 1, wherein the spring-loaded pin is positioned within a plate cavity within the support plate, the support plate further including a pin spring positioned within the plate cavity and that exerts force against the spring-loaded pin to enable the spring-loaded pin to slide relative to the support plate and engage the cam in response to the cam pivoting to the particular open position.
3. A hinge as recited in claim 1, wherein the support plate further includes a pin spring that exerts force against the spring-loaded pin to enable the spring-loaded pin to slide in a direction that is normal to a pivoting direction of the cam and engage the cam in response to the cam pivoting to the particular open position.
4. A hinge as recited in claim 1, wherein the support plate is rotatably engaged with a first inside surface of the hinge frame, the cam is rotatably engaged with the support plate on a first side of the cam, and the hinge further includes a different support plate rotatably engaged with a second inside surface of the hinge frame, and the cam is rotatably engaged with the different support plate on a second side of the cam.
5. A hinge as recited in claim 1, wherein the support plate is rotatably engaged with a first inside surface of the hinge frame, the cam is rotatably engaged with the support plate on a first side of the cam, and the hinge further includes:
    a different support plate rotatably engaged with a second inside surface of the hinge frame, wherein the cam is rotatably engaged with the different support plate on a second side of the cam; and
    a cam pin slidably positioned at least partially within the cam,
    wherein pivoting of the cam to the particular open position relative to the support plate causes the spring-loaded pin to apply pressure against the cam pin such that the cam pin slides relative to the cam and engages with the different support plate.
6. A hinge as recited in claim 1, wherein the support plate is rotatably engaged with a first inside surface of the hinge frame, the cam is rotatably engaged with the support plate on a first side of the cam, and the hinge further includes:
    a different support plate rotatably engaged with a second inside surface of the hinge frame, wherein the cam is rotatably engaged with the different support plate on a second side of the cam;
    a cam pin slidably positioned at least partially within the cam; and
    a different pin slidably positioned at least partially within the different support plate and positioned such that when the hinge is in a closed position, the second inside surface of the hinge frame constrains sliding movement of the different pin, wherein pivoting of the cam to the particular open position relative to the support plate causes the spring-loaded pin, the cam pin, and the different pin to align and the different pin to not be constrained by the second inside surface of the hinge frame such that the different pin slides relative to the different support plate, the cam pin slides relative to the cam, and the spring-loaded pin slides relative to the support plate to enable the cam pin to engage the different support plate and the spring-loaded pin to engage the cam.

7. A hinge with multiple preset open positions, the hinge comprising:
a hinge frame;
a support plate rotatably engaged with the hinge frame;
a cam rotatably engaged with the support plate;
a spring-loaded pin being positioned such that pivoting of the cam to a particular open position relative to the support plate enables the spring-loaded pin to engage the cam with the support plate, and further pivoting of the cam causes a corresponding pivoting of the support plate relative to the hinge frame; and
a cam follower pivotably mounted within the hinge frame and positioned such that in at least some of the multiple preset open positions, the cam follower interfaces with the cam to provide resistance to transitioning between the at least some of the multiple preset open positions.

8. A hinge as recited in claim 7, wherein the spring-loaded pin comprises a plate pin positioned within a cavity within the support plate, the support plate further including a pin spring positioned within the cavity and that exerts force against the plate pin to enable the plate pin to slide relative to the support plate and engage the cam in response to the cam pivoting to the particular open position.

9. A hinge as recited in claim 7, wherein the spring-loaded pin comprises a spring-loaded plate pin slidably positioned at least partially within the support plate, and the support plate further includes a pin spring that exerts force against the spring-loaded plate pin to enable the spring-loaded plate pin to slide relative to the support plate and laterally relative to the hinge frame to engage the cam in response to the cam pivoting to the particular open position.

10. A hinge as recited in claim 7, wherein the spring-loaded pin comprises a spring-loaded plate pin slidably positioned at least partially within the support plate, and the support plate further includes a pin spring that exerts force against the spring-loaded plate pin to enable the spring-loaded plate pin to slide in a direction that is normal to a pivoting direction of the cam and engage the cam in response to the cam pivoting to the particular open position.

11. A hinge as recited in claim 7, further comprising a cam pin positioned within a cavity of the cam to engage a second support plate in response to the cam pivoting to the particular open position.

12. A hinge as recited in claim 7, wherein the support plate engages with the cam follower in one or more of the multiple preset open positions such that interaction between the support plate and the cam follower in the one or more of the multiple preset open positions resists pivoting of the support plate relative to the hinge frame, and engagement of the spring-loaded pin with the cam enables the support plate to provide resistance to pivoting of the cam relative to the hinge frame.

13. A hinge as recited in claim 7, wherein the spring-loaded pin is engageable in a cavity within the cam to engage the support plate with the cam in response to the cam pivoting to the particular open position, and wherein pivoting of the cam from the particular open position towards a closed position relative to the hinge frame enables the spring-loaded pin to disengage from the cam.

14. A hinge as recited in claim 7, wherein the support plate is rotatably engaged with a first inside surface of the hinge frame, the cam is rotatably engaged with the support plate on a first side of the cam, and the hinge further includes a different support plate rotatably engaged with a second inside surface of the hinge frame, and the cam is rotatably engaged with the different support plate on a second side of the cam.

15. A hinge as recited in claim 7, wherein the support plate is rotatably engaged with a first inside surface of the hinge frame, the cam is rotatably engaged with the support plate on a first side of the cam, and the hinge further includes:
a different support plate rotatably engaged with a second inside surface of the hinge frame, wherein the cam is rotatably engaged with the different support plate on a second side of the cam; and
a cam pin slidably positioned at least partially within the cam,
wherein pivoting of the cam to the particular open position relative to the support plate causes the spring-loaded pin to apply pressure against the cam pin such that the cam pin slides relative to the cam and engages with the different support plate.

16. A hinge as recited in claim 7, wherein the support plate is rotatably engaged with a first inside surface of the hinge frame, the cam is rotatably engaged with the support plate on a first side of the cam, and the hinge further includes a different support plate rotatably engaged with a second inside surface of the hinge frame, and the cam is rotatably engaged with the different support plate on a second side of the cam.

17. A hinge comprising:
a hinge frame with a first support plate rotatably mounted on a first interior surface of the hinge frame, and a second support plate rotatably mounted on a second interior surface of the hinge frame;
a cam rotatably mounted to the first support plate and the second support plate, the cam including a mounting portion for mounting a moveable component to the cam;
a spring-loaded pin slidably positioned such that pivoting of the cam to a particular open position relative to the first support plate enables the spring-loaded pin to engage the cam with the first support plate, and further pivoting of the cam causes a corresponding pivoting of the first support plate relative to the hinge frame;
a cam follower pivotably mounted within the hinge frame; and
a hinge spring mounted within the hinge frame and that applies force to the cam follower such that the cam follower is held in contact with the cam in at least some positions of the hinge.

18. A hinge as recited in claim 17, wherein the spring-loaded pin is positioned within a plate cavity within the first support plate, the first support plate further including a pin spring positioned within the plate cavity and that exerts force against the spring-loaded pin to enable the spring-loaded pin to slide relative to the first support plate and engage the cam in response to the cam pivoting to the particular open position.

19. A hinge as recited in claim 17, wherein the first support plate further includes a pin spring that exerts force against the spring-loaded pin to enable the spring-loaded pin to slide in a direction that is normal to a pivoting direction of the cam and engage the cam in response to the cam pivoting to the particular open position.

20. A hinge as recited in claim 17, wherein the first interior surface and the second interior surface represent opposite interior surfaces of the hinge frame.

* * * * *